United States Patent
Holt et al.

(10) Patent No.: US 10,183,717 B2
(45) Date of Patent: *Jan. 22, 2019

(54) TWO-WHEELED VEHICLE

(71) Applicant: Indian Motorcycle International, LLC, Medina, MN (US)

(72) Inventors: Austin Holt, St. Anthony, MN (US); John M. Nutter, Stacy, MN (US)

(73) Assignee: Indian Motorcycle International, LLC, Medina, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/387,504

(22) Filed: Dec. 21, 2016

(65) Prior Publication Data

US 2017/0101149 A1 Apr. 13, 2017

Related U.S. Application Data

(63) Continuation of application No. 14/827,038, filed on Aug. 14, 2015, now Pat. No. 9,550,541, which is a
(Continued)

(51) Int. Cl.
*B62K 23/02* (2006.01)
*B60W 30/14* (2006.01)
(Continued)

(52) U.S. Cl.
CPC ............... *B62J 33/00* (2013.01); *B62J 9/00* (2013.01); *B62J 9/001* (2013.01); *B62J 15/00* (2013.01);
(Continued)

(58) Field of Classification Search
CPC ........ B62K 23/02; B62K 23/04; B62K 23/06; B60W 30/14; B60W 30/143; B60W 30/146
(Continued)

(56) References Cited

U.S. PATENT DOCUMENTS

| 3,733,463 A | 5/1973 | Low |
| 4,066,290 A | 1/1978 | Wiegert |

(Continued)

FOREIGN PATENT DOCUMENTS

| DE | 3420352 | 12/1985 |
| EP | 0968909 | 1/2000 |

(Continued)

OTHER PUBLICATIONS

International Search Report and Written Opinion issued by the European Patent Office, dated May 19, 2015, for related International Application No. PCT/US2014/065012; 30 pages.
(Continued)

*Primary Examiner* — Gregory A Blankenship
(74) *Attorney, Agent, or Firm* — Faegre Baker Daniels LLP

(57) ABSTRACT

A two-wheeled vehicle includes a frame, a plurality of ground-engaging members for supporting the frame, and an engine supported by the frame and operably coupled to the ground-engaging members. Additionally, the two-wheeled vehicle includes an upper and lower fairing assembly that cooperate together to define wind flow around the vehicle. The vehicle may include a trunk to support cargo therein when the vehicle is operating.

22 Claims, 49 Drawing Sheets

Related U.S. Application Data continuation of application No. 14/077,037, filed on Nov. 11, 2013, now Pat. No. 9,216,789.

(51) Int. Cl.

| | | |
|---|---|---|
| *B62K 23/04* | (2006.01) | |
| *B62J 33/00* | (2006.01) | |
| *B62J 17/02* | (2006.01) | |
| *B62J 99/00* | (2009.01) | |
| *B62K 21/12* | (2006.01) | |
| *B62J 17/04* | (2006.01) | |
| *B62K 21/26* | (2006.01) | |
| *B62J 9/00* | (2006.01) | |
| *B62J 15/00* | (2006.01) | |
| *B62J 15/02* | (2006.01) | |
| *B62J 17/06* | (2006.01) | |
| *B62J 23/00* | (2006.01) | |
| *B62K 11/04* | (2006.01) | |
| *B62K 19/30* | (2006.01) | |
| *B62K 21/18* | (2006.01) | |
| *B62K 21/02* | (2006.01) | |
| *B62K 23/06* | (2006.01) | |

(52) U.S. Cl.
CPC .............. *B62J 15/02* (2013.01); *B62J 17/02* (2013.01); *B62J 17/04* (2013.01); *B62J 17/06* (2013.01); *B62J 23/00* (2013.01); *B62J 99/00* (2013.01); *B62K 11/04* (2013.01); *B62K 19/30* (2013.01); *B62K 21/02* (2013.01); *B62K 21/12* (2013.01); *B62K 21/18* (2013.01); *B62K 21/26* (2013.01); *B62K 23/02* (2013.01); *B62K 23/06* (2013.01); *B60Y 2200/12* (2013.01); *B60Y 2410/124* (2013.01); *B62J 2099/0013* (2013.01); *B62K 23/04* (2013.01); *B62K 2207/00* (2013.01); *B62K 2700/12* (2013.01)

(58) Field of Classification Search
USPC ........................................................ 180/170
See application file for complete search history.

(56) References Cited

U.S. PATENT DOCUMENTS

| | | | |
|---|---|---|---|
| 4,082,345 A | 4/1978 | Willey | |
| 4,130,315 A | 12/1978 | Shields | |
| 4,269,445 A | 5/1981 | Gager | |
| 4,479,676 A | 10/1984 | Hayes | |
| 4,536,005 A | 8/1985 | Tanaka | |
| 4,580,537 A * | 4/1986 | Uchiyama | B60K 31/08 |
| | | | 123/349 |
| 4,615,556 A | 10/1986 | Stahel | |
| 4,650,204 A | 3/1987 | Bothwell | |
| 5,732,965 A | 3/1998 | Willey | |
| 5,757,165 A | 5/1998 | Minks | |
| 5,881,833 A | 3/1999 | Branch | |
| 6,042,171 A | 3/2000 | Hesse | |
| 6,114,668 A | 9/2000 | Ogata | |
| 6,161,513 A | 12/2000 | Lohr | |
| 6,196,614 B1 | 3/2001 | Willey | |
| 6,203,093 B1 | 3/2001 | Suzuki | |
| 6,250,173 B1 * | 6/2001 | Huston | B62K 11/14 |
| | | | 74/489 |
| 6,505,877 B1 | 1/2003 | Devlin | |
| 6,686,572 B2 | 2/2004 | Wu | |
| 6,736,441 B1 | 5/2004 | Barber | |
| 6,844,524 B2 | 1/2005 | Downey | |
| 6,927,367 B2 | 8/2005 | Livingstone | |
| 7,091,450 B1 | 8/2006 | Hollander | |
| 7,178,858 B1 | 2/2007 | Hesse | |
| 7,315,779 B1 | 1/2008 | Rioux | |
| 7,380,538 B1 | 6/2008 | Gagnon | |
| 7,530,345 B1 | 5/2009 | Plante | |
| 7,891,270 B2 | 2/2011 | Higashi | |
| 8,481,889 B2 | 7/2013 | Fujiwara | |
| 8,517,449 B2 | 8/2013 | Okubo | |
| 8,558,140 B2 | 10/2013 | Hazlett | |
| 9,024,236 B2 | 5/2015 | Kurumagawa | |
| 9,550,541 B2 * | 1/2017 | Lenton | B62J 17/02 |
| 2002/0185323 A1 | 12/2002 | Tsutsumi | |
| 2003/0010558 A1 | 1/2003 | Buell | |
| 2004/0007567 A1 | 1/2004 | Downey | |
| 2004/0011777 A1 | 1/2004 | Richlen | |
| 2005/0103769 A1 | 5/2005 | Marquis | |
| 2005/0140162 A1 | 6/2005 | Yamasaki | |
| 2005/0173406 A1 | 8/2005 | Kurumagawa | |
| 2006/0049161 A1 | 3/2006 | Richlen | |
| 2007/0221644 A1 * | 9/2007 | Gifford | B62J 33/00 |
| | | | 219/204 |
| 2008/0116188 A1 | 5/2008 | Fukuda | |
| 2009/0065491 A1 | 3/2009 | Fitzgerald | |
| 2009/0079219 A1 | 3/2009 | Caprio | |
| 2009/0250963 A1 | 10/2009 | Nakamura | |
| 2010/0301627 A1 | 12/2010 | Kern | |
| 2011/0084055 A1 | 4/2011 | Park | |
| 2011/0233956 A1 | 9/2011 | Okubo | |
| 2011/0297462 A1 * | 12/2011 | Grajkowski | B60K 26/04 |
| | | | 180/54.1 |
| 2012/0305540 A1 | 12/2012 | Paxton | |
| 2013/0057016 A1 | 3/2013 | Yamada | |
| 2013/0220257 A1 | 8/2013 | James | |
| 2013/0320696 A1 | 12/2013 | Yokouchi | |
| 2013/0320697 A1 | 12/2013 | Yokouchi | |
| 2015/0135886 A1 * | 5/2015 | Winters | B62K 11/14 |
| | | | 74/511 R |
| 2015/0274246 A1 * | 10/2015 | Ichikawa | B62K 23/02 |
| | | | 74/471 R |
| 2016/0137262 A1 * | 5/2016 | Ohashi | B62K 23/06 |
| | | | 701/48 |
| 2017/0057513 A1 * | 3/2017 | Ohashi | B60T 8/1706 |
| 2017/0080938 A1 * | 3/2017 | Ohashi | B60W 30/16 |
| 2017/0101149 A1 * | 4/2017 | Lenton | B62J 33/00 |
| 2017/0274958 A1 * | 9/2017 | Felicilda | B60Q 1/343 |
| 2017/0327004 A1 * | 11/2017 | Mochizuki | B60L 15/20 |

FOREIGN PATENT DOCUMENTS

| | | |
|---|---|---|
| EP | 1515037 | 3/2005 |
| EP | 1614886 | 1/2006 |
| EP | 2371688 | 10/2011 |
| GB | 733208 | 7/1955 |
| JP | S5926090 | 2/1984 |
| JP | S60-137120 | 9/1985 |
| JP | S62-43993 | 2/1987 |
| JP | S62-197619 | 9/1987 |
| JP | H1-102087 | 7/1989 |
| JP | 2001106150 | 4/2001 |
| JP | 2003-106148 | 4/2003 |
| JP | 2005153664 | 6/2005 |
| JP | 2013018307 | 1/2013 |
| WO | WO 2006/073244 | 7/2006 |

OTHER PUBLICATIONS

International Preliminary Report on Patentability issued by the Patent Cooperation Treaty, dated Jan. 3, 2016, for related International Application No. PCT/US2014/065012; 41 pages.

Japanese Office Action issued by the Japanese Patent Office, dated Aug. 21, 2018, for Japanese Patent Application No. 2016-526840; 12 pages.

English Translation of Japanese Office Action issued by the Japanese Patent Office, dated Aug. 21, 2018, for Japanese Patent Application No. 2016-526840; 16 pages.

Chinese Office Action issued by the China National Intellectual Property Administration (CNIPA), dated Aug. 29, 2018, for Chinese Patent Application No. 201480061347.5; 9 pages.

* cited by examiner

TWO-WHEELED VEHICLE

CROSS-REFERENCE TO RELATED APPLICATIONS

The present disclosure is a continuation of U.S. patent application Ser. No. 14/827,038, filed on Aug. 14, 2015, which is a continuation of U.S. patent application Ser. No. 14/077,037, filed on Nov. 11, 2013, which is related to co-pending U.S. Design patent application Ser. No. 29/437,022, filed Nov. 12, 2012; U.S. Provisional Patent Application Ser. No. 61/725,440, filed on Nov. 12, 2012; and U.S. Provisional Patent Application Ser. No. 61/773,708, filed Mar. 6, 2013; the complete disclosures of which are expressly incorporated by reference herein.

BACKGROUND OF THE INVENTION

The present disclosure relates to a two-wheeled vehicle and, more particularly, to a motorcycle having added rider comfort, such as improved wind/rain protection, improved heated hand grips, an improved trunk area and an improved communication system.

Conventional two-wheeled vehicles include a frame for supporting an operator. The frame may also support a passenger rearward of the driver. An engine is typically positioned below the driver and is coupled to the frame. The front of the vehicle may include a panel or cover positioned forwards of the driver for supporting additional components of the vehicle, for example a light. The rear of the vehicle may include a cargo area, for example saddle bags extending laterally outward from the frame.

SUMMARY OF THE INVENTION

In an exemplary embodiment of the present invention, a two-wheeled vehicle comprises a frame; front and rear wheels supporting the frame; a powertrain drivingly connected to the rear wheel; a steering assembly coupled to the front wheel for steering the motorcycle, the steering assembly comprising a front fork coupled to the front wheel and a handle bar coupled to the front fork; an upper fairing coupled to the steering assembly; a lower fairing coupled to the frame; and right and left deflectors at upper portions of the lower fairing, the deflectors being movable between a position substantially behind the lower fairing to positions providing an extension to the lower fairing, where the deflector deflects air away from the rider.

A further exemplary embodiment of the present invention includes a two-wheeled vehicle comprises a frame; front and rear wheels supporting the frame; a powertrain drivingly connected to the rear wheel; a steering assembly coupled to the front wheel for steering the motorcycle, the steering assembly comprising a front fork coupled to the front wheel and a handle bar coupled to the front fork; a lower fairing coupled to the frame having a contoured surface leading into the front fork; and right and left deflectors at upper portions of the lower fairing, the deflectors being movable between a position substantially behind the lower fairing to a position providing an extension to the lower fairing, where the deflector deflects air away from the rider.

In yet another embodiment of the present invention, a two-wheeled vehicle comprises a frame; front and rear wheels supporting the frame; a powertrain drivingly connected to the rear wheel; a steering assembly coupled to the front wheel for steering the motorcycle, the steering assembly comprising a front fork coupled to the front wheel and a handle bar coupled to the front fork; a lower fairing coupled to the frame; right and left deflectors at upper portions of the lower fairing, the deflectors being movable between a position allowing airflow to the rider and a position deflecting air away from the rider; and a vent extending through the lower fairing.

In yet another embodiment of the present invention, a two-wheeled vehicle comprises a vehicle, comprising a frame; front and rear wheels supporting the frame; a powertrain drivingly coupled to one of the wheels; and a steering assembly coupled to the front wheel for steering the motorcycle. The steering assembly comprises handgrips for an operator's hands. A temperature sensor is provided at each handgrip for monitoring the handgrip temperature; and a heater in each handgrip maintains the temperature at a constant and controlled temperature.

The above mentioned and other features of the invention, and the manner of attaining them, will become more apparent and the invention itself will be better understood by reference to the following description of embodiments of the invention taken in conjunction with the accompanying drawings.

DETAILED DESCRIPTION OF THE DRAWINGS

Figure 1:
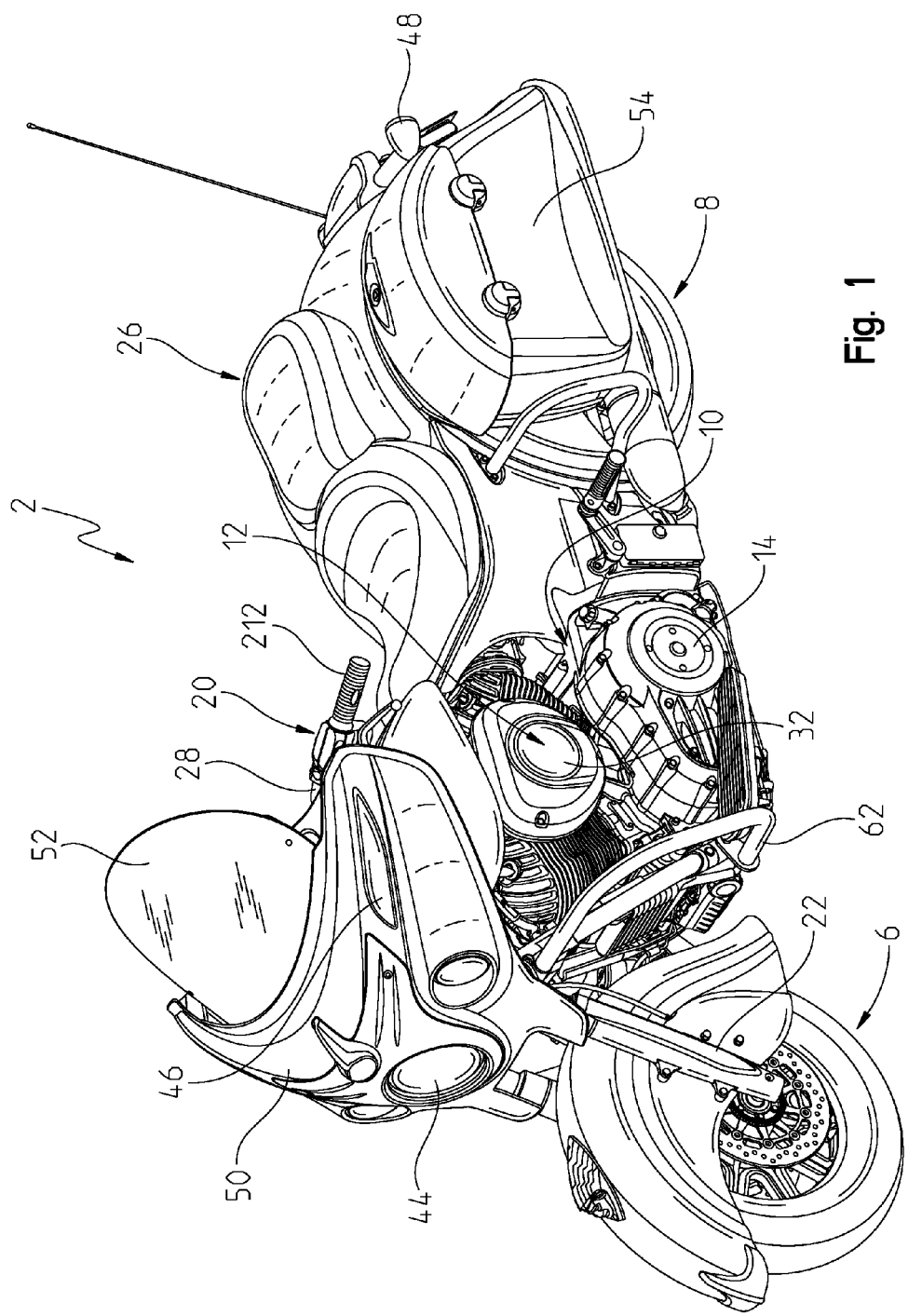
FIG. 1 is a left front perspective view of the two-wheeled vehicle.

The embodiments disclosed below are not intended to be exhaustive or to limit the invention to the precise forms disclosed in the following detailed description. Rather, the embodiments are chosen and described so that others skilled in the art may utilize their teachings. While the present invention primarily involves a touring motorcycle, it should be understood, that the invention may have application to other types of vehicles such as all-terrain vehicles, motorcycles, watercraft, utility vehicles, scooters, golf carts, and mopeds.

With reference first to FIGS. 1-7, an illustrative embodiment of a two-wheeled vehicle 2 is shown. Vehicle 2 as illustrated is a touring style motorcycle although the majority of components may be used for a cruiser style motorcycle as described herein. Vehicle 2 may also include any features known from U.S. Provisional Patent Application Ser. No. 61/725,440, filed Nov. 12, 2012, entitled "TWO-WHEELED VEHICLE", or Ser. No. 61/773,708, filed Mar. 6, 2013, entitled "TWO-WHEELED VEHICLE", the disclosures of which are expressly incorporated by reference herein.

U.S. patent application Ser. No. 11/624,103 filed Jan. 17, 2007, entitled "FUEL TANK ARRANGEMENT FOR A VEHICLE," (now U.S. Pat. No. 7,748,746 (2010 Jul. 6)); U.S. Provisional Patent Application Ser. No. 60/880,999, filed Jan. 17, 2007, entitled "TWO-WHEELED VEHICLE", U.S. patent application Ser. No. 11/624,142 filed Jan. 17, 2007, entitled "REAR SUSPENSION FOR A TWO WHEELED VEHICLE," (now U.S. Pat. No. 7,669,682 (2010 Mar. 2)); U.S. patent application Ser. No. 11/324,144 filed Jan. 17, 2007, entitled "TIP OVER STRUCTURE FOR A TWO WHEELED VEHICLE," (now U.S. Pat. No. 7,658,395 (2010 Feb. 9)); and U.S. Provisional Patent Application Ser. No. 60/880,909 filed Jan. 17, 2007, entitled "TWO-WHEELED VEHICLE", are also expressly incorporated by reference herein.

Vehicle 2 includes a frame 4 (FIGS. 3 and 33) supported by ground engaging members, namely a front ground engaging member, illustratively wheel 6, and a rear ground engaging member, illustratively wheel 8. Vehicle 2 travels relative to the ground on front wheel 6 and rear wheel 8.

Rear wheel 8 is coupled to a power train assembly 10, to propel the vehicle 2 through rear wheel. Power train assembly 10 includes both an engine 12 and transmission 14. Transmission 14 is coupled to engine 12 which provides power to rear wheel 8. In the illustrated embodiment, engine 12 is a 49° V-twin spark-ignition gasoline engine available from Polaris Industries, Inc. located at 2100 Highway 55 in Medina, Minn. 55340. In alternative embodiments, rear wheel 8 is coupled to a drive shaft through a chain drive or other suitable couplings. The drive arrangement in the illustrated embodiment is comprised of a six speed overdrive constant mesh transmission with a carbon fiber reinforced belt available from Polaris Industries, Inc. In alternative embodiments, the transmission is a continuously variable transmission (CVT).

It will be appreciated that while the vehicle 2 is illustrated as a two-wheel vehicle, various embodiments of the present teachings are also operable with three, four, six etc. wheeled vehicles. It will also be appreciated that while a spark-ignition gasoline engine is illustrated, electric motors, and other suitable torque-generating machines are operable with various embodiments of the present teachings.

Motorcycle 2 also generally includes a steering assembly 20, front suspension 22, rear suspension 24 (FIG. 3), and seat 26. Steering assembly 20 includes handlebars 28 which may be moved by an operator to rotate front wheel 6 either to the left or the right, where steering assembly is coupled to the motorcycle through triple clamp assembly 30 (FIGS.

Figure 2:
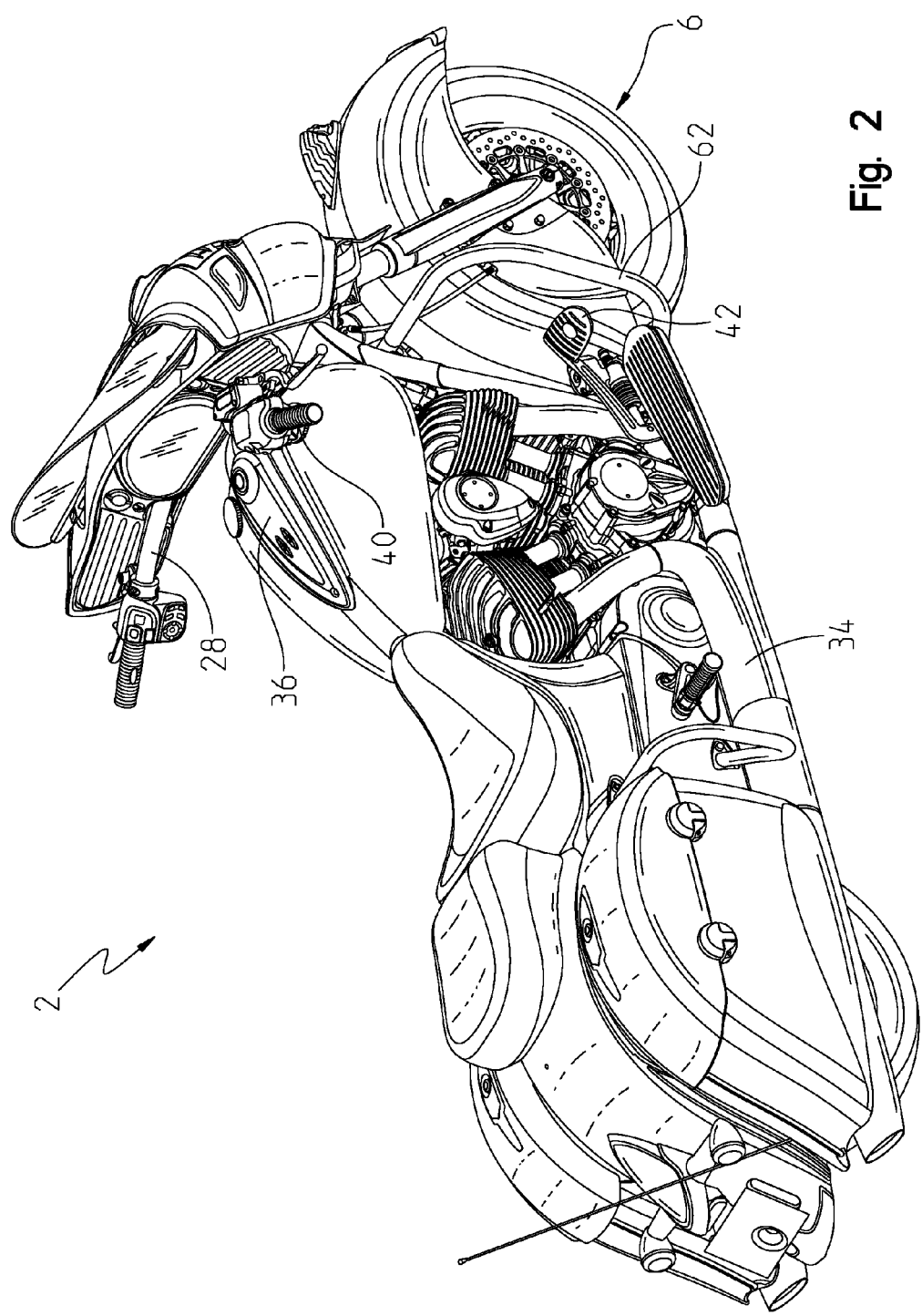
FIG. 2 is a right rear perspective view of the two-wheeled vehicle.
Figure 3:
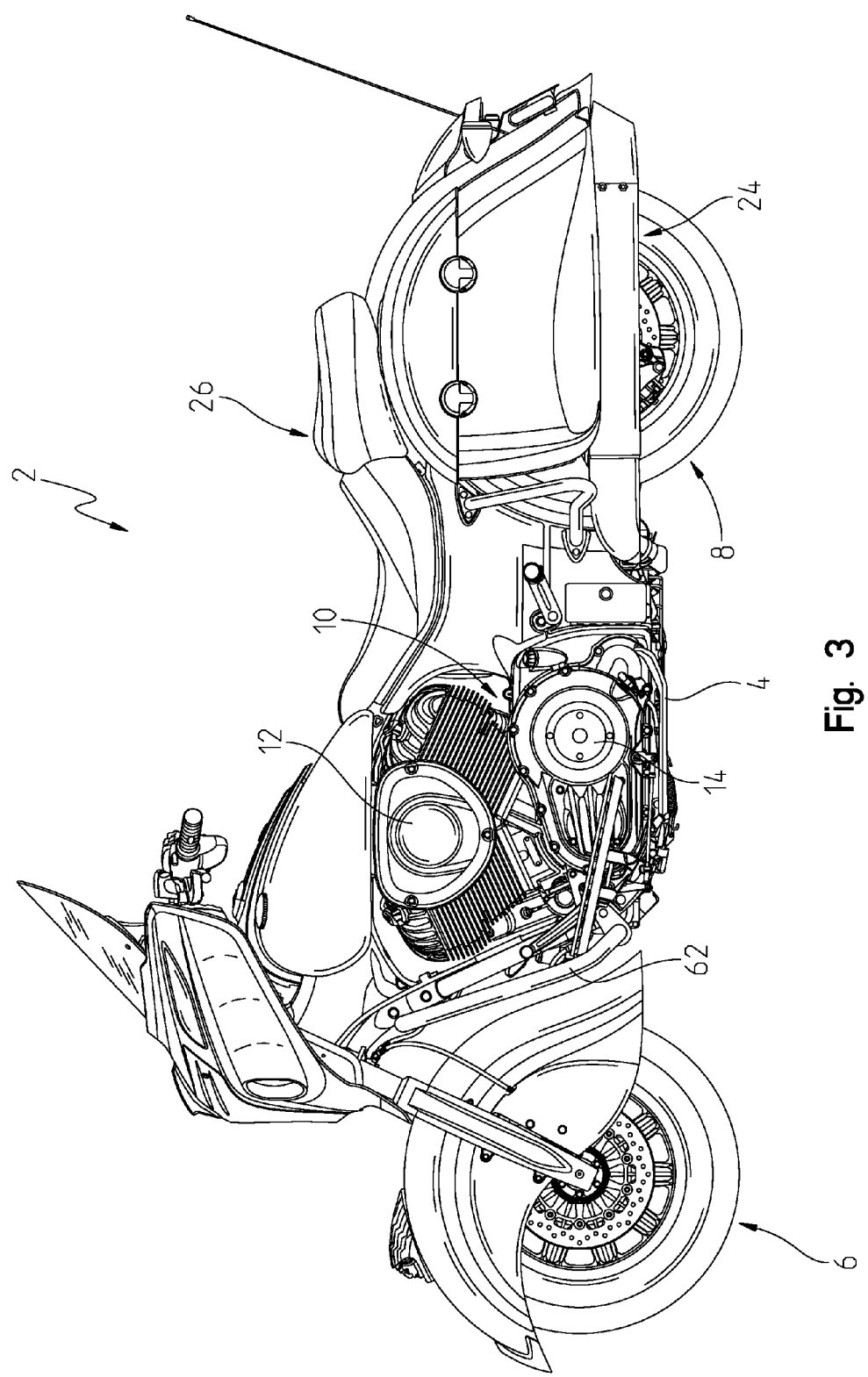
FIG. 3 is a left side view of an illustrative embodiment of the two-wheeled vehicle.
Figure 4:
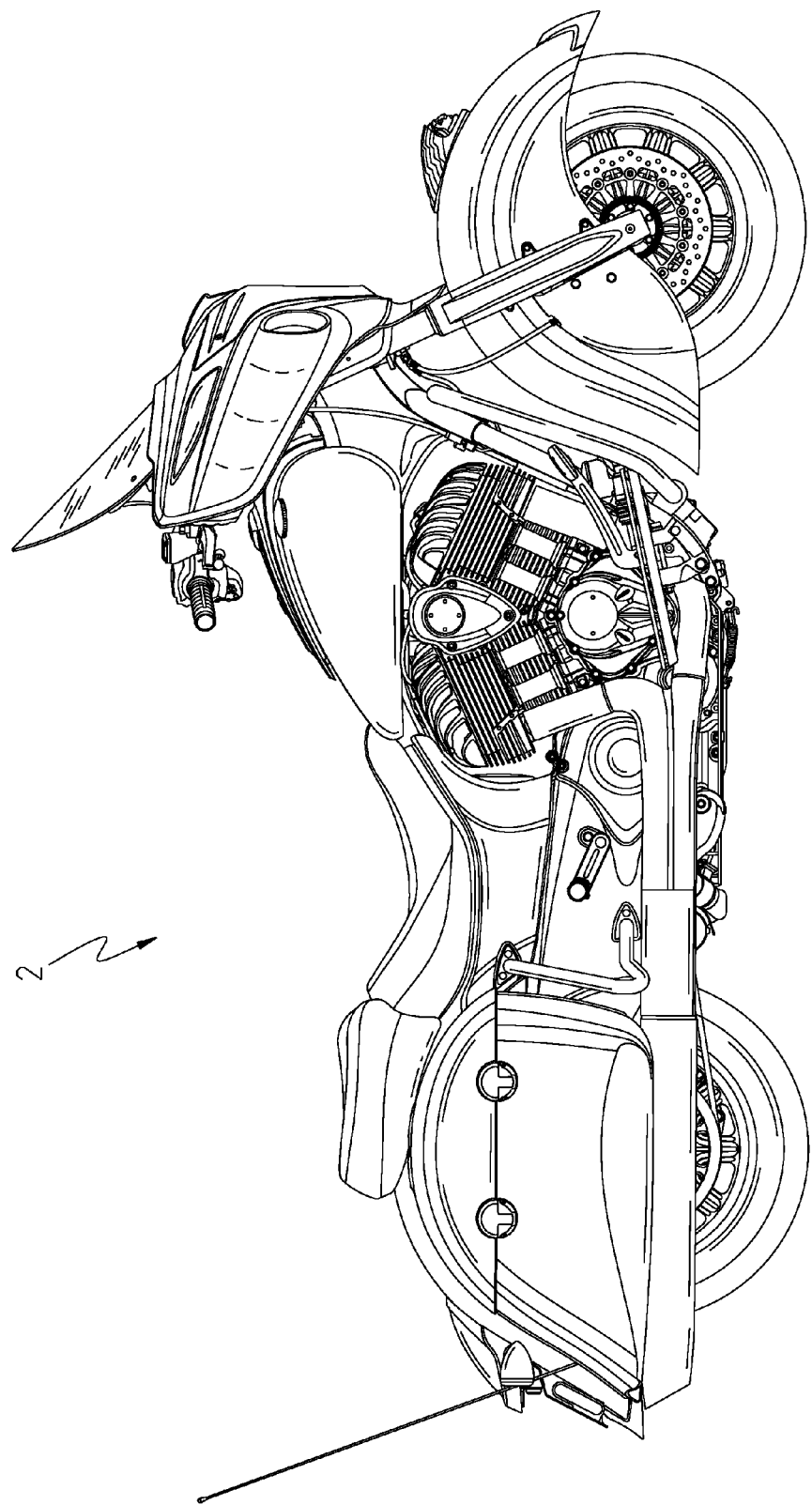
FIG. 4 is a right side view of an illustrative embodiment of the two-wheeled vehicle.
Figure 5:
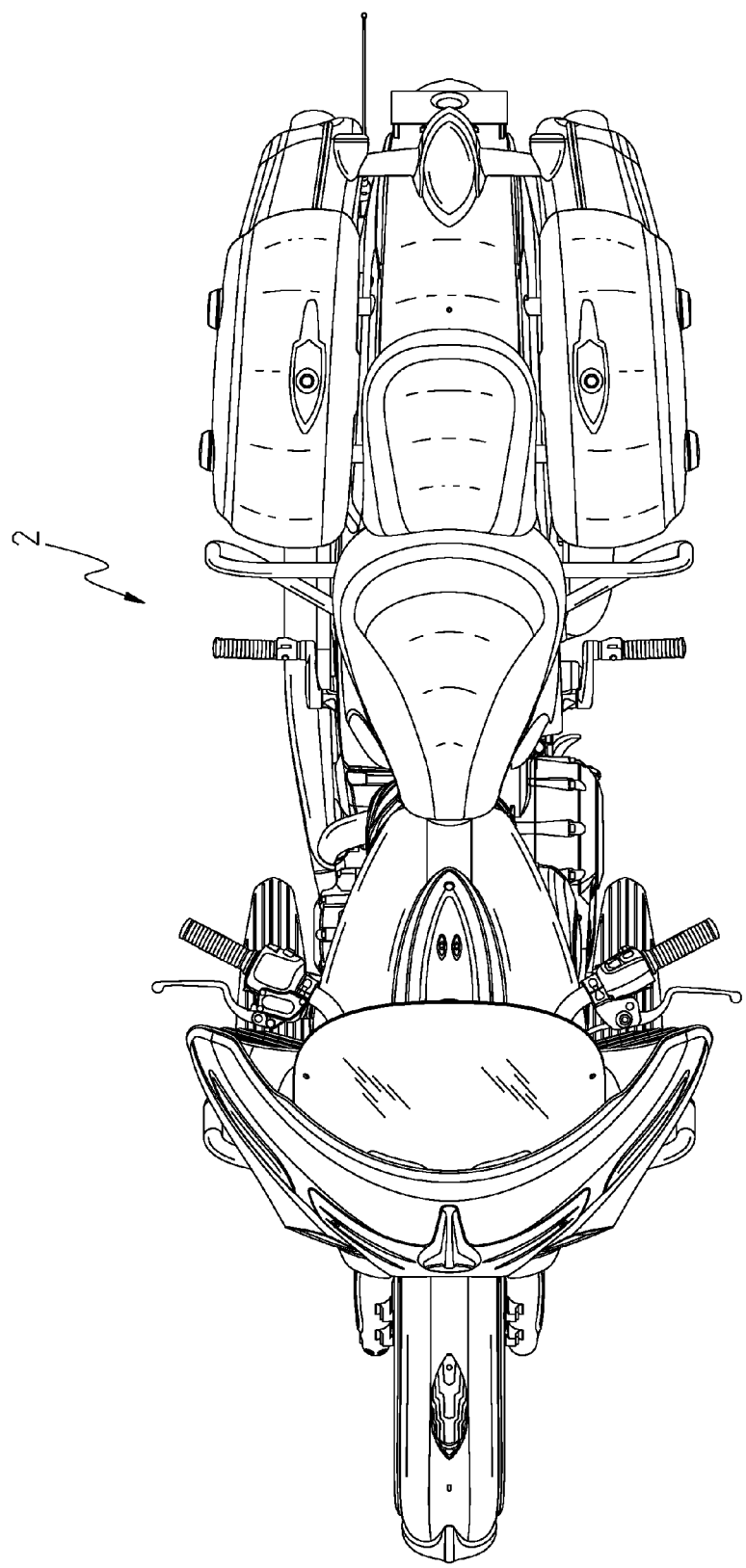
FIG. 5 is a top view of the two-wheeled vehicle of FIG. 1.
Figure 7:
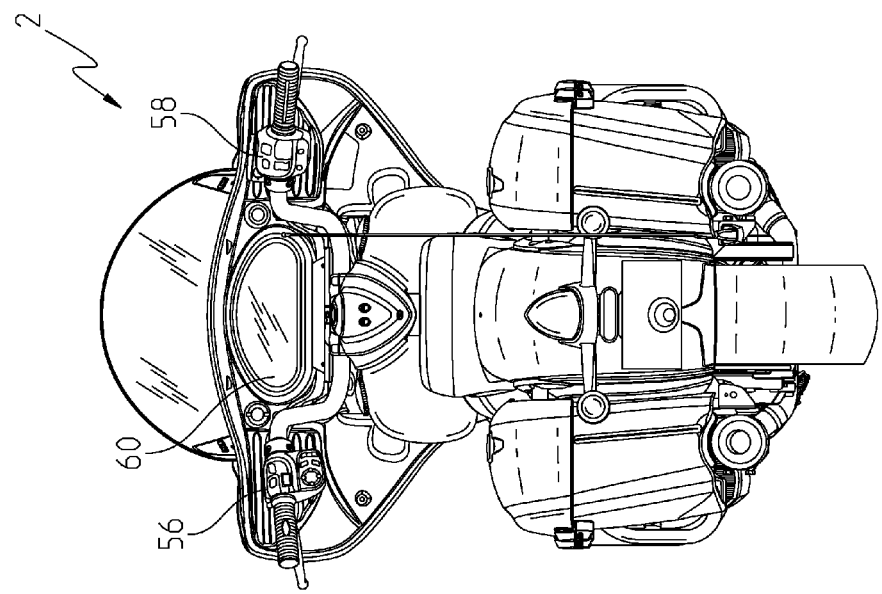
FIG. 7 is a rear view of the two-wheeled vehicle of FIG. 1.
Figure 6:
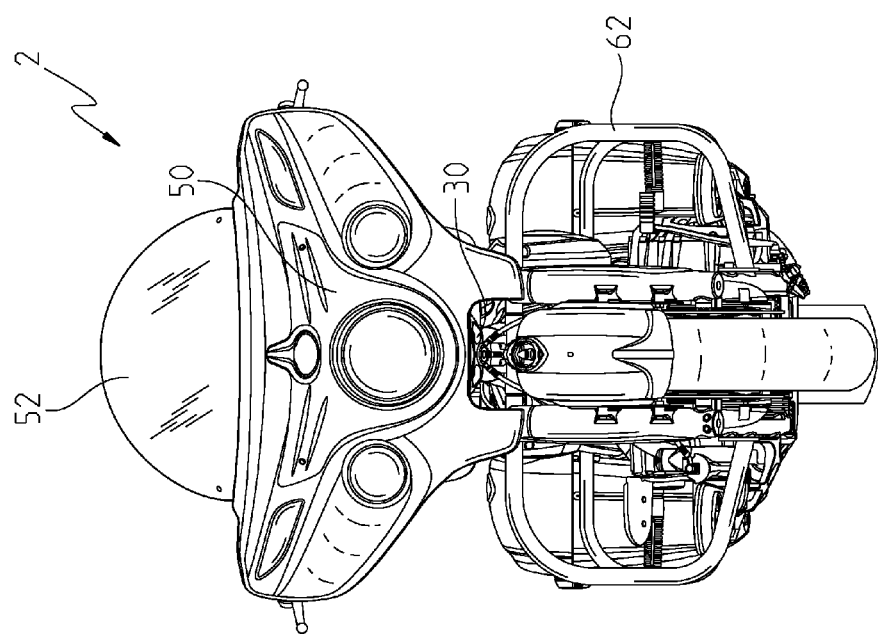
FIG. 6 is a front view of the two-wheeled vehicle of FIG. 1.
Figure 8:
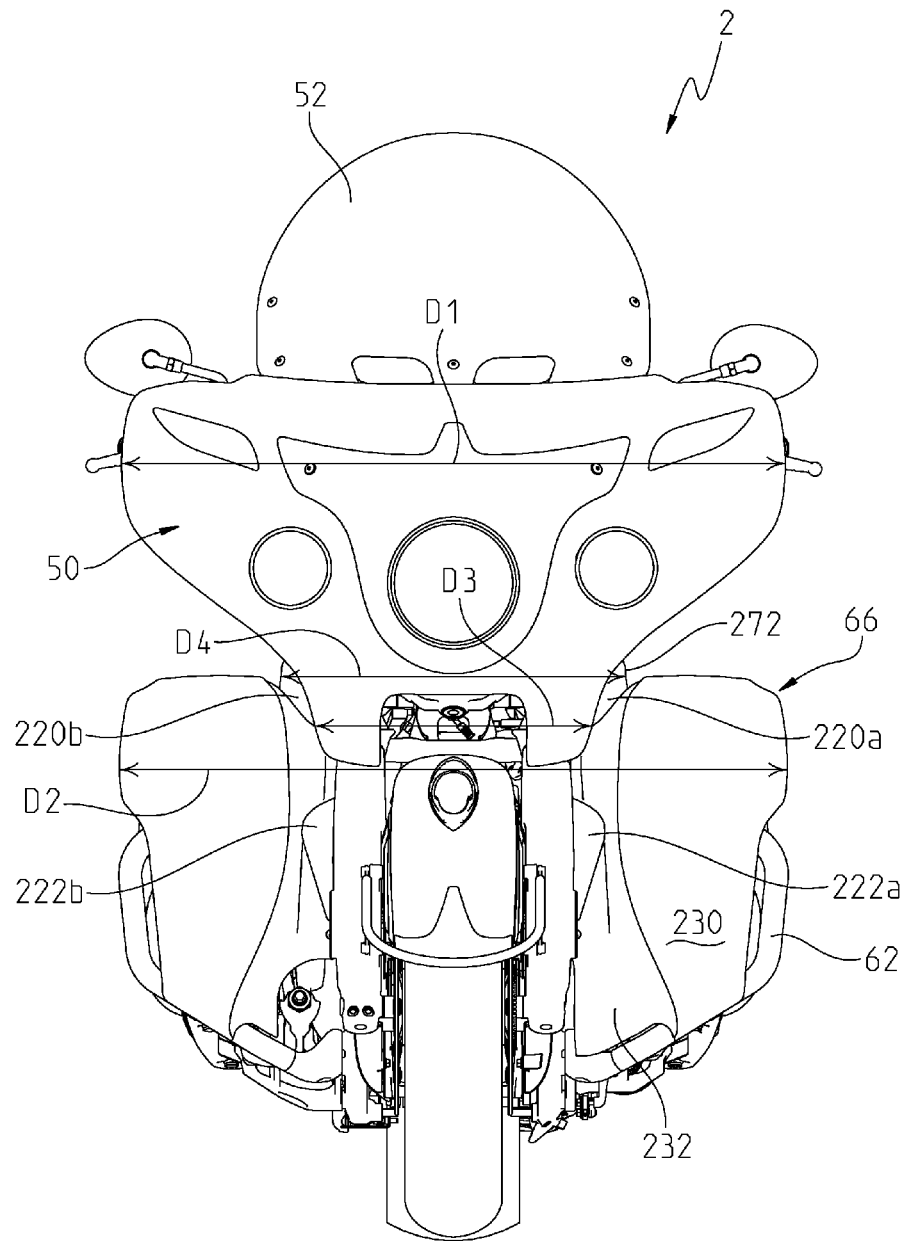
FIG. 8 is a view similar to that of FIG. 6, showing an upper fairing and a lower fairing on a cruiser motorcycle.

6 and 9). Engine operating systems are also included such as an air intake system 32 and exhaust system 34 (FIG. 2). Operator controls are also provided for operating and controlling vehicle 2, which may include vehicle starting system 36, vehicle speed controls 40 and vehicle braking systems 42. Safety systems may also be provided such as main lighting 44, front turn signals 46, and rear turn signals 48. Ergonomic systems may include front fairing 50, windshield assembly 52 and saddlebag assembly 54. Control systems may include control modules 56 and 58, and instrument cluster 60. Safety equipment may include highway bars 62. Referring to FIG. 8, motorcycle 2 is shown having an upper fairing 50 and a lower fairing 66.

Figure 9:
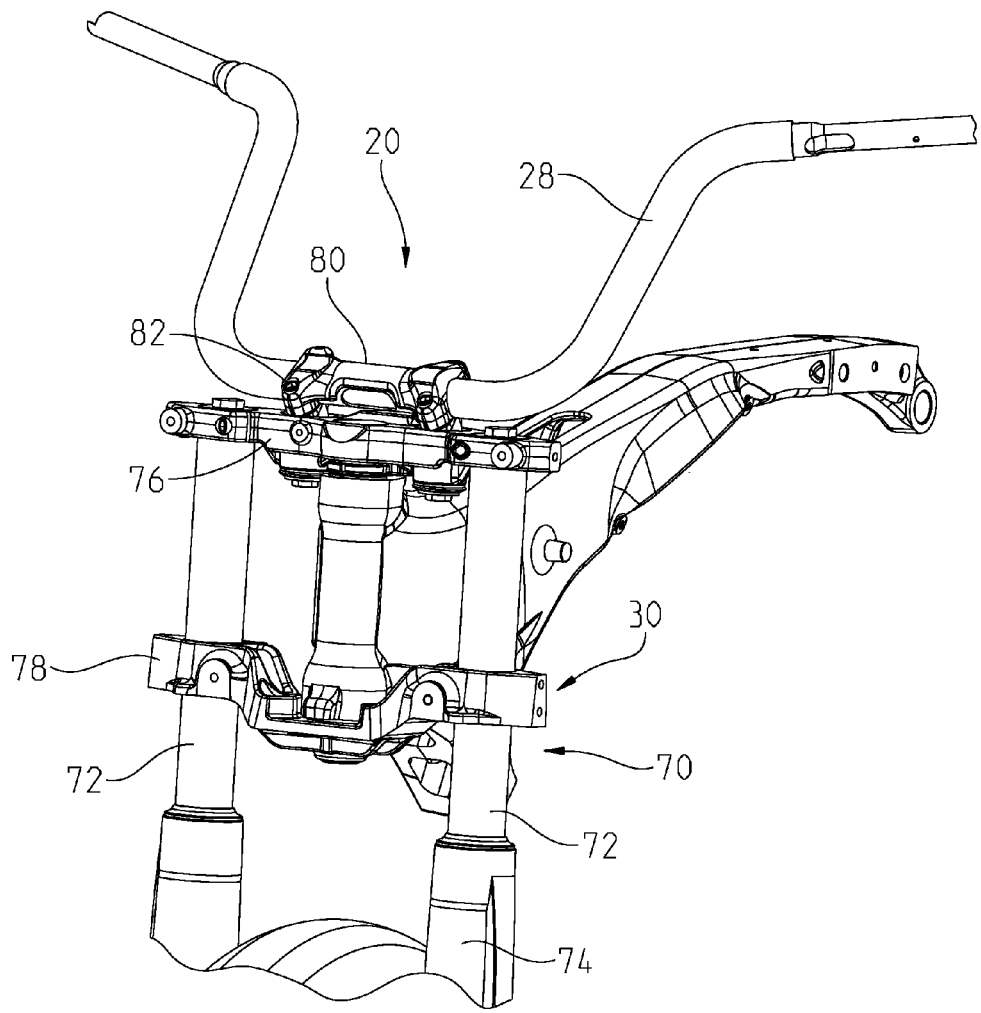
FIG. 9 is a front perspective view of a steering assembly of the illustrative vehicle.
Figure 10:
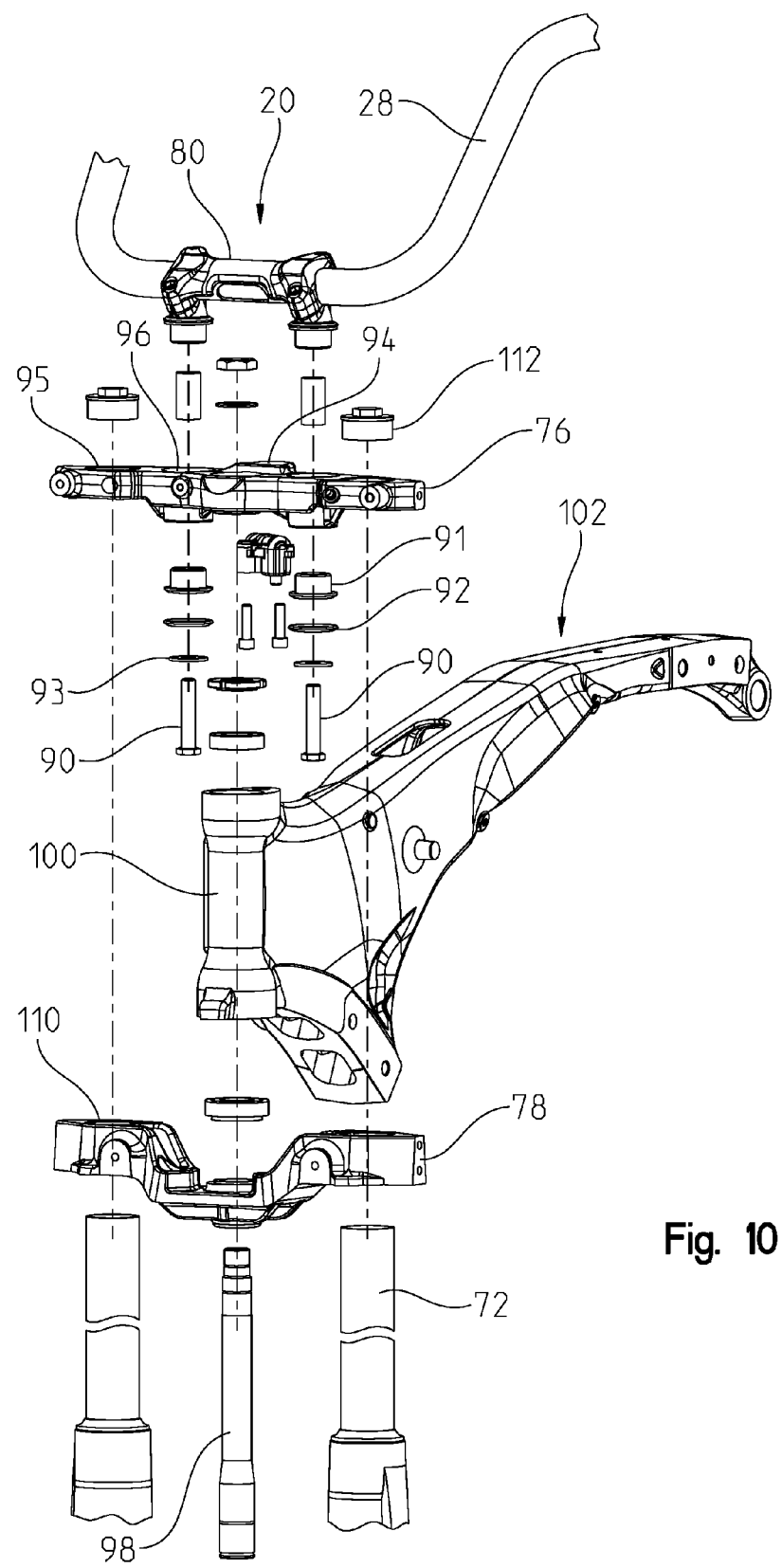
FIG. 10 is an exploded view of the steering assembly of FIG. 9.

Referring to FIGS. 9-10, steering assembly 20 is shown. Steering assembly 20 includes front fork assembly 70 having front fork members 72 operably coupled to handlebars 28 and triple clamp assembly 30. The outer diameter of front fork members 72 is smaller than the inner diameter of front shocks 74 and, as such, front fork members 72 are received within front shocks 74 and telescope or move relative thereto as front wheel 6 moves along a surface.

Front fork members 72 are coupled together through the front wheel axis and triple clamp assembly 30. As such, front fork members 72 move together when the operator is steering motorcycle 2 with handlebars 28. Triple clamp assembly 30 includes an upper clamp member 76 and a lower clamp member 78. Lower clamp member 78 is positioned between front shocks 74 and upper clamp member 76. Upper clamp member 76 is positioned below handlebars 28.

Handlebars 28 include a clamp 80 which is coupled to handlebars 28. Clamp 80 is secured to handlebars 28 by way of fasteners 90 (FIG. 10), which extend through bearings 92, spacers 94 and washers 96. Illustratively, fasteners 90 are bolts. Handlebars 28 and/or bracket 80 may include vibration isolating members in order to dampen the vibration from motorcycle 2 felt by the operator.

Upper clamp member 76 also includes a central opening 92 and outer openings 94. Central opening 92 is positioned between openings 96 and outer openings are positioned outward from openings 96. As such, openings 96 are positioned between central opening 92 and outer openings 94. Central opening is configured to secure a steering shaft 98 of steering assembly 20 to triple clamp assembly 30.

Steering shaft 98 is positioned between upper and lower clamp members 76, 78. More particularly, steering shaft 98 is positioned within head tube 100 of mainframe tube 102. Steering shaft 98 is configured to rotate within head tube 100 to transmit motion from handlebars 28 to triple clamp assembly 30. Steering shaft 98 is angled at the same rake angle as head tube 100. Steering shaft 98 is coupled to head tube 100 and to triple clamp assembly 30.

Outer openings 94 of upper clamp member 76 are configured to secure front fork members 72 to triple clamp assembly 30. More particularly, front fork members 72 are received through outer openings 110 of lower clamp member 78 and extend toward upper clamp member 76. The top ends of front fork members 72 are positioned within outer openings 94 of upper clamp member 76 and are secured thereto with couplers 114.

In operation, steering assembly 20 is controlled by the operator via handlebars 28. As the operator moves handlebars 28, front fork assembly 70 moves as a unit in a similar manner. As such, handlebars 28 rotate steering shaft 98 and both front fork members 72 which then moves front wheel 6. With reference now to FIGS. 8-25, upper fairing assembly 50 and lower fairing assembly 66 will be described in greater detail.

Referring first to FIGS. 11-15, front fairing 50 covers a portion of steering assembly 20, including a portion of front fork members 72, triple clamp assembly 30, and handlebars 28. Front fairing 50 includes an outer panel 120, an inner panel 122, a support bracket 124, and an intermediate panel 126. Outer panel 120 may be comprised of a polymeric and/or metallic material. As shown best in FIG. 14, outer panel 120 includes a plurality of openings for receiving accessories, such as lighting units. For example, outer panel 120 includes an opening 128 for a headlight unit 130, openings 132 for secondary lighting units 134, and openings 136 for turn signal lighting units 138. Lighting units 130, 134, and 138 are generally flush with outer panel 120 such that lighting units 130, 134, and 138 are generally integral with outer panel 120 and do not protrude outwardly therefrom.

Figure 11:
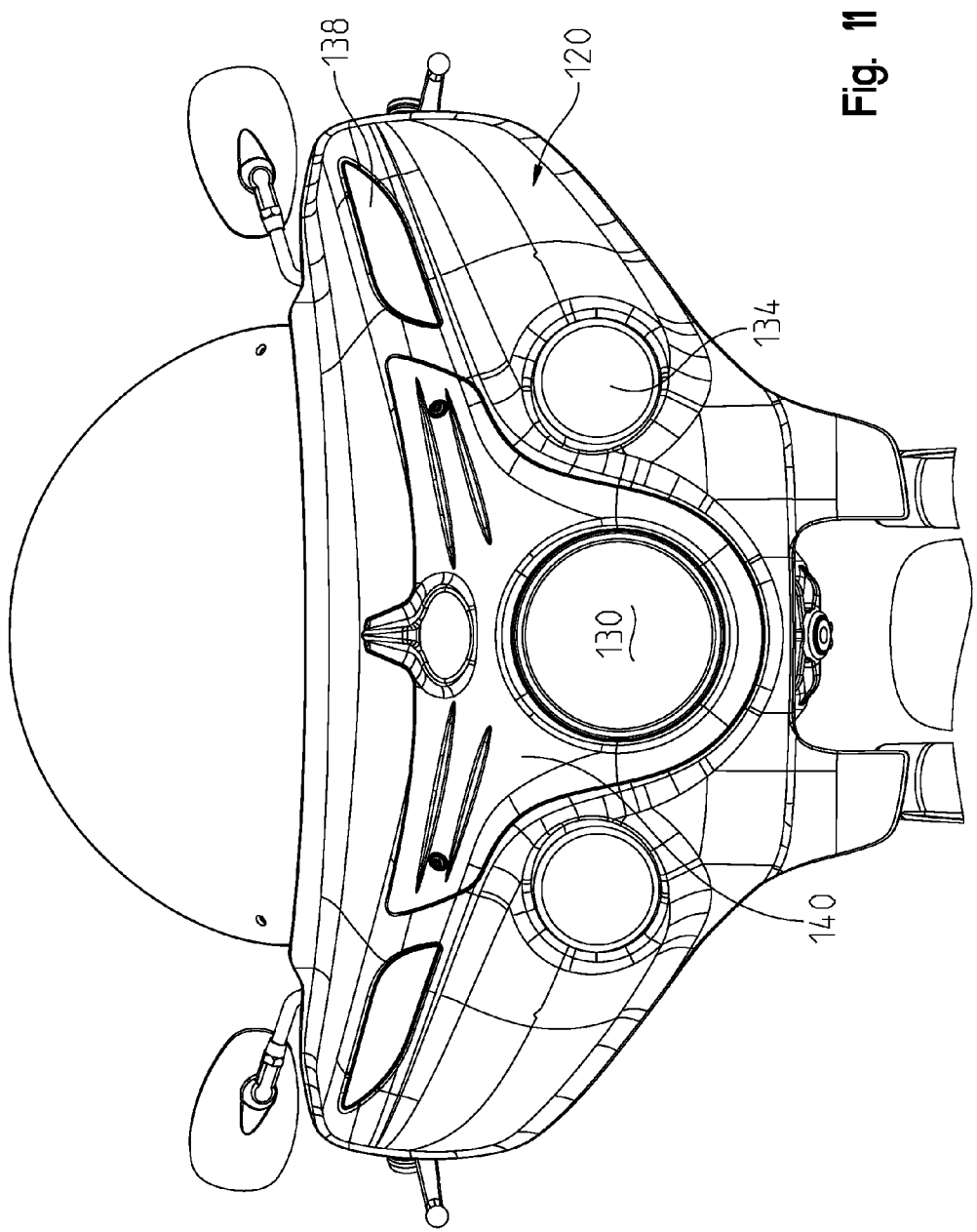
FIG. 11 is a front view of a upper fairing and a windshield assembly.

Outer panel 120 also is configured to support a cover member 140 which, as shown in FIG. 11, supports headlight unit 130. Cover member 140 is secured to outer panel 120 with lower brackets 142 FIG. 14). Cover member 140 may include additionally accessories, for example, cover member 140 may include a logo, sign, indicia, marking, or other emblem.

Figure 15:
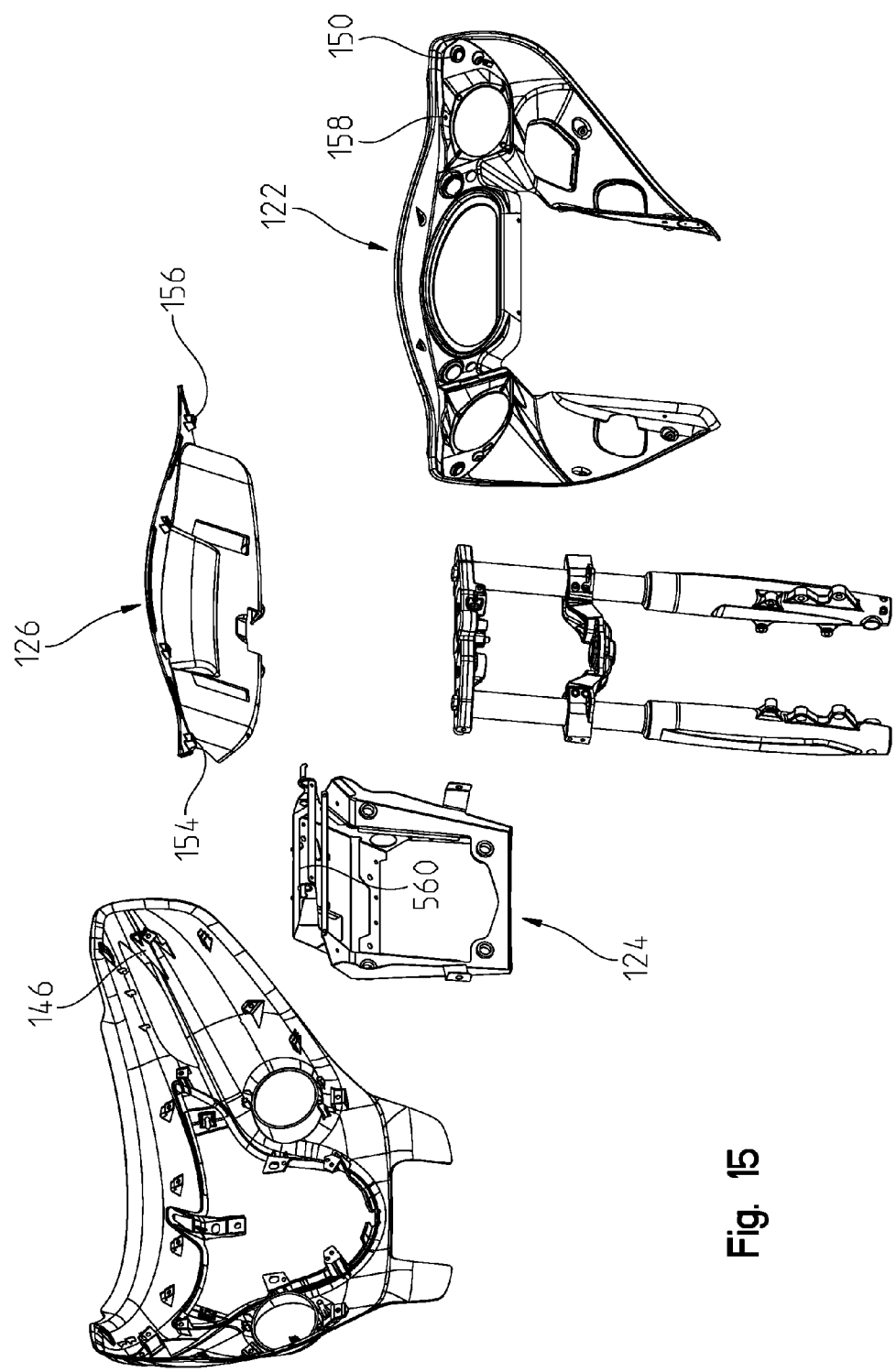
FIG. 15 is a rear exploded view of the upper fairing assembly of FIG. 14.

Outer panel 120 is coupled directly to intermediate panel 126. Outer panel 120 is also coupled to inner panel 122. As such, inner panel 122 and intermediate panel 126 support the load of outer panel 120 because outer panel 120 is not coupled to support bracket 124 or triple clamp assembly 30. Referring to FIG. 15, the rear surface of outer panel 120 also includes tabs 146, each of which includes an aperture for coupling outer panel 120 to inner panel 122. Apertures 148 generally correspond to apertures 150 on inner panel 122. Apertures 148 are aligned with apertures 150 in order to receive conventional fasteners therethrough for coupling outer panel 120 to inner panel 122.

Inner panel 122 is also coupled to intermediate panel 126. As shown in FIG. 15, intermediate panel 126 includes brackets 154, each of which has an aperture 156. Illustratively, intermediate panel 126 includes four brackets 154 and four apertures 156. Apertures 156 align with apertures 158 at an upper end of inner panel 122. Apertures 156 and 158 receive conventional fasteners for coupling intermediate panel 126 to inner panel 122. Inner panel 122 is further coupled to intermediate panel 126 through a plurality of tongue-and-groove connections. As such, inner panel 122 and intermediate panel 126 are coupled together with conventional fasteners at aperture 156 and 158.

Figure 14:
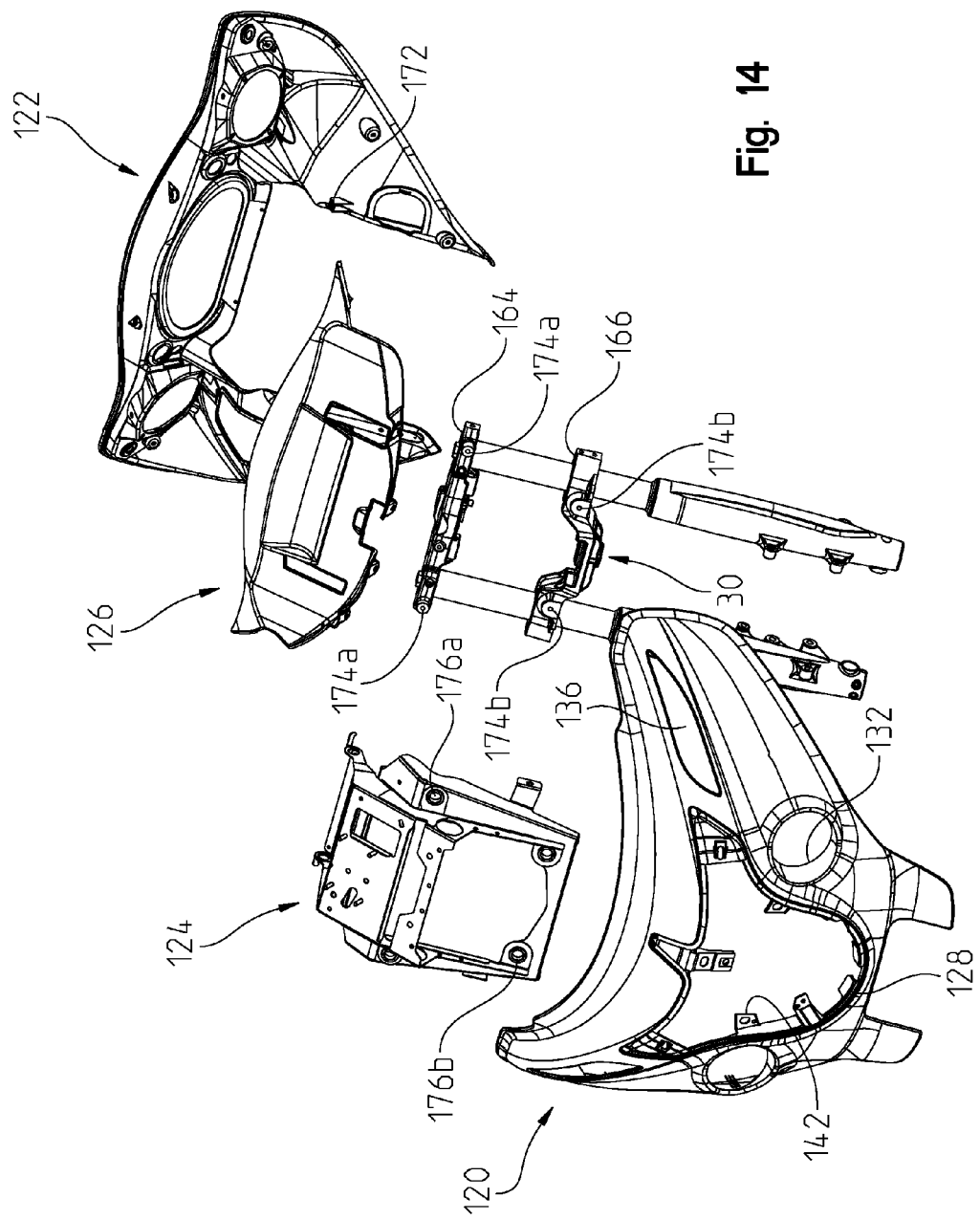
FIG. 14 is a front exploded view of the upper fairing assembly of FIG. 11.

Inner panel 122 also may be coupled to triple clamp assembly 30 through brackets 164 on upper clamp member 76 and brackets 166 on lower clamp member 78. As shown in FIG. 14, brackets 164 on upper clamp member 76 may include at least one aperture. Similarly, brackets 166 on lower clamp member 78 may include at least one aperture. Inner panel 122 may include at least one aperture 172 (FIG. 14) that align with apertures in brackets 164, 166 in order to couple inner panel 122 to triple clamp assembly 30.

Support bracket 124 couples with triple clamp assembly 30. As shown in FIGS. 11-15, triple clamp assembly 30 includes apertures 174 and, illustratively, includes four apertures 174, for coupling triple clamp assembly 30 to support bracket 124. More particularly, upper clamp member 76 includes two apertures 174a and lower clamp member 78 includes two apertures 174b. Support bracket 124 includes apertures 176 and, more particularly, includes four apertures 176. Illustratively, support bracket includes upper apertures 176a that align with apertures 174a, and lower apertures 176b that align with apertures 174b. Conventional fasteners are received through apertures 174, 176 for coupling support bracket 124 to triple clamp assembly 30. Additionally, inner panel 122 is coupled to support bracket 124.

Front fairing 50 is configured to support a plurality of accessories and controls. For example, as shown in FIGS. 11-15 and shown best in FIG. 13, inner panel 122 includes openings or cut-out portions 190 for speakers 192 (FIG. 12), openings 194 for gauges and/or display screens 196, openings 198 for various controls and openings 200 for additional accessories or components. Further controls and accessories may be positioned on handlebars 28, which extend rearwardly from inner panel 122. For example, and as further described herein, controls for a cruise control function may be supported on handlebars 28. Also, a clutch lever 208 is positioned at left-side handlebar 206 and brake lever 210 is positioned at right-side handlebar 204. As such, the various controls for operating motorcycle 2 are easily accessible to the operator.

Both right-side and left-side handlebars 204 and 206 (FIG. 12) include grips 212, 214. Grips 212, 214 may be heated as further described herein.

With reference now to FIGS. 8 and 16-25, the lower fairing 66 will be described in greater detail. With reference first to FIG. 8, lower fairing assembly 66 includes deflectors 220, namely, a left deflector 220A and a right deflector 220B. Lower fairing assembly 66 also includes a lower left vent 222A and a lower right vent 222B. As shown, fairing assembly 66 includes an outer shell portion 230 coupled to an inner shell 232 by way of fasteners. As shown, inner shell 232 includes inner bosses 240, 242 (FIG. 16), which receives clamps for coupling lower fairing assembly 66 to highway bars 62.

Figure 16:
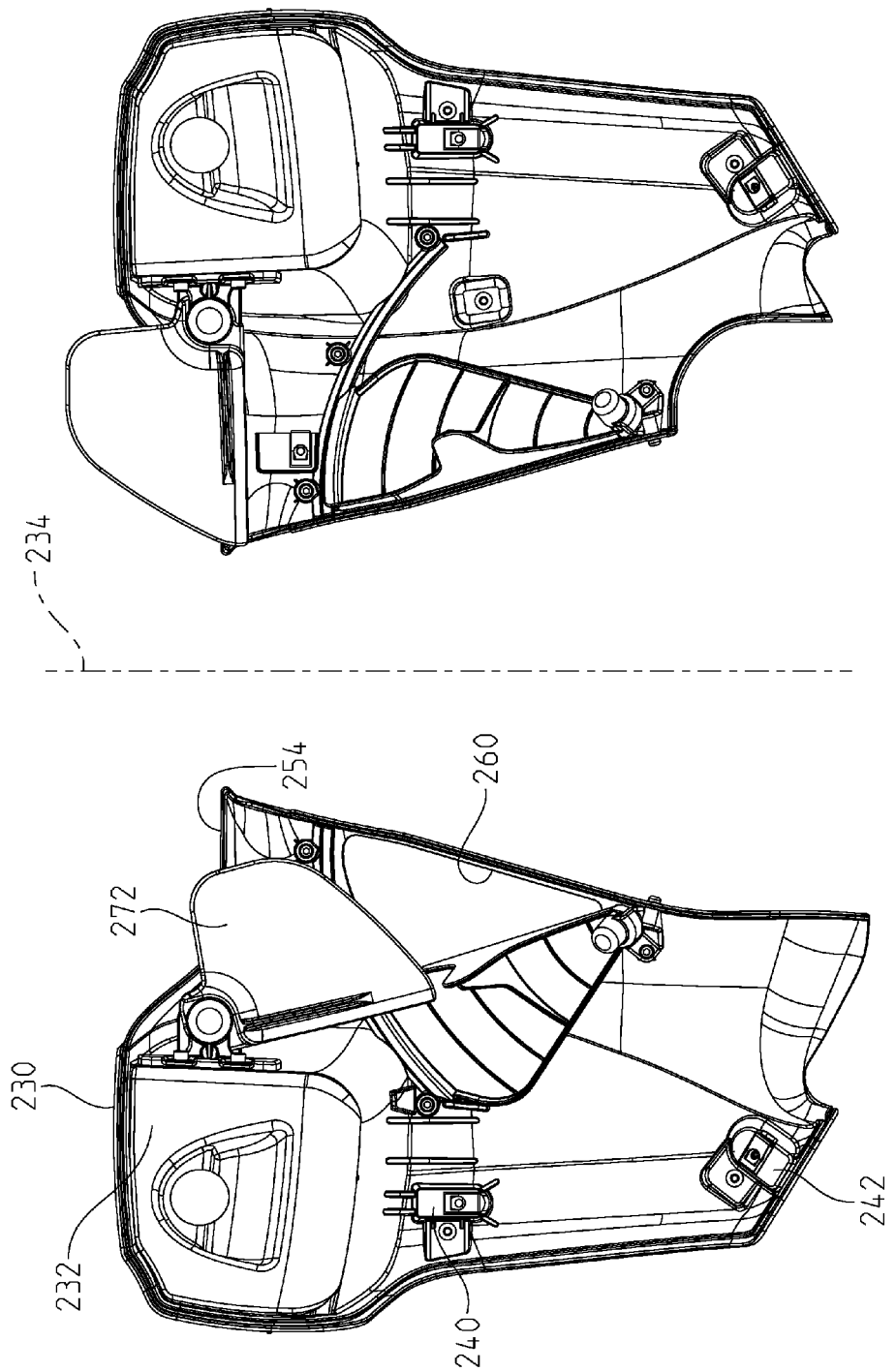
FIG. 16 is a rear view of the left and right side of the lower fairing.
Figure 17:
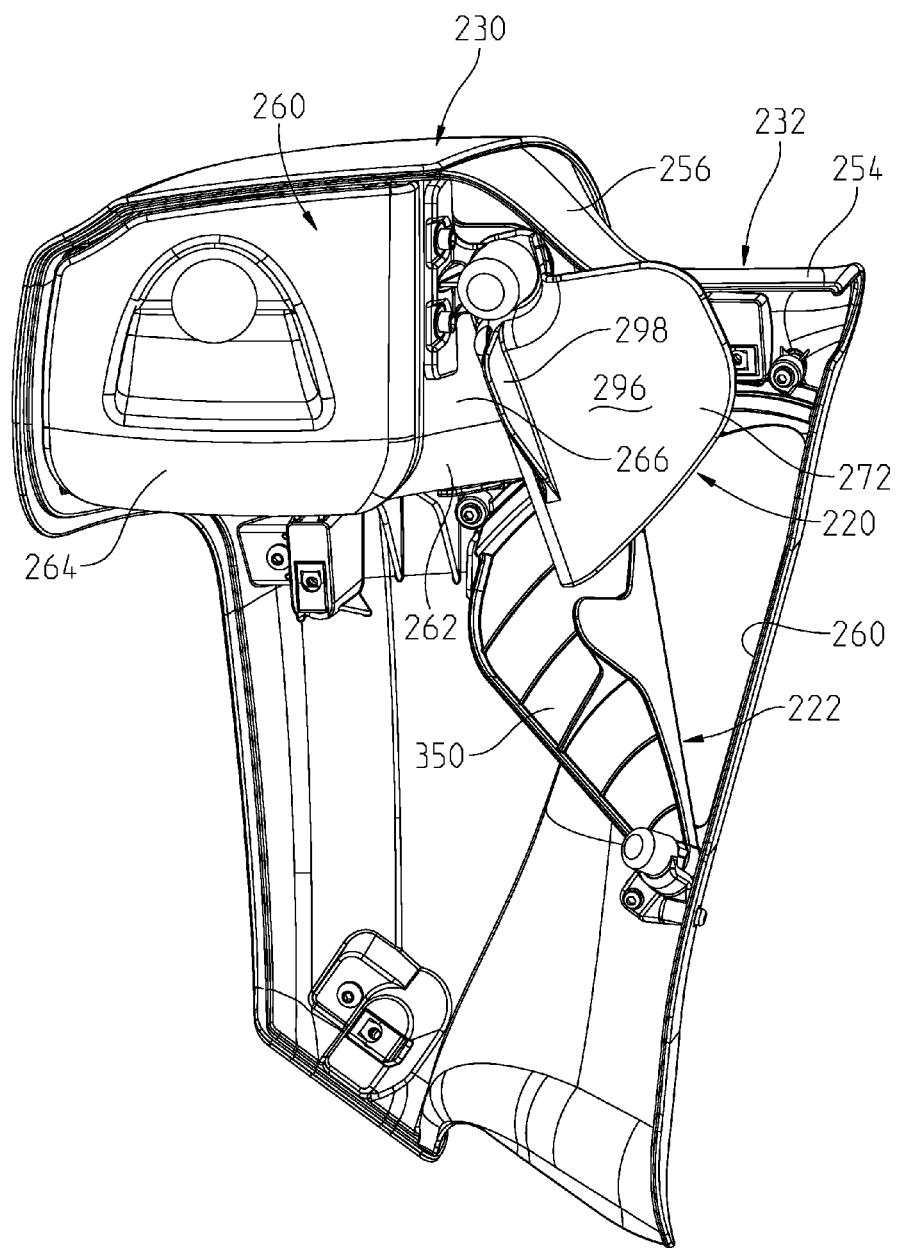
FIG. 17 is a rear perspective view of the left side of the lower fairing with the deflector and vent shown in open positions.
Figure 18:
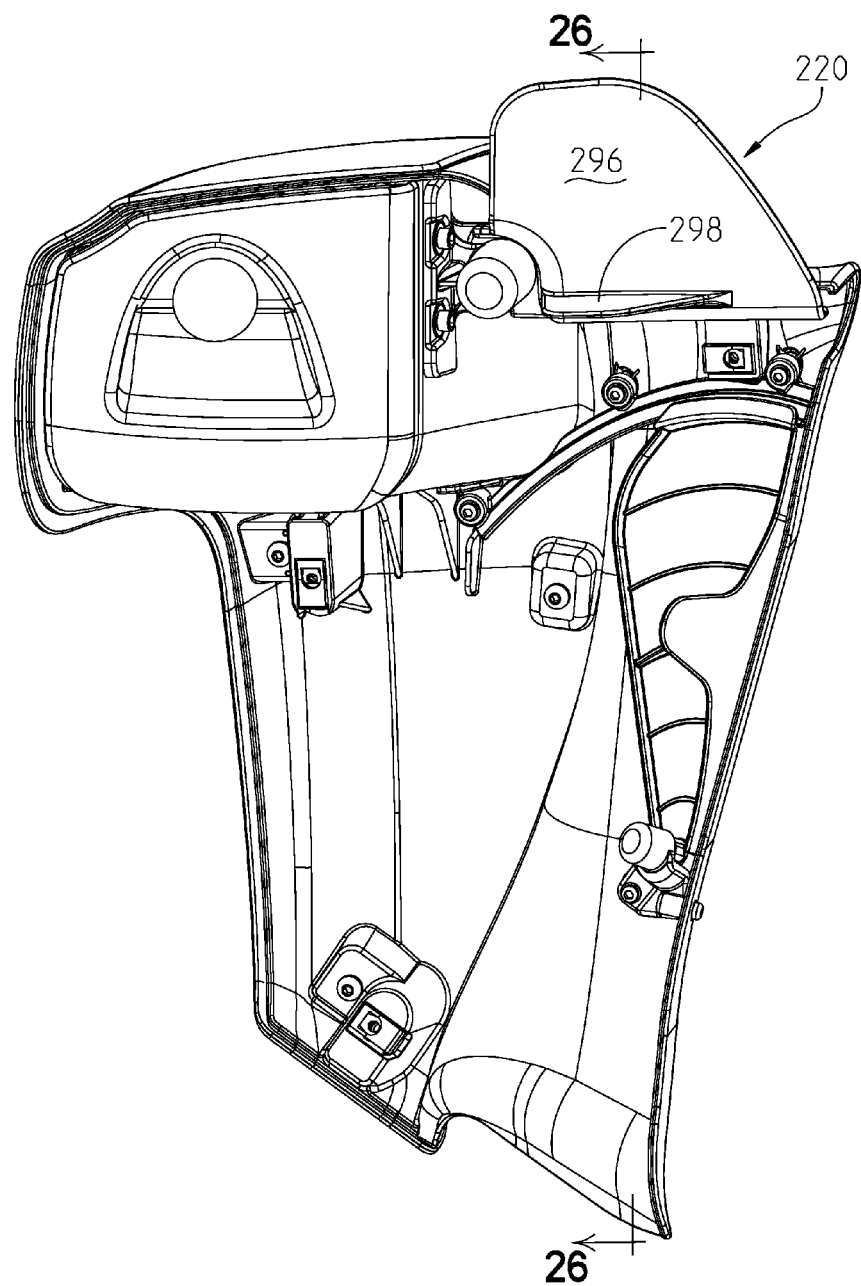
FIG. 18 is a rear perspective view of the left side of the lower fairing with the deflector and vent shown in closed positions.
Figure 19:
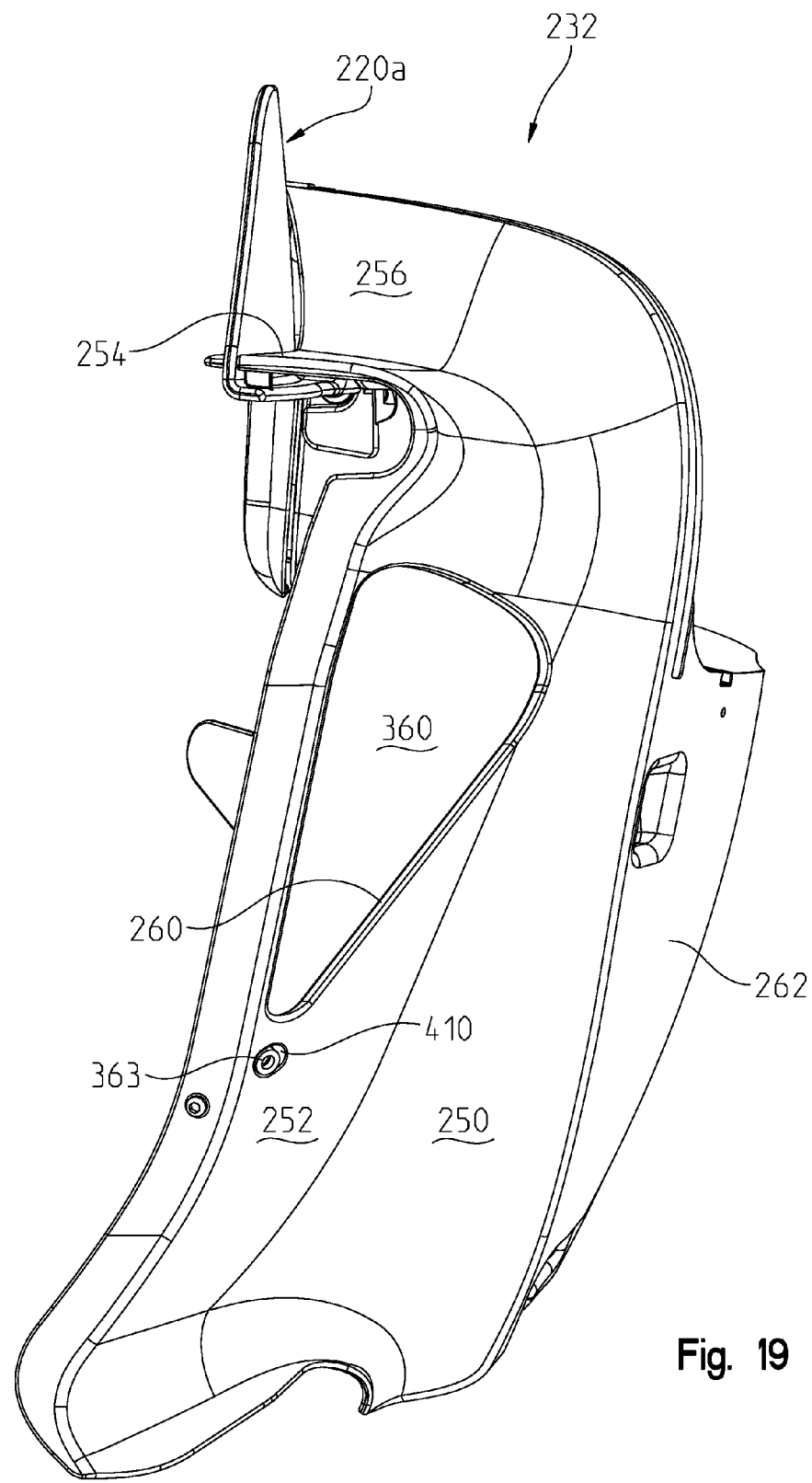
FIG. 19 shows a front perspective view of the left side of the lower fairing showing the contour of an inner portion of the lower fairing.

With reference to FIG. 19, inner shell portion 232 is shown having a front contoured wall 250, which curves inwardly towards the front wheel. The contoured wall 250 leads into a generally planar wall 252, which is generally transverse to a longitudinal axis of the vehicle. Wall 252 leads into a generally horizontally extending wall 254, which can also be seen in FIG. 16. Meanwhile, arcuately shaped wall 252 extends upwardly and defines an angled wall 256 coupled to wall 254, which defines a flow path for air. Vent opening 260 is positioned in and through wall 252 and is approximately at a midpoint of inner portion 232. Inner portion 232 also includes an extension 262 extending from the side thereof to which outer portion 230 may be coupled. As also shown in FIG. 17, inner portion 232 includes an integrated compartment 260 comprising a box portion 262 and an outer hinged cover at 264. Box portion 262 includes sidewall 266 to which deflector assembly 220 is coupled.

Figure 20:
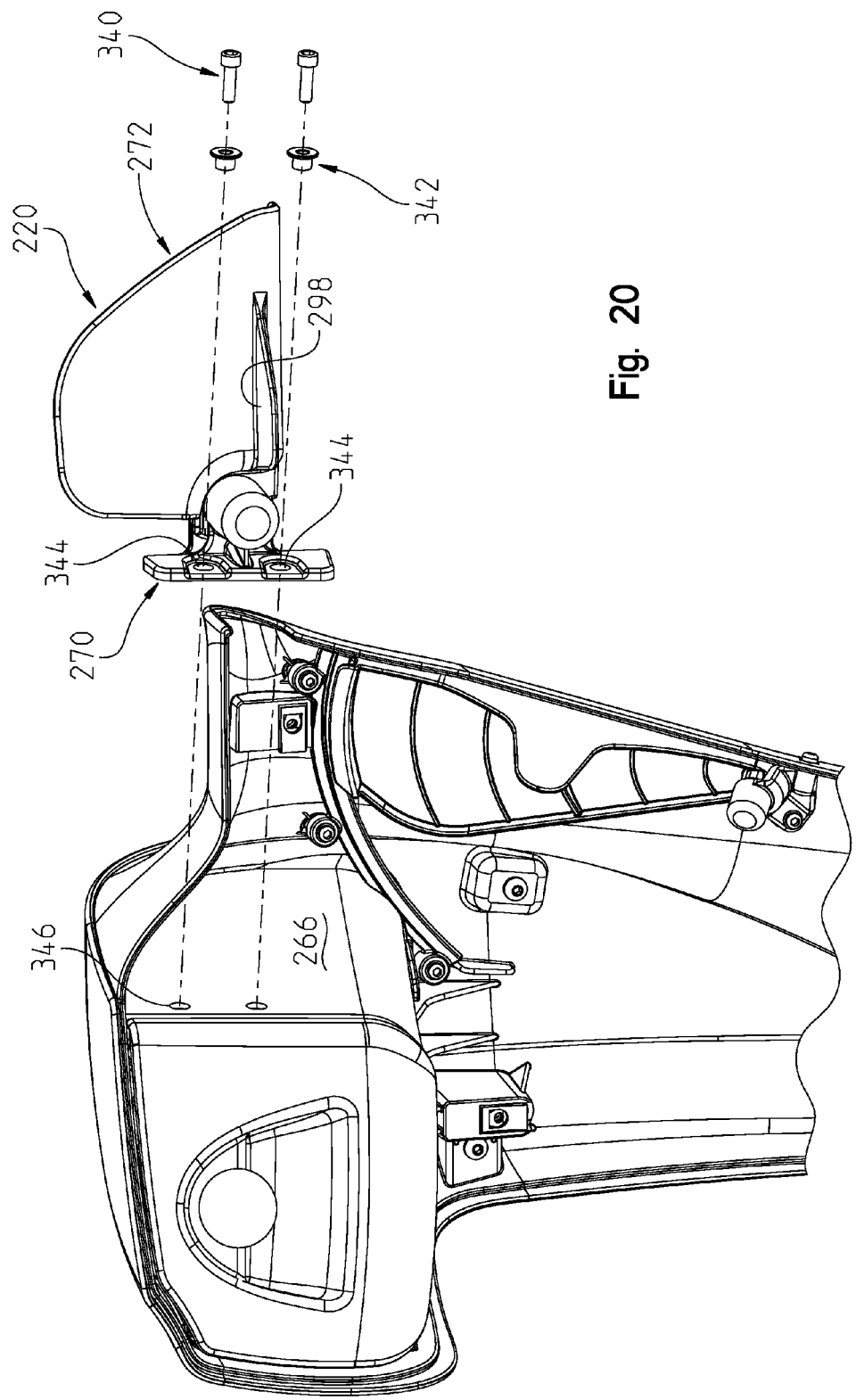
FIG. 20 is a rear perspective view of the left side of the lower fairing with the deflector shown exploded from the lower fairing.
Figure 21:
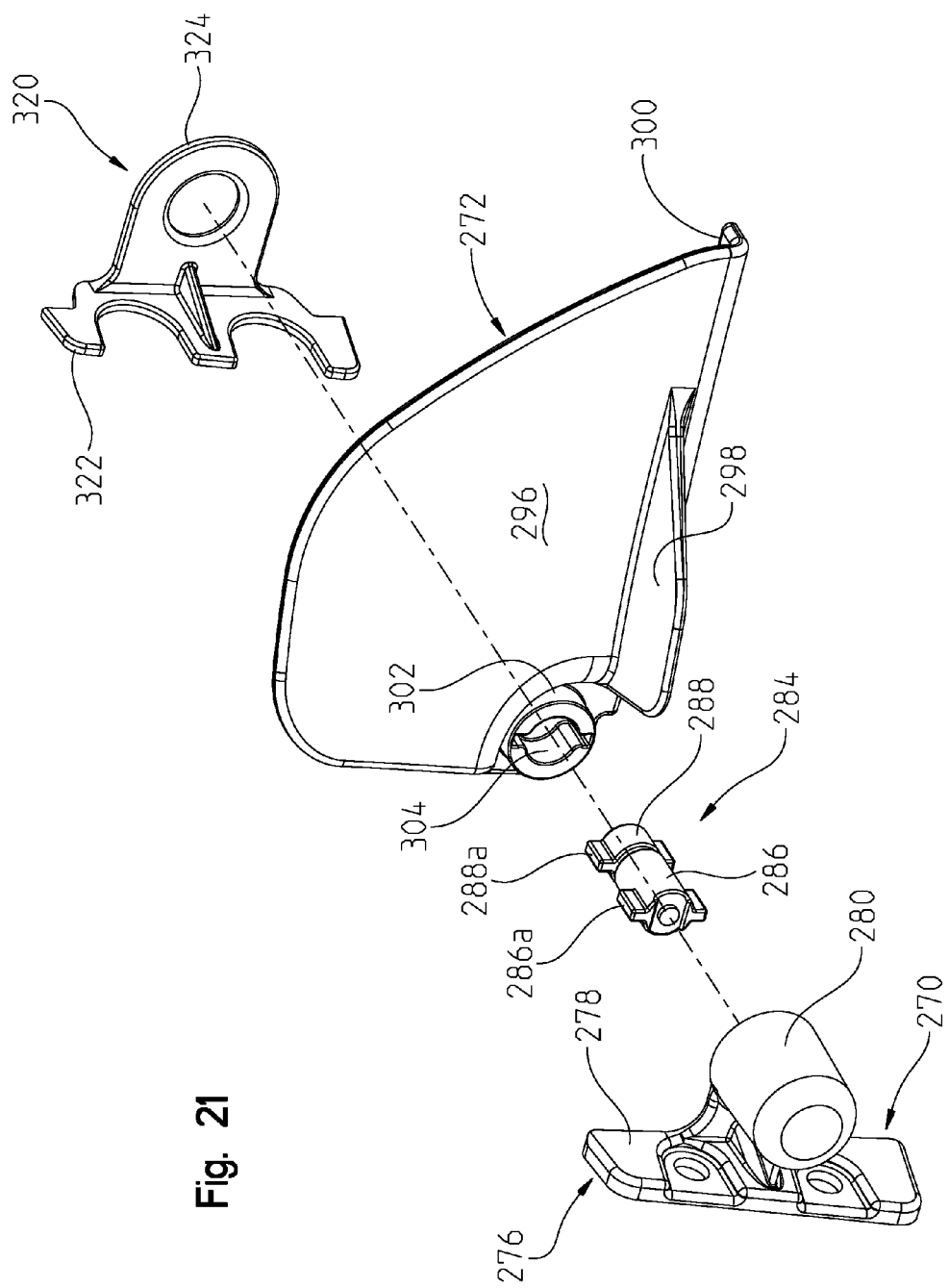
FIG. 21 shows an exploded view of the deflector assembly.
Figure 22:
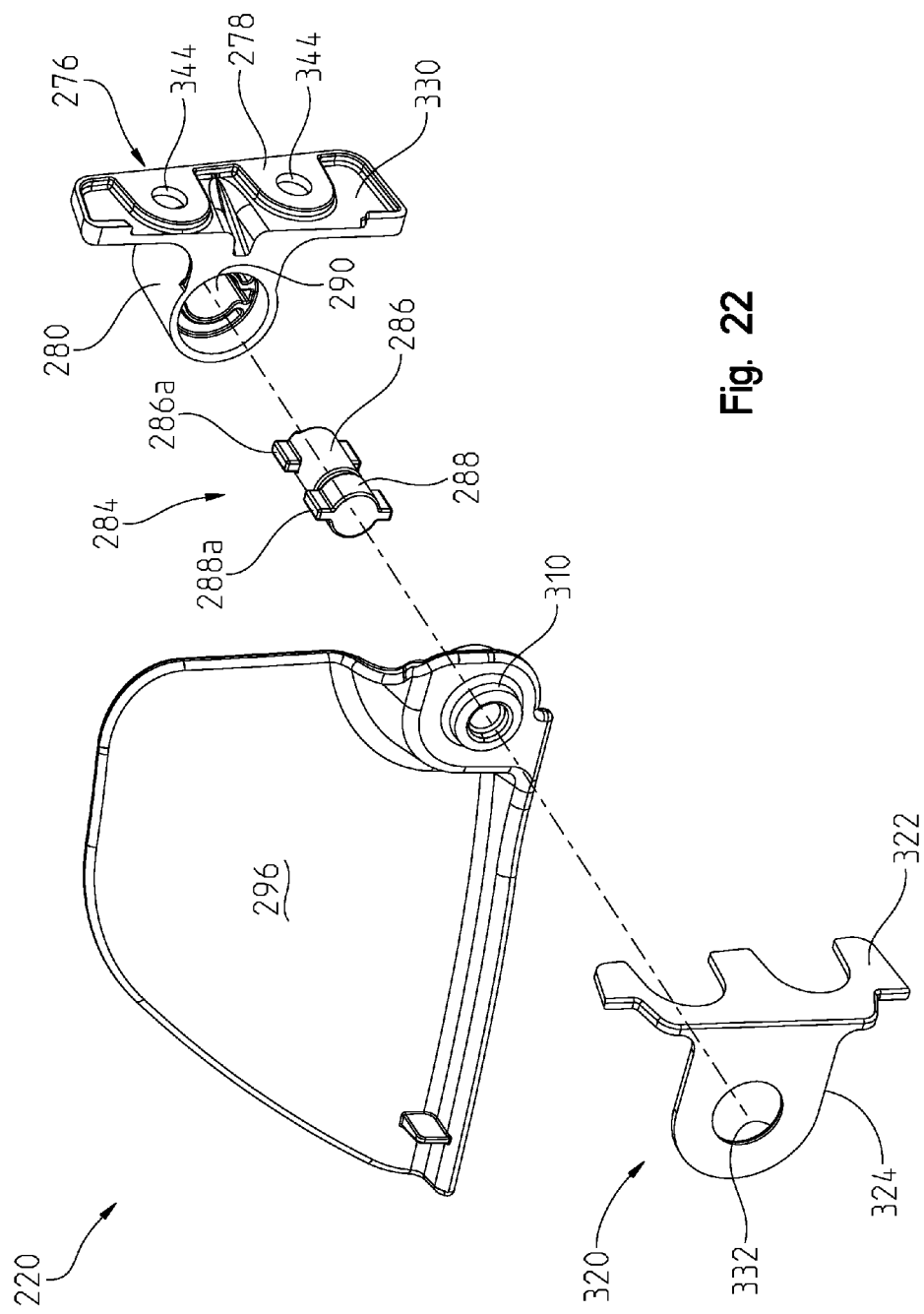
FIG. 22 shows an exploded view of the deflector assembly from an opposite side as that shown in FIG. 21.

With reference now to FIGS. 20 and 21, deflector assembly 220 is shown in greater detail. As shown in FIG. 20, deflector assembly 220 generally includes a flange 270 and a deflector member 272. As shown in FIG. 21, hinge 270 includes hinge portion 276 having a flange 278 supporting a trunnion 280. An axle member 284 is provided having portion 286, 288 being frictionally rotatable relative to each other and have aligning tabs 286A, 288A. As shown best in FIG. 22, trunnion 280 includes an opening 290 profiled to receive portion 286. With reference again to FIG. 21, deflector member 272 includes a deflector plate 296 having a handle 298 coupled directly thereto and a forwardly projecting stop wall 300. An integrated collar 302 is provided having an opening 304 similarly profiled as opening 290 to receive portion 288 of axle member 284. On a backside thereof (and as best shown in FIG. 22), deflector plate 296 includes an integrated boss 310, which is aligned with axle member 284 and with trunnion 280.

Hinge 276 further includes a complimentary hinge portion 320 having a flange portion 322 and an upstanding wall 324. As shown best in FIG. 22, flange portion 278 includes a profiled recess 330, which is profiled to receive flange portion 322; thus the deflector assembly 220 may be assembled by positioning axle member 284 in collar 302 (FIG. 21), placing axle 284 within trunnion 280, placing aperture 332 of flange portion 320 over boss 310 and placing flange portion 322 in profiled recess 330. Fasteners 340 (FIG. 20) and washers 342 are then received through apertures 344 and into threaded openings 346 of sidewall 266. In this manner, an operator can grip the handle 298 and move the deflector from a fully open position as shown in FIG. 17, or rotated upwardly and counterclockwise to the fully closed position shown in FIG. 18.

Figure 23:
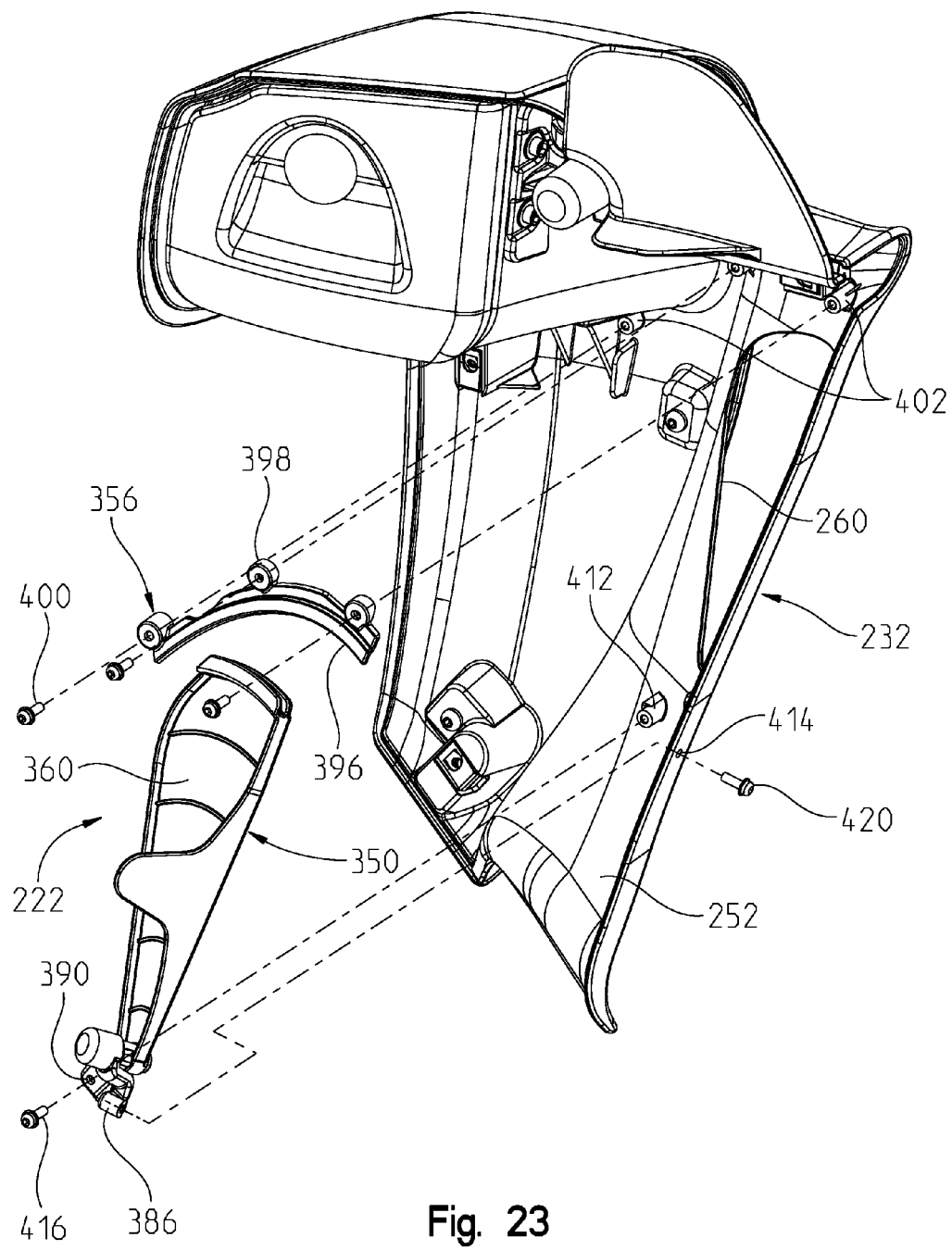
FIG. 23 shows a rear perspective view showing the vent assembly exploded from the left side of the lower fairing.
Figure 24:
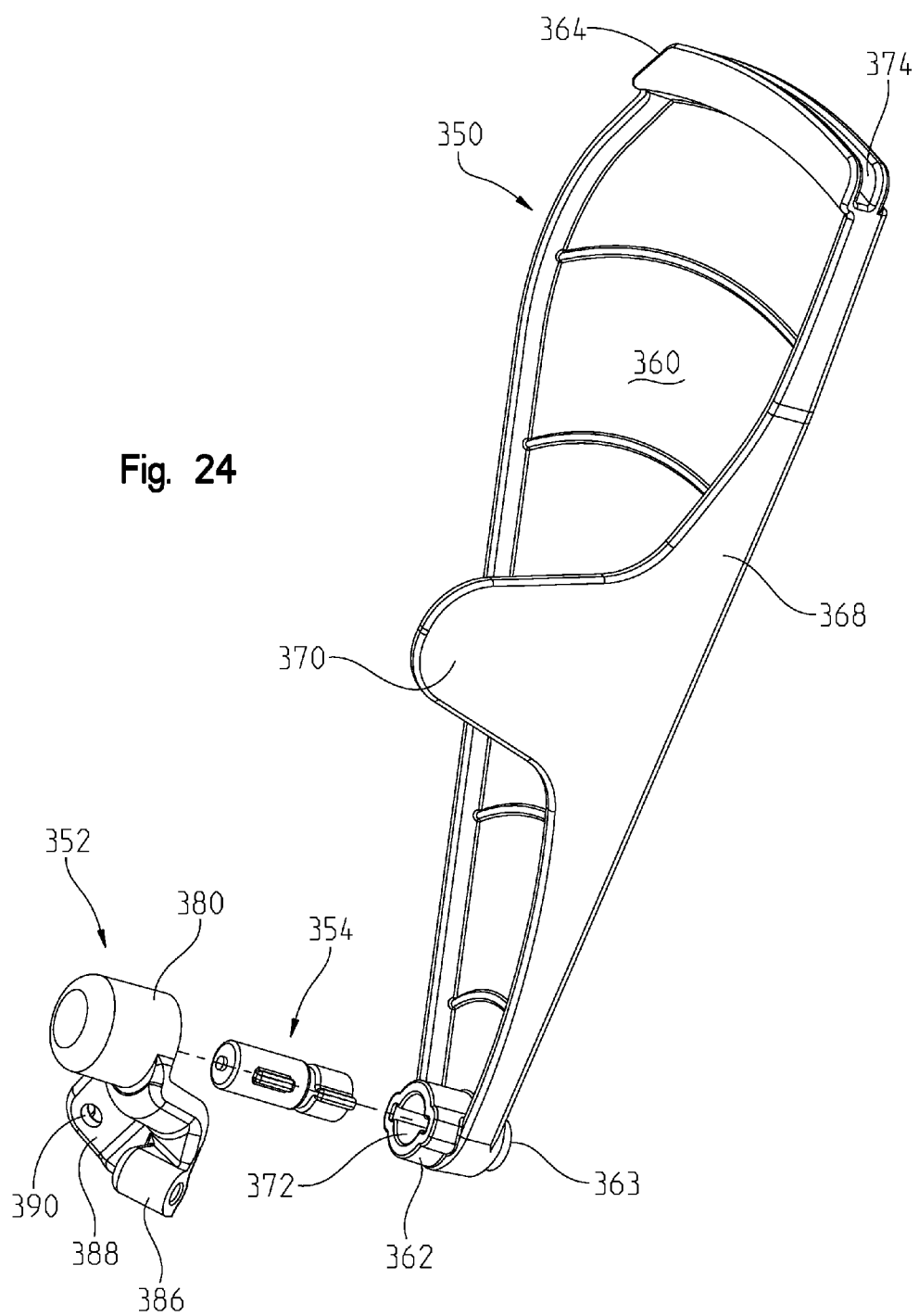
FIG. 24 shows an exploded view of the vent assembly.
Figure 25:
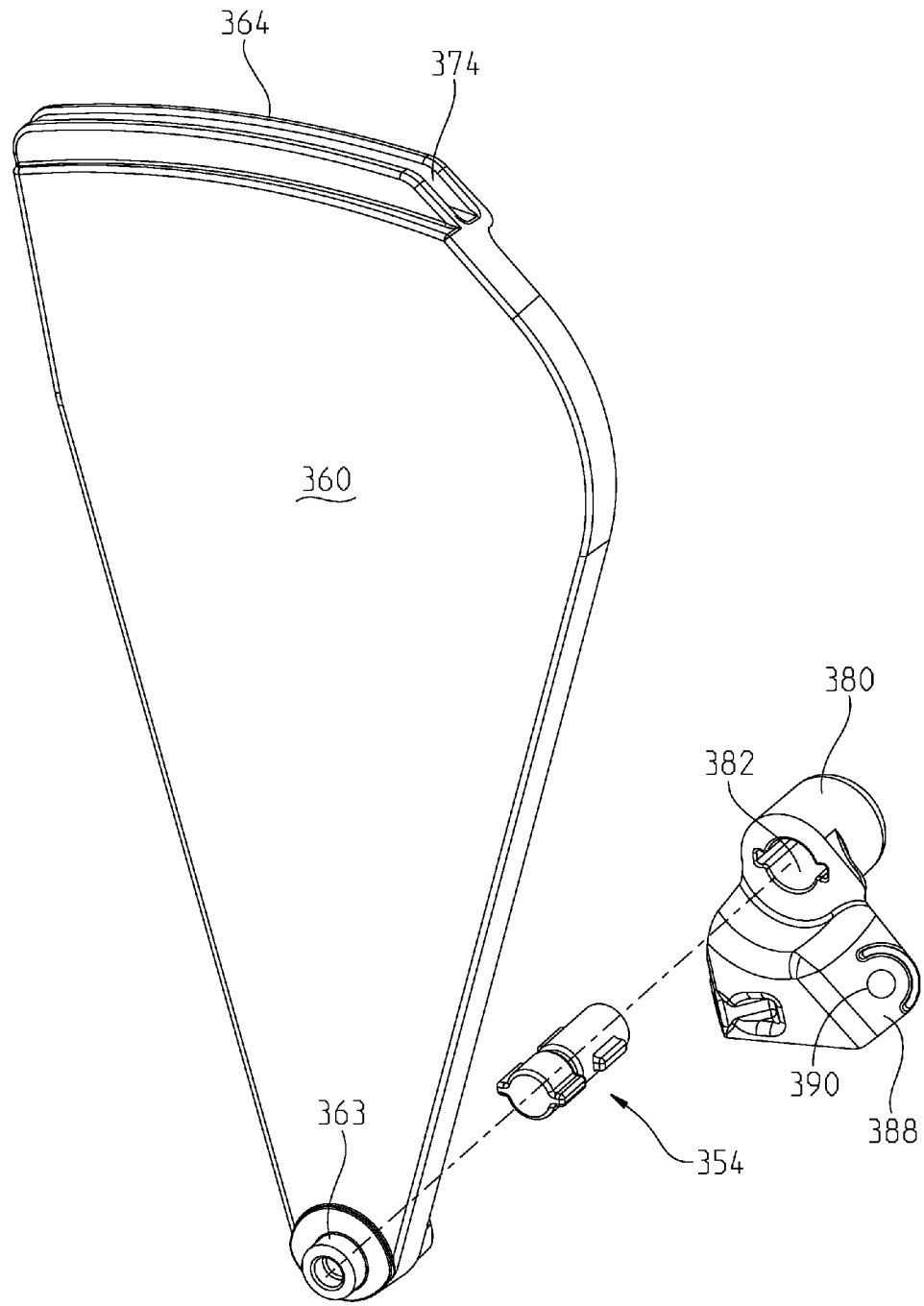
FIG. 25 shows an exploded view of the vent assembly from an opposite side as that shown in FIG. 24.

With reference now to FIGS. 23-25, vent assembly 222 will be described in greater detail. As shown best in FIG. 23, vent assembly 222 may be coupled to an inside of wall 252 and cover opening 260. As shown, vent assembly 222 includes a vent member 350, flange member 352 (FIG. 24), axle 354, and guide 356. As shown, vent member 350 includes a vent plate 360 having a coupling 362 and a boss 363 at a lower end, and a guide 364 at an upper end. Vent member 350 further includes a marginal wall at 368 having a handle 370 for an operator to grip. As shown, coupling 362 includes an opening 372, which is substantially similar as opening 304 as described with reference to FIG. 21. Guide 364 is positioned at an upper end of guide member 350 and includes a guide slot 374. Flange member 352 includes a trunnion 380 having an opening 382 (FIG. 25) for receipt of axle 354. Flange member 352 further includes a threaded boss 386 and flange member 388 having an aperture 390. As shown best in FIG. 23, slide 356 includes a curved guide member 396 coupled to bosses 398. It should be appreciated that guide member 396 is arcuately configured and is receivable in slide 374.

Thus to assembly vent assembly 222 to the lower fairing 66, axle 354 is positioned in opening 372 (FIG. 24, 25) and axle 354 is positioned in trunnion 380. Guide member 356 is coupled to the inner member 232 by way of fasteners 400 being received through bosses 398 into threaded bosses 402 (FIG. 23). Vent assembly 222 is thereafter positionable on an inside of inner member 232 with slot 374 overlying guide member 396. Boss 363 is thereafter receivable in an aperture 410 (FIG. 19) of inner member 232. This also positions flange portion 388 (FIG. 24) adjacent to boss 412 (FIG. 23) and boss 386 adjacent to aperture 414. Thus a fastener 416 is receivable through aperture 390 and into threaded boss 412, whereas fastener 420 is receivable through aperture 414 and into threaded boss 386. It should be appreciated then that the vent member 350 is slidable in a plane and is moveable between the positions shown in FIG. 17 (open position) and FIG. 18 (closed position).

Thus, operation of the deflector assembly 220 and vent assembly 222 will be described in relation to FIG. 8 and FIGS. 16-26. As shown in FIG. 8, upper fairing 50 and lower fairing 66 work in combination with each other to provide the airflow around the motorcycle 2. As shown in FIG. 8, upper fairing 50 has a width equal to a distance D1, which is substantially the same as the width of lower fairing 66, labeled D2. Upper fairing 50 and lower fairing 66, define intersecting points, whereby the distance between the intersecting points is labeled D3. The maximum distance between the outer edges of the deflectors 272 is distance D4. As shown, D2 is greater than D3 and D4 is greater than D3. Also, D1 is substantially equal to D2.

Figure 26:
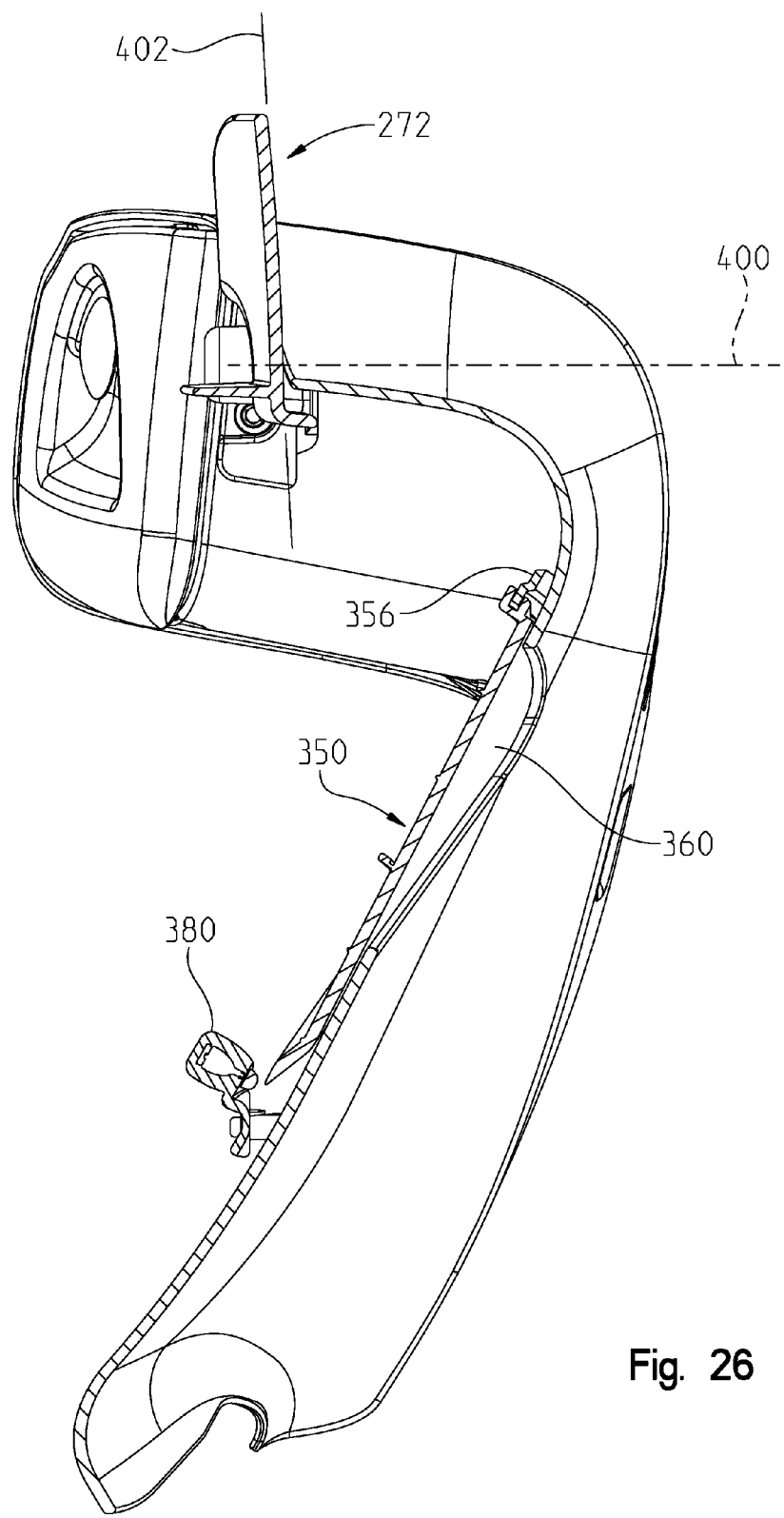
FIG. 26 is a cross-sectional view through lines 26-26 of FIG. 18.

As shown best in FIG. 26, the deflector member 272 is coupled about axis 400, which is generally longitudinally directed relative to the vehicle. Furthermore, deflector 272 rotates in a plane 402, which is generally transverse to the vehicle direction. Because the vent member 350 is angled slightly relative to a longitudinal direction, that is trunnion 380 is located rearward of guide 356, a substantial amount of volume is located rearward of guide 356 and below deflector member 272, as best shown in FIG. 26. Thus, as shown in FIGS. 16 and 17, the deflector plate 272 can rotate downwardly to the fully opened position and not conflict with the operation of vent member 350. Alternatively or in addition, a vent assembly 222 could also be incorporated into the upper fairing 50.

Figure 27:
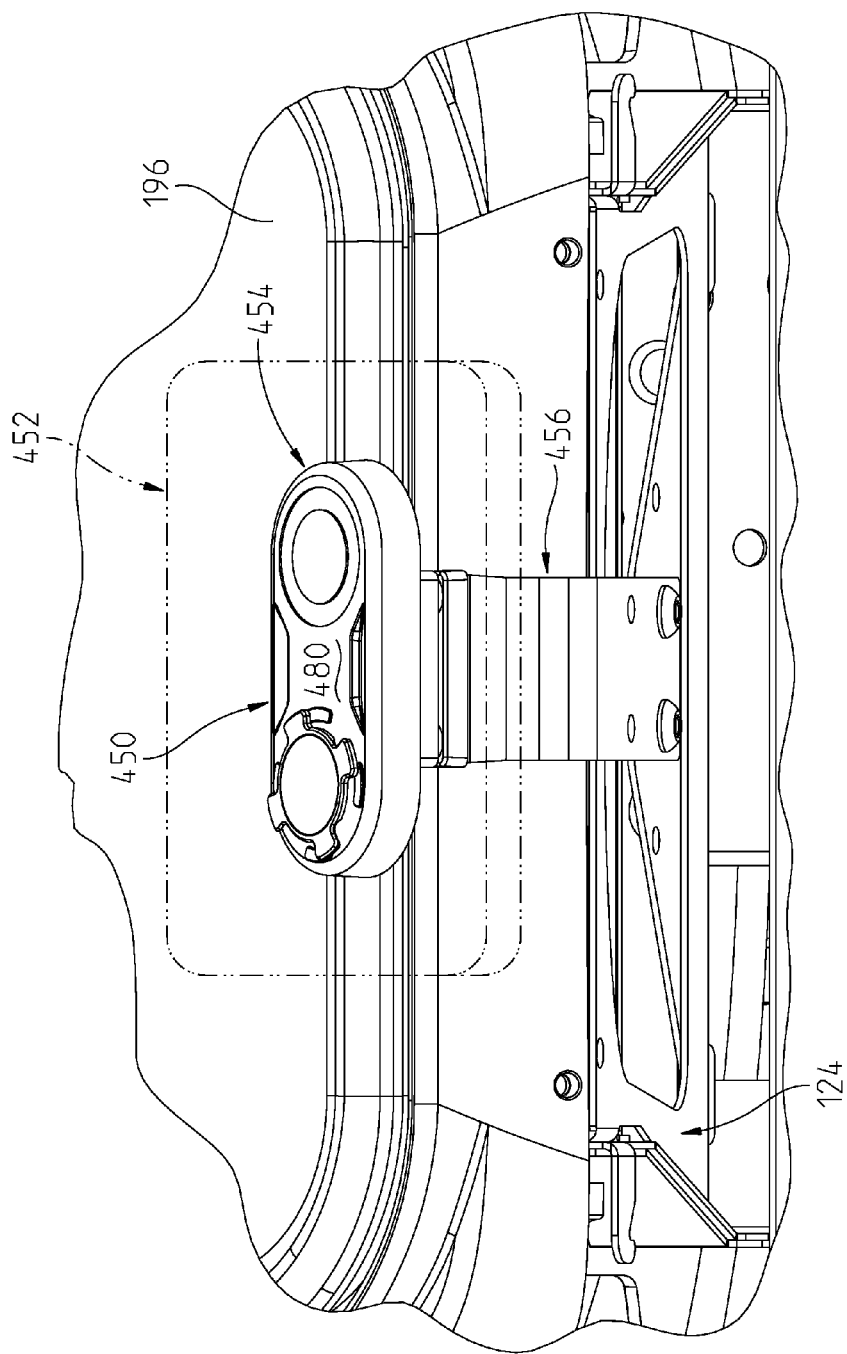
FIG. 27 is a perspective view of an accessory phone holder.
Figure 28:
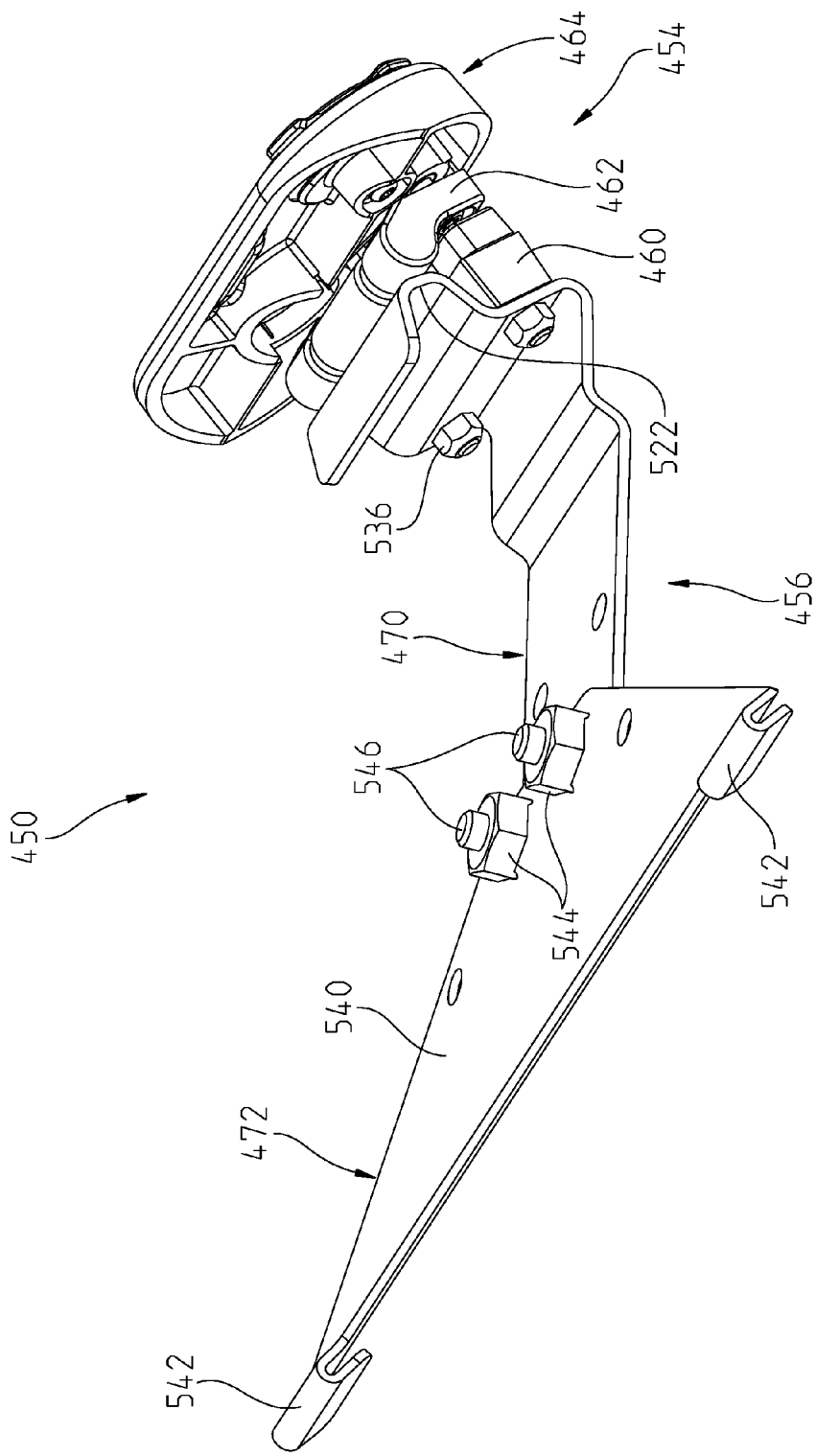
FIG. 28 shows a rear perspective view of the phone holder.
Figure 29:
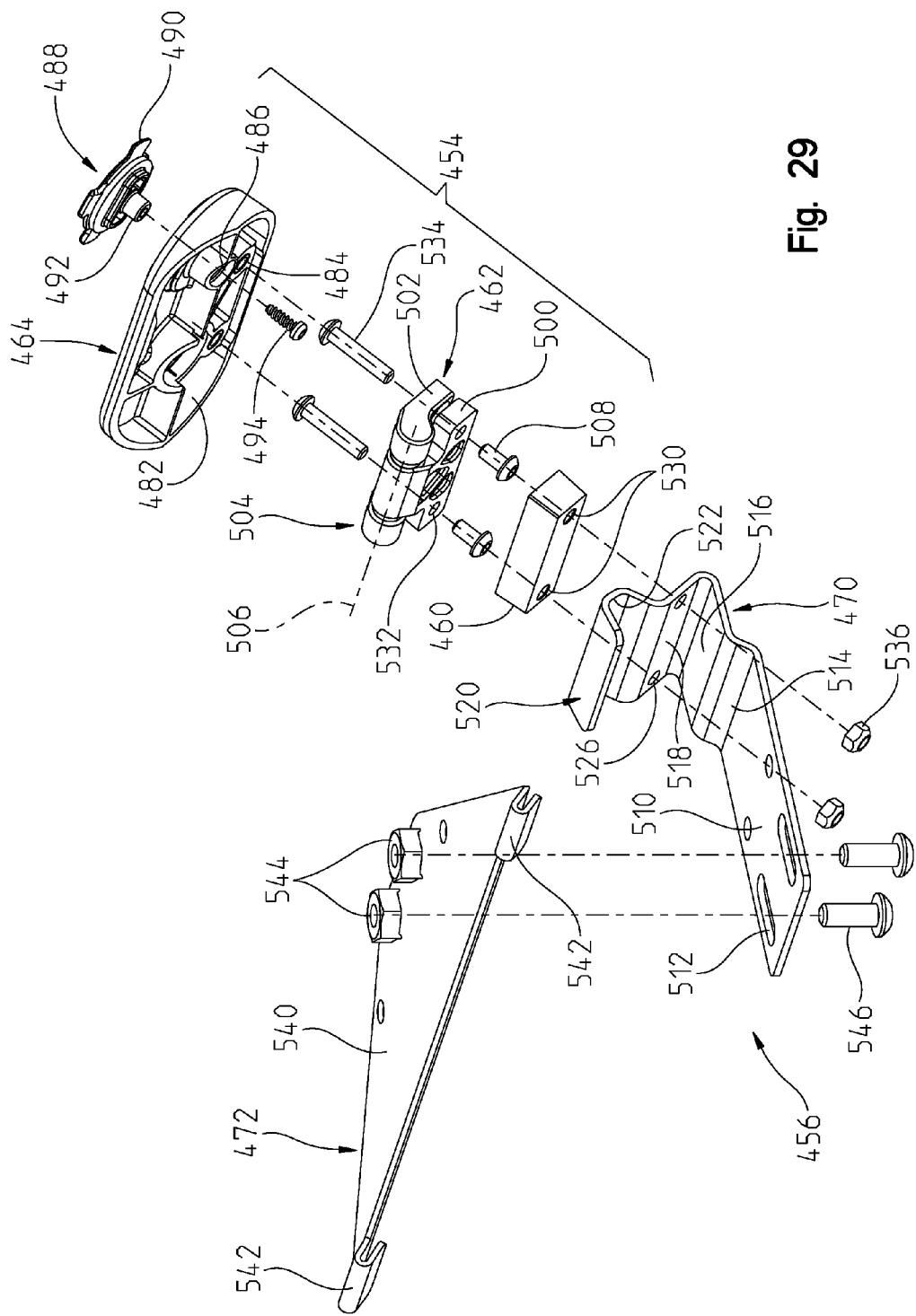
FIG. 29 is a perspective view similar to that of FIG. 28, showing the components exploded away from each other.

With reference now to FIGS. 27-32, an accessory phone holder will be described. With reference first to FIG. 27, a phone holder is shown generally at 450, which is used to couple a rider's phone or like-sized object (a smartphone or a GPS unit), shown generally at 452 in phantom, the phone holder 450 generally includes a phone retaining portion 454 and a bracket assembly 456. As shown best in FIGS. 28-29, phone retaining portion 454 generally includes a spacer 460, a friction hinge 462, and a base portion 464. Meanwhile the bracket assembly 456 includes a front bracket portion 470 and a rear bracket portion 472. With reference still to FIGS. 27 and 29, base portion 464 includes a front face 480 and an underside 482. Underside 482 includes threaded bosses 484 and aperture 486. Retaining portion 454 further includes a locking wheel 488 having locking tabs 490 and a threaded boss 492 (FIG. 29). Locking wheel 488 is coupled to the base 464 by way of fastener 494 in boss 492. Locking wheel 488 is profiled to receive a mountable case from Rokform, LLC available at www.rokform.com.

As shown best in FIG. 29, friction hinge 462 includes a lower hinge portion 500, an upper hinge portion 502, and a hinged portion 504, allowing hinge portion 500 and 502 to pivot about axis 506. This allows base 464 to be adjusted to move the phone relative to the motorcycle 2. Hinge portion 504 includes apertures 507 (FIG. 32), which are in alignment with threaded bosses 484 (FIG. 29) and fasteners 508 are provided to mount base portion 464 to upper hinge portion 502.

Front bracket portion 470 includes an extension portion 510 having slots at 512. Extension portion 510 is continuous with a radius portion 514, which leads into a v-shaped wall defined by wall portions 516 and 518. A gripping portion 520 extends from wall portion 518 defining an inner gripping surface at 522. Wall 518 also includes apertures 526. It should be appreciated that lower hinge portion 500 may be coupled to wall 518 by positioning fasteners 534 through apertures 532 and through apertures 530 of spacer 560. This positions fasteners 534 through apertures 526 wherein fasteners 536 may be coupled to fasteners 534. This couples base portion 464 and hinge 462 to the front bracket portion 470.

Rear bracket portion 472 includes a plate member 540 having gripping fingers 542 at a rear edge thereof and fasteners 544 at a leading edge thereof. Preferably fasteners 544 are coupled to the plate 540, for example by spot welding and would align with an aperture through the plate 540. This would allow fasteners 546 to be received through slots 512 and into threaded engagement with fasteners 544.

Figure 13:
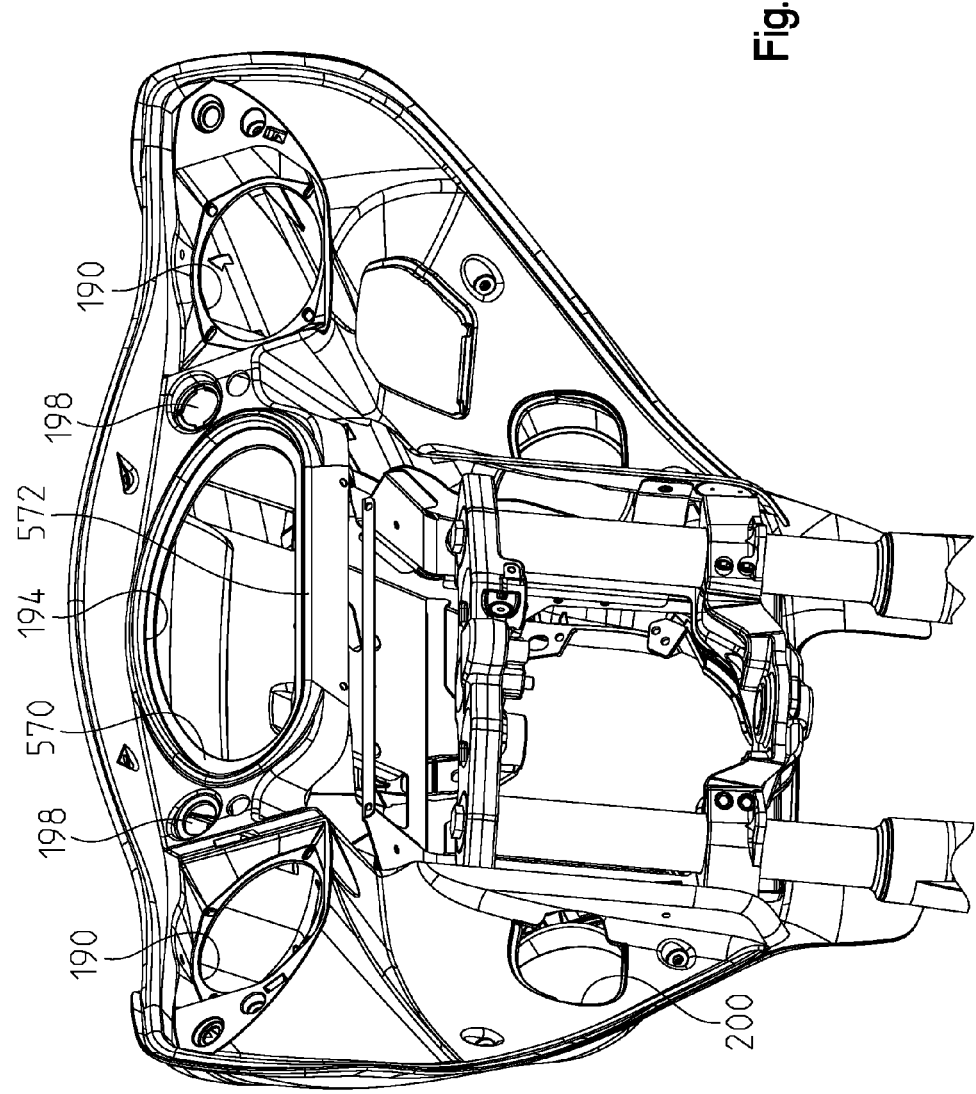
FIG. 13 is a is a rear perspective view of the upper fairing of FIG. 11.
Figure 30:
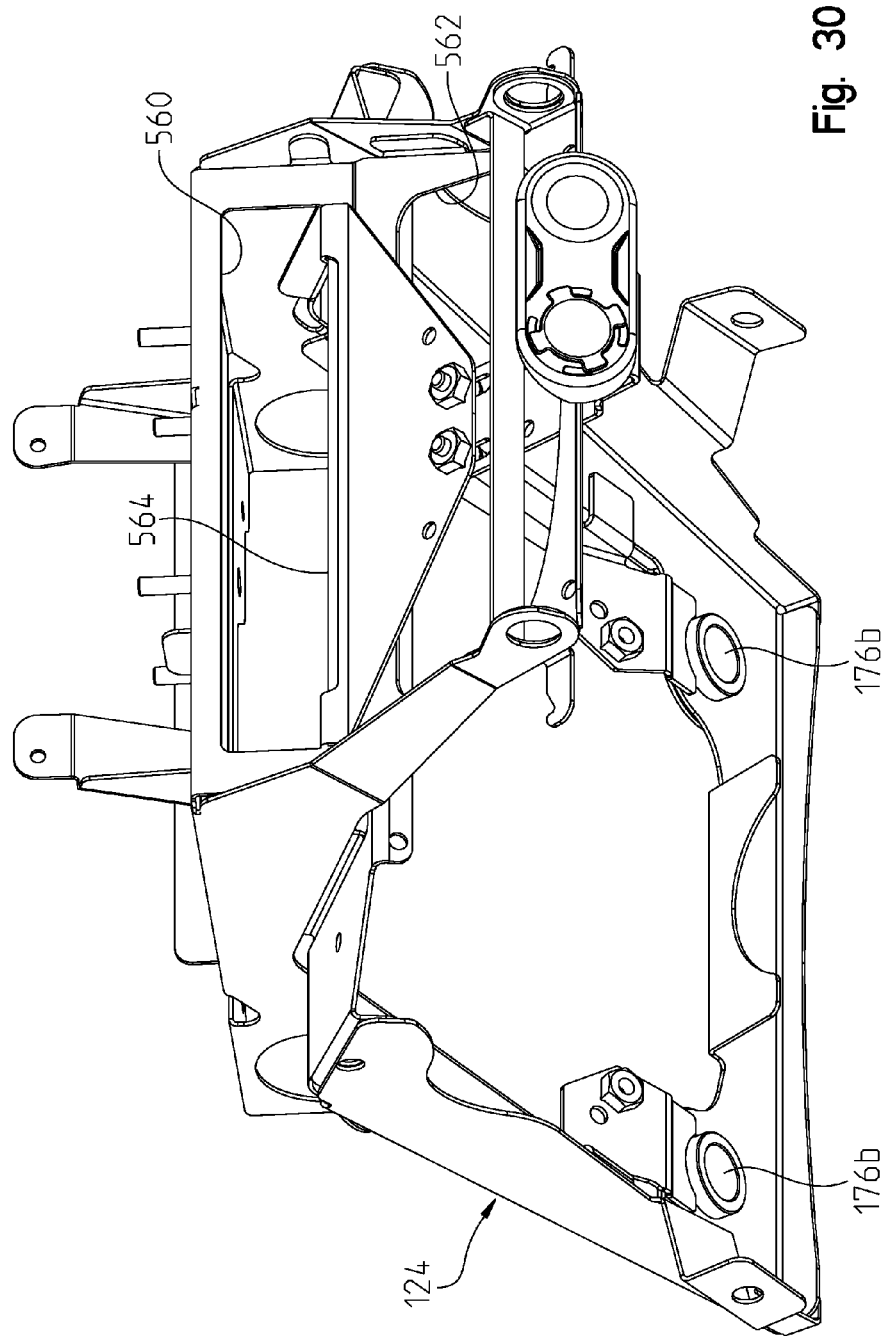
FIG. 30 shows the phone holder coupled to the upper fairing bracket.
Figure 31:
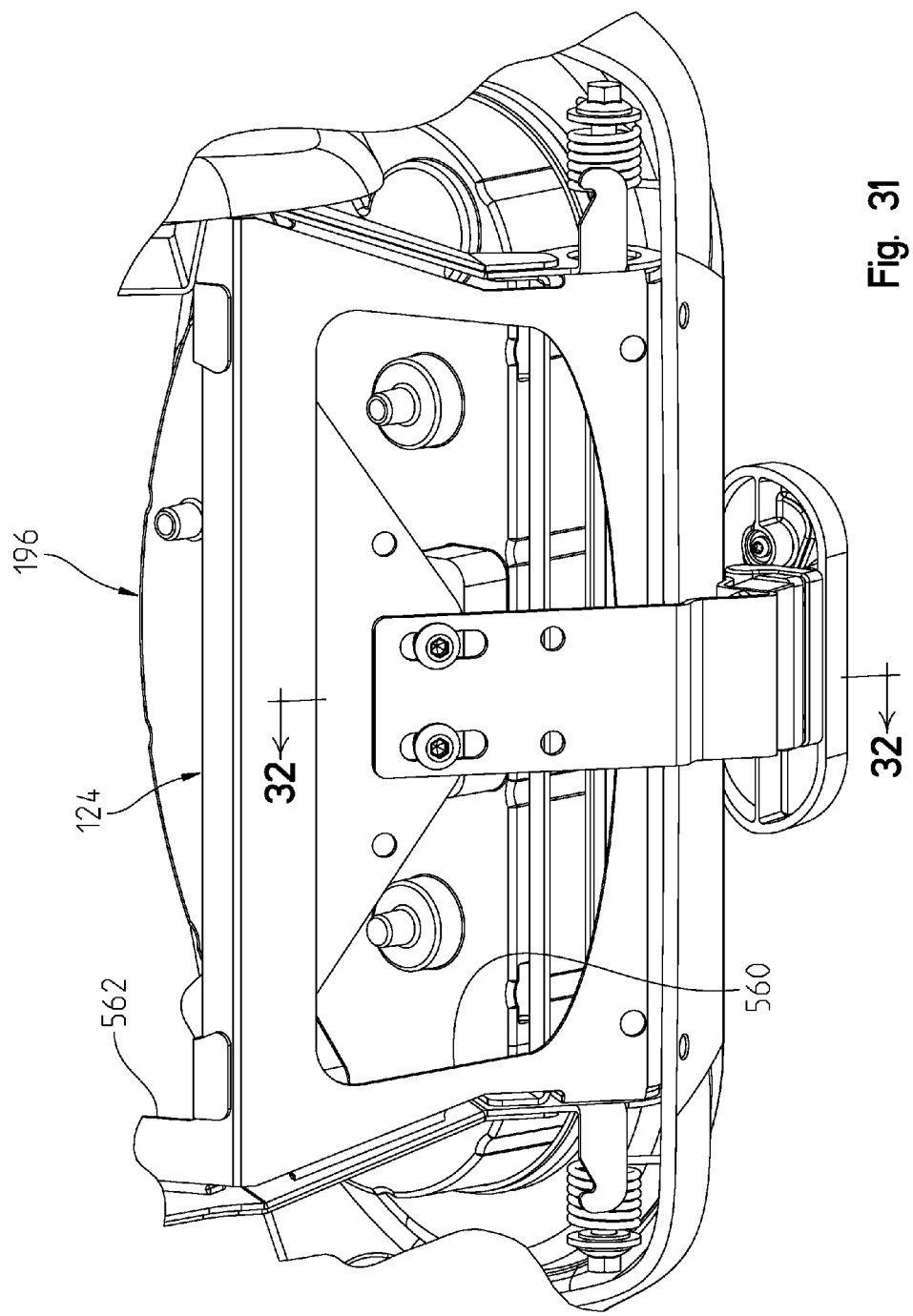
FIG. 31 is an underside perspective view of the phone holder mounted in position.
Figure 32:
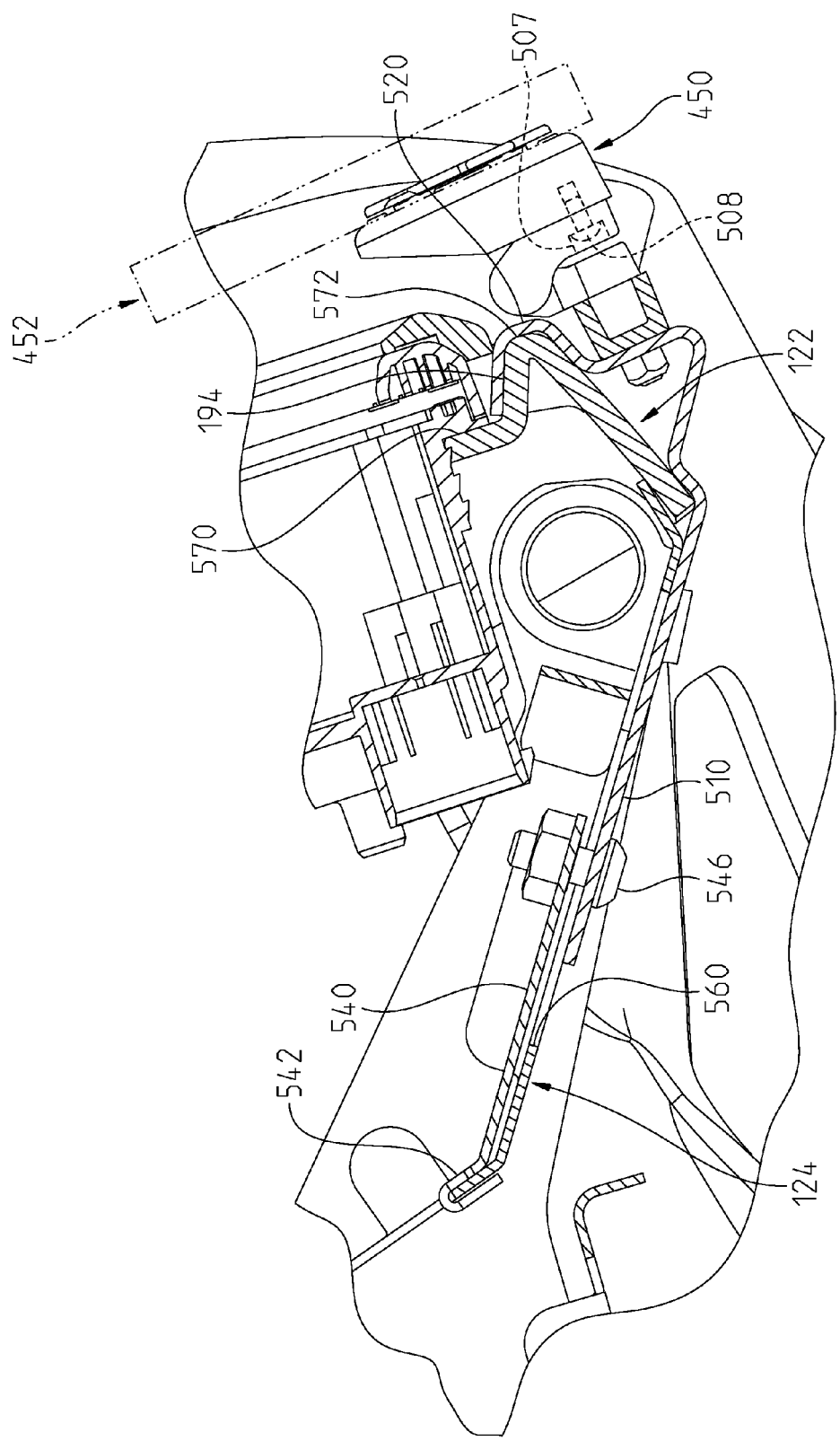
FIG. 32 is a cross-sectional view through lines 32-32 of FIG. 31.

With reference now to FIGS. 30-32, the assembly of phone holder 450 will be described. As shown best in FIG. 30, bracket 124 is shown having openings 560 (opening 560 may also be viewed in FIG. 15) and 562 therethrough. Opening 560 defines a gripping edge at 564. Gripping fingers 542 are then received over gripping edge 564. As shown in FIG. 13, opening 194 further includes a shoulder 570 and a front lip 572, which define mounting surfaces described herein. This allows gripping portion 520 to be received over lip 572 as best shown in FIG. 32.

When in the position shown in FIG. 32, fastener 546 may now be drawn tight, which pulls the extension portion 510 and plate portion 540 towards each other. As shown in this position, plate portion 540 is slightly angled relative to extension portion 510 and thus tightening fasteners 546 causes a tension gripping affect between gripping members 520 and 542; as well as, a torqued affect at gripping members 542.

Figure 33:
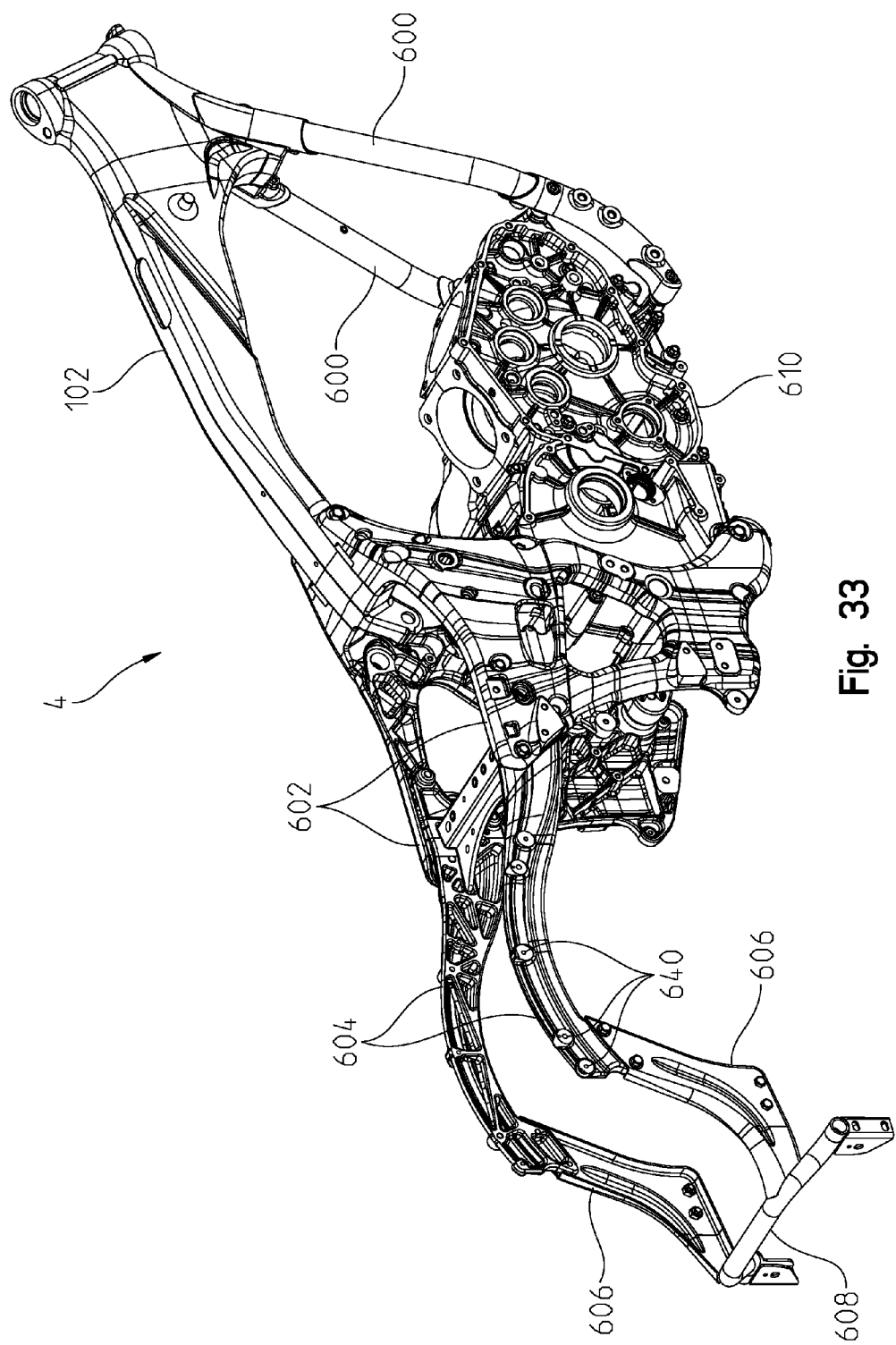
FIG. 33 shows a right rear perspective view of the frame of the motorcycle of FIG. 1.
Figure 34:
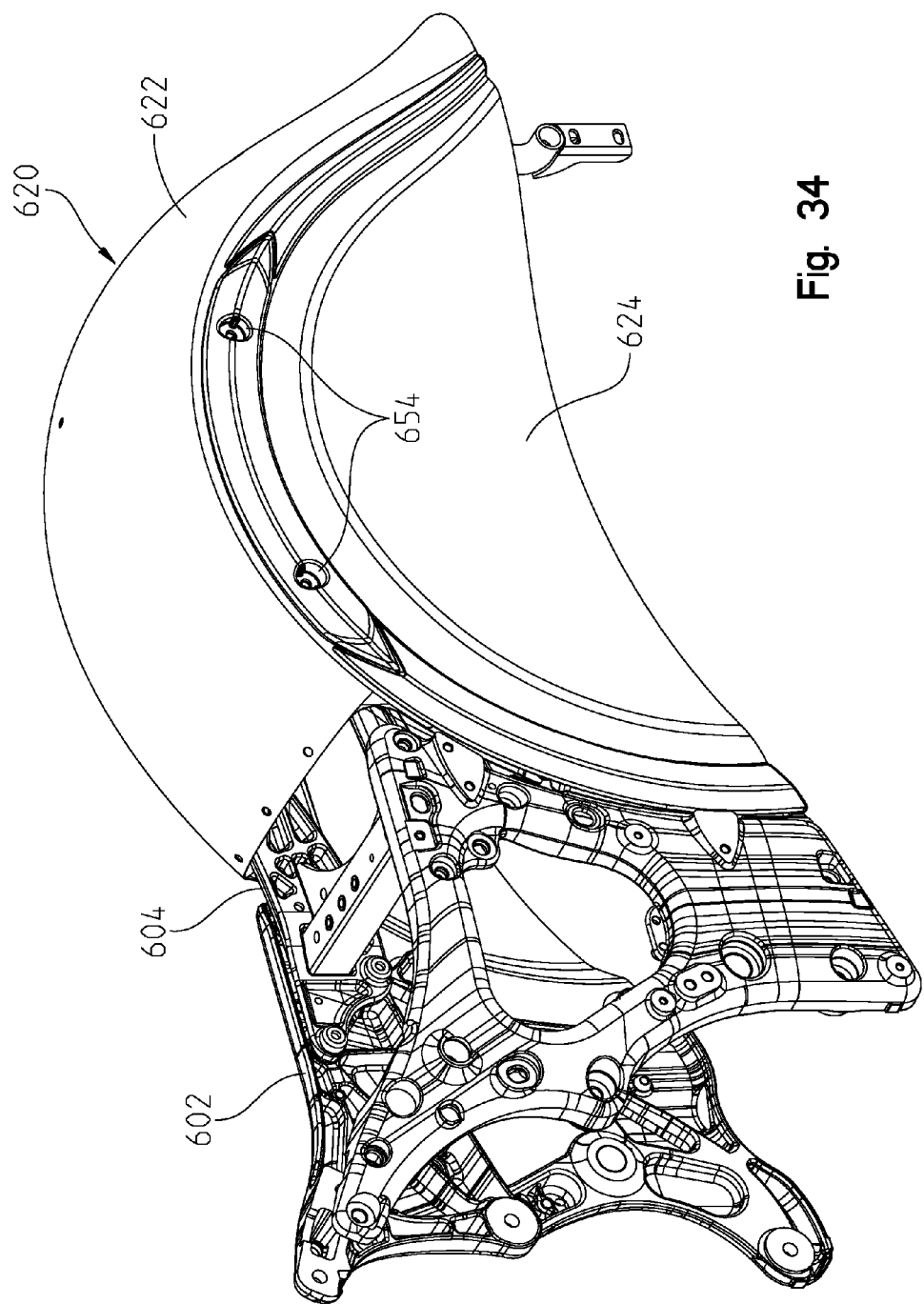
FIG. 34 shows a rear portion of the frame of FIG. 33 and a fender assembly coupled to the frame.
Figure 35:
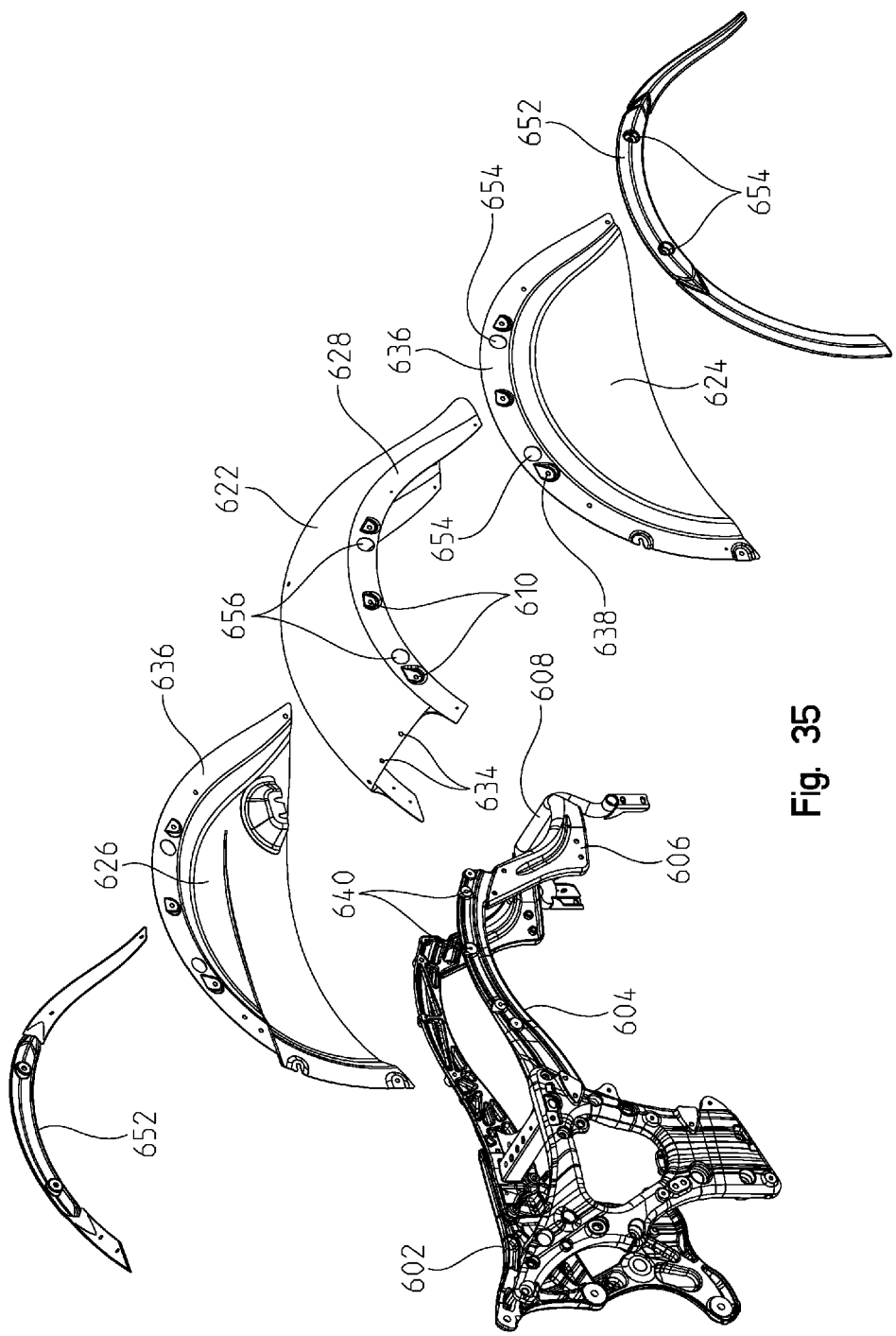
FIG. 35 is an exploded view of the frame and fender of FIG. 34.
Figure 36:
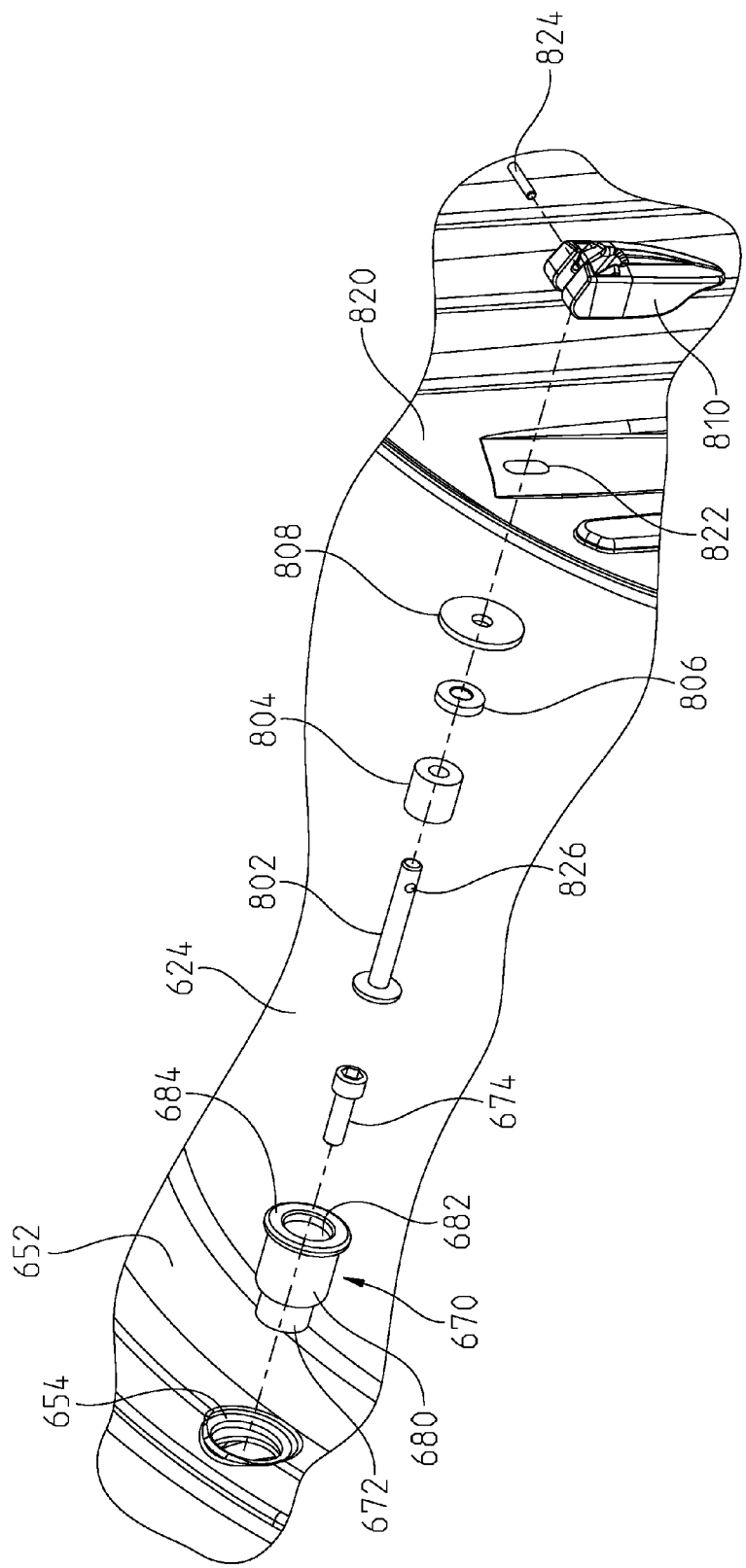
FIG. 36 is an exploded view showing the locking member for the fender to the frame and for an accessory saddlebag to the motorcycle.
Figure 36A:
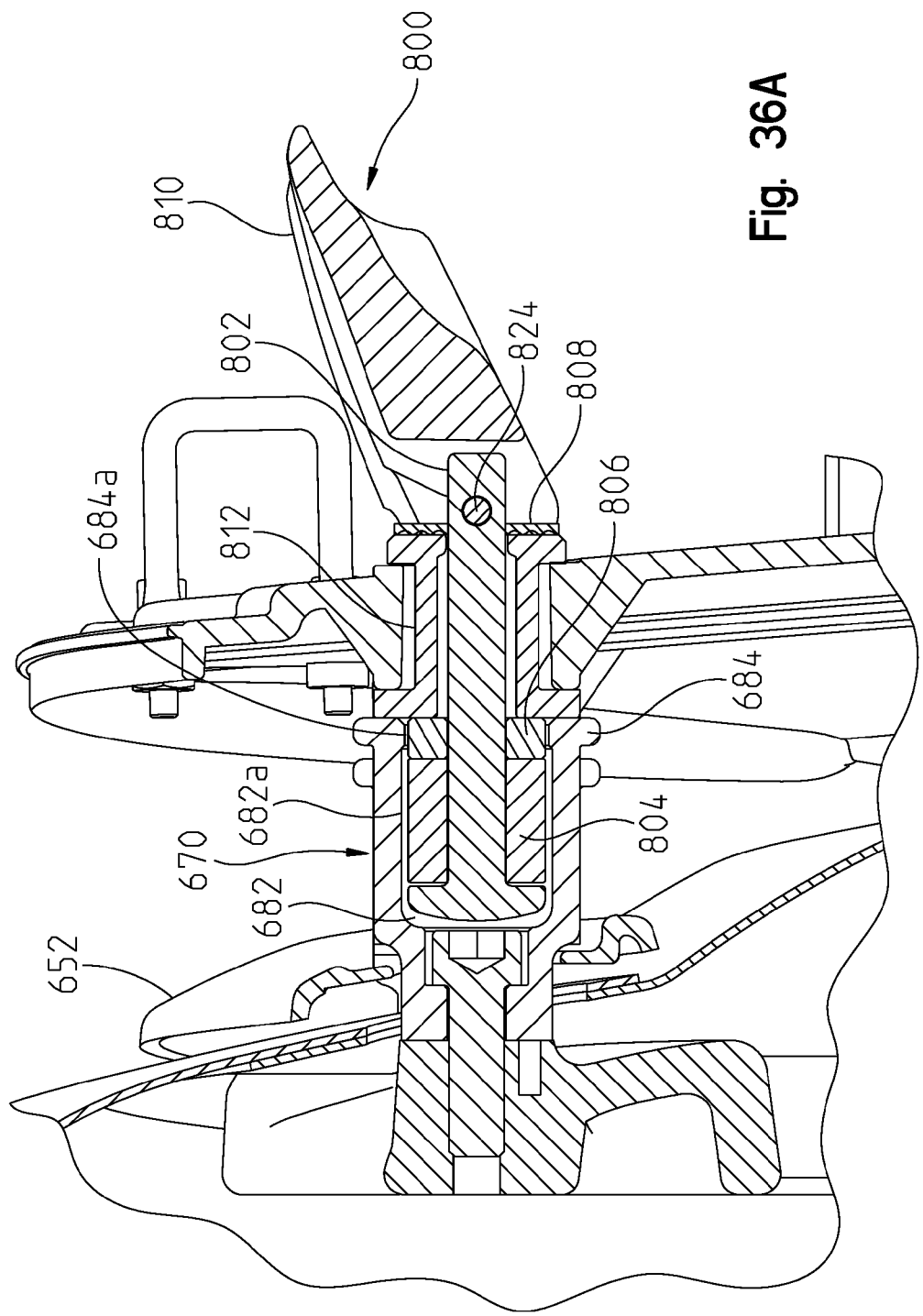
FIG. 36A is a cross-sectional view of the saddle bag mounting assembly of FIG. 36.
Figure 37:
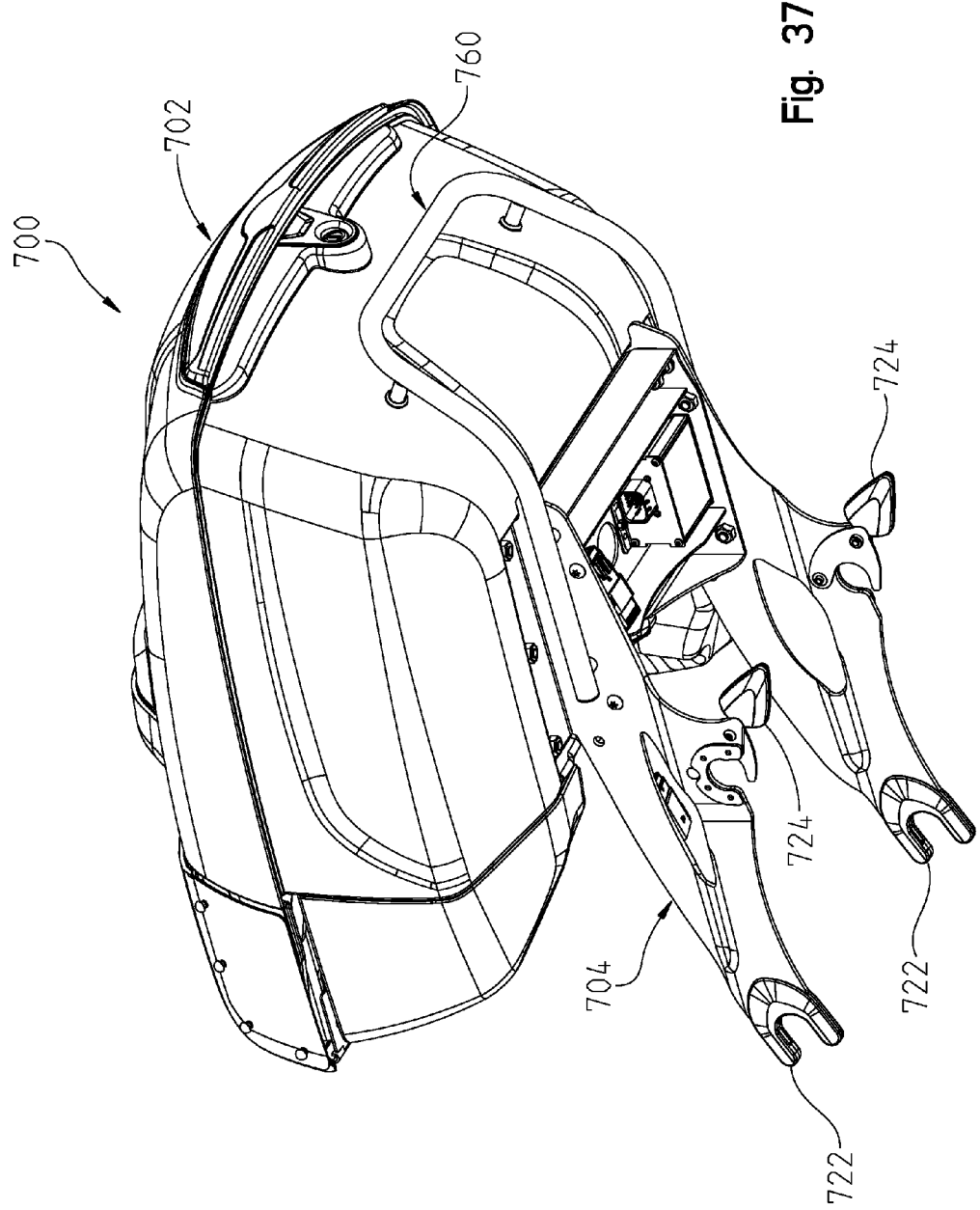
FIG. 37 shows a left rear perspective view of an accessory trunk used with the motorcycle.

With reference now to FIGS. 33-36, an accessory trunk will be described that mounts to frame 4. With reference first to FIG. 33, frame 4 will be described. Frame 4 is comprised of main frame portion 102, front frame tubes 600, side frames 602, frame extension portions 604, and rear frame portion 601. As shown in FIG. 33, frame 4 is coupled to power train housing 610 and power train housing 610 becomes an integral part of frame 4 as described herein. With reference now to FIGS. 34-36, rear fender assembly will be described in greater detail.

Referring now to FIGS. 34-36, a rear fender 620 is coupled to rear frame portion 604 and extends around a top portion of rear wheel 8. As shown in FIGS. 34-36, rear fender 620 extends rearwardly from rear frame portions 604, 606 and is positioned above a cross member 608, illustratively a mustache bar. Rear fender 620 may be comprised of metallic and/or polymeric materials and may increase the structural integrity of frame 4. Rear fender 620 includes a top member 622, a first side member 624, and a second side member 626. Illustratively, rear fender 620 is a skirted fender. Top member 622 includes side surfaces 628 having a plurality of recessed openings 610. Recessed openings 610 may be configured to receive mechanical fasteners. Additionally, a front end of top member 622 includes at least one aperture 634 which may be used to couple rear fender 620 to rear frame portion 604. First and second side members 624, 626, each include a flange 636 having recessed openings 638 that align with recessed openings 610 of top member 622 and apertures 640 of rear frame portion 604. Recessed openings 610, 638 and apertures 640 may be configured to receive fasteners therethrough Rear fender 620 further includes trim members 652 have a plurality of recessed openings 654 which align with openings 654 of side members 624 and 626, and with apertures 656 of the top member 622. As such, trim members 652 may be coupled to side members 624 and 626 with mechanical fasteners.

More particularly and with reference to FIG. 36, a coupler 670 is provided having a countersunk portion 672 profiled to be received in opening 654 and to receive fastener 674 therethrough coupling trim piece 652 and coupler 670 to fender 622 and frame 604. Coupler 670 defines an outer engagement surface 680, an inner opening 682, and an outer lip 684 as described herein. It should be appreciated that a portion of coupler 670 extends beyond opening 654 for engagement of a locking mechanism on a trunk assembly as further described herein.

With reference now to FIGS. 37-42, the trunk assembly will be described in greater detail. As shown first in FIG. 37, the trunk assembly is shown generally at 700 to include a trunk enclosure portion 702 and a lower frame portion 704. Upper enclosure portion 702 could be comprised of a plastic or fiberglass type material whereas lower frame portion 704 is comprised of a material such as aluminum, steel, and/or tubing as described. As shown best in FIGS. 38 and 39, frame portion 704 includes a base portion 710 having a base wall 712, sidewalls 714. Sidewalls 714 include a plurality of apertures 716, 718 as described herein.

Frame portion 704 further includes attachment legs 720 having a forward attachment yoke 722 and a rearward aperture 723 including a locking mechanism 724 having a locking jaw at 726. Legs 720 further include rearwardly extending plate portions 730 having a plurality of apertures 736 and 738. It should be appreciated that apertures 736 align with apertures 716 in sidewalls 714 and apertures 738 align with apertures 718 in sidewall 714. Leg portions 720 further include flanges 750 extending from plate portions 730 having fasteners 752 coupled thereto and having an aperture aligned with the threaded opening.

Figure 38:
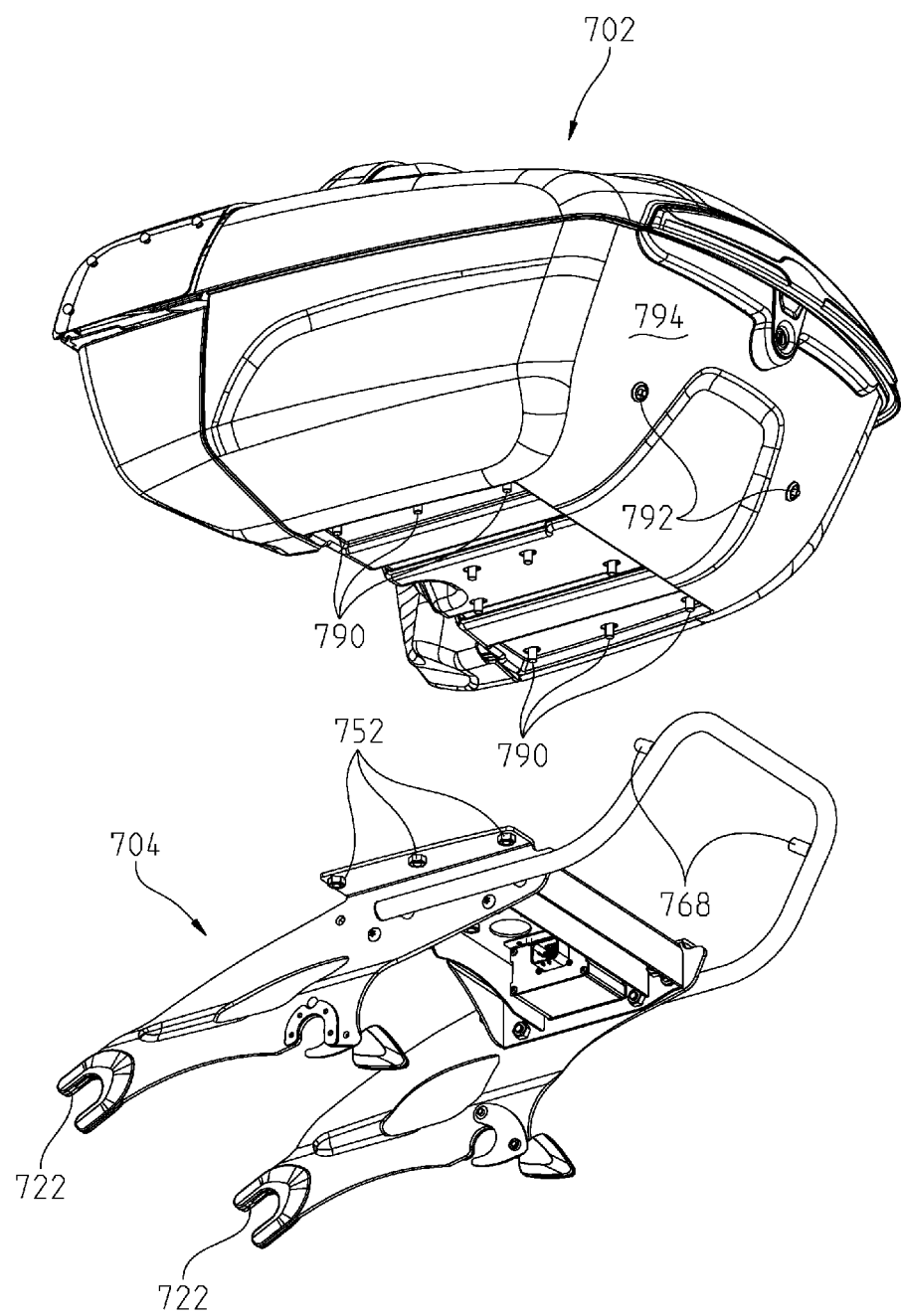
FIG. 38 is an exploded view of the trunk of FIG. 37.
Figure 39:
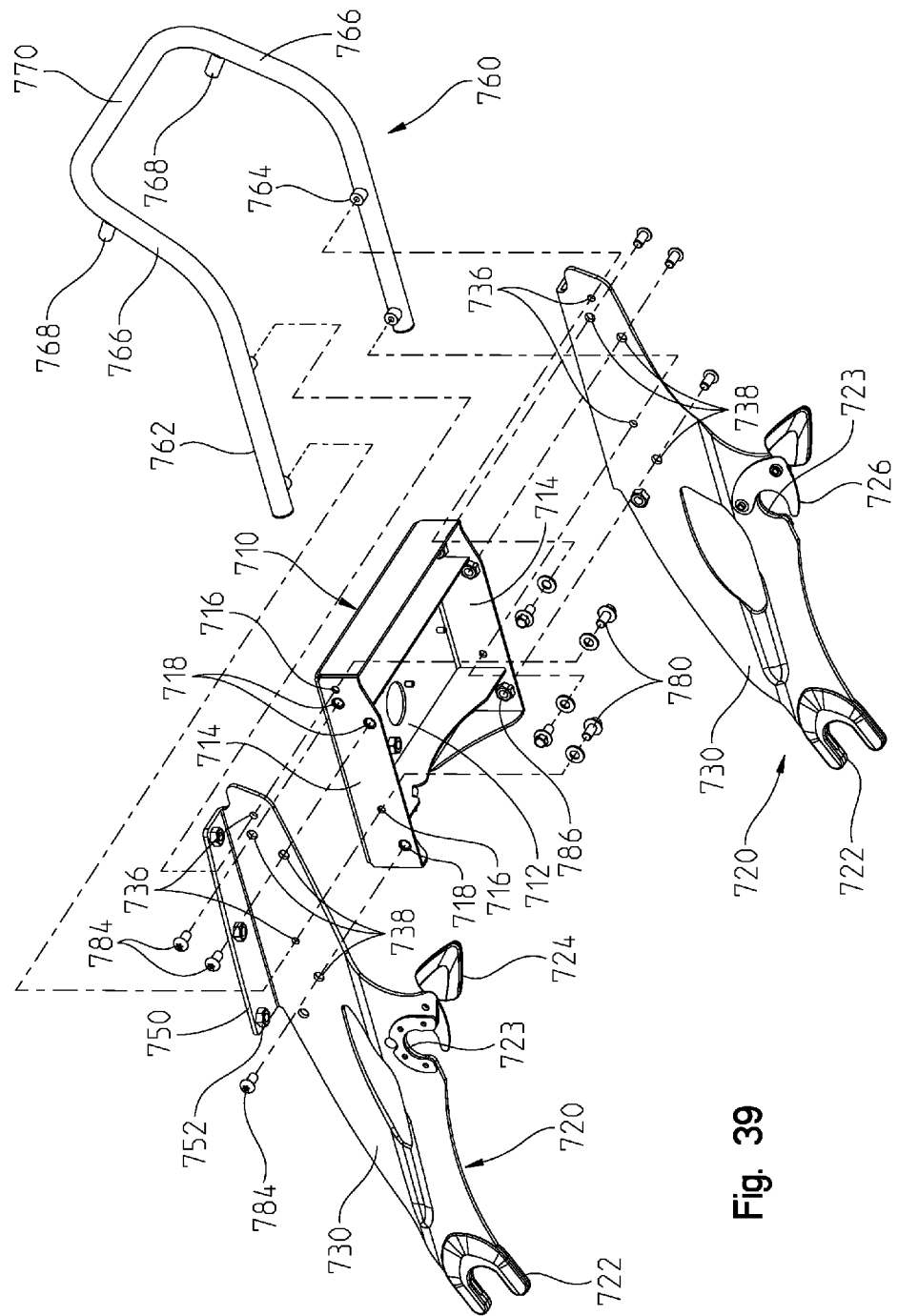
FIG. 39 is an underside perspective view showing the trunk frame in an exploded manner.

With reference still to FIG. 39, the frame further includes a tubular structure 760 having side arms 762 having threaded bosses 764, upwardly extending portions 766 having threaded bosses 768 and a transverse portion at 770. Thus, it should be appreciated from FIG. 39 that threaded bosses 764 may be aligned with apertures 736 and 716 whereupon fasteners 780 may be received through apertures 716 and 736 and into threaded engagement with threaded bosses 764. In a similar nature, fasteners 784 may be received through apertures 718, 738 and into threaded engagement with fasteners 786. Fasteners 790 (FIG. 39) extend downwardly through trunk portion 702 and may be coupled to fasteners 752. In a like manner, fasteners 792 project through a rear wall 794 of trunk 702 and into threaded engagement with threaded bosses 768 (FIG. 38).

Figure 40:
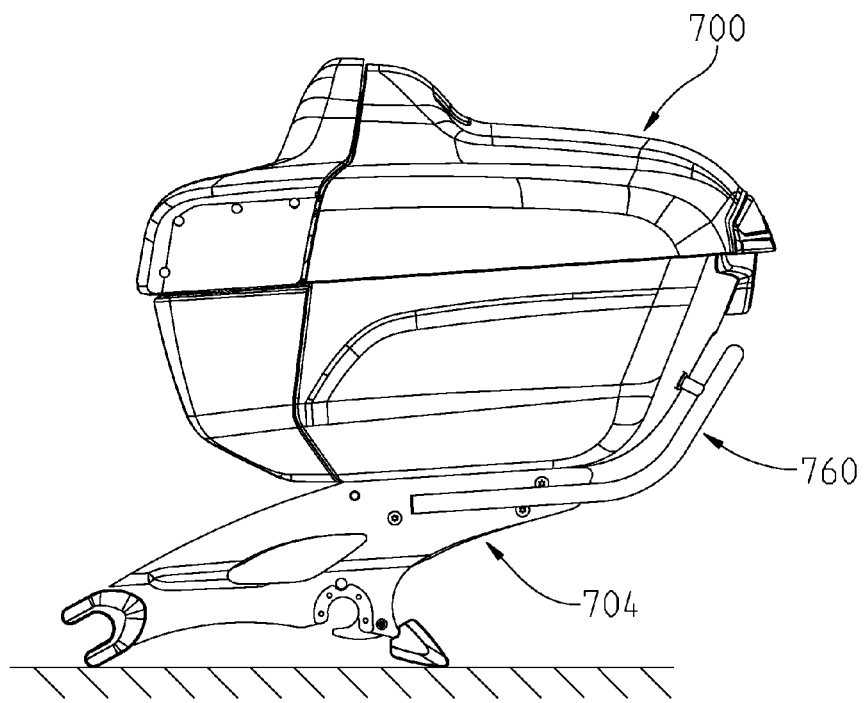
FIGS. 40 and 41 show the trunk in a standing and tipped position relative to the ground.
Figure 41:
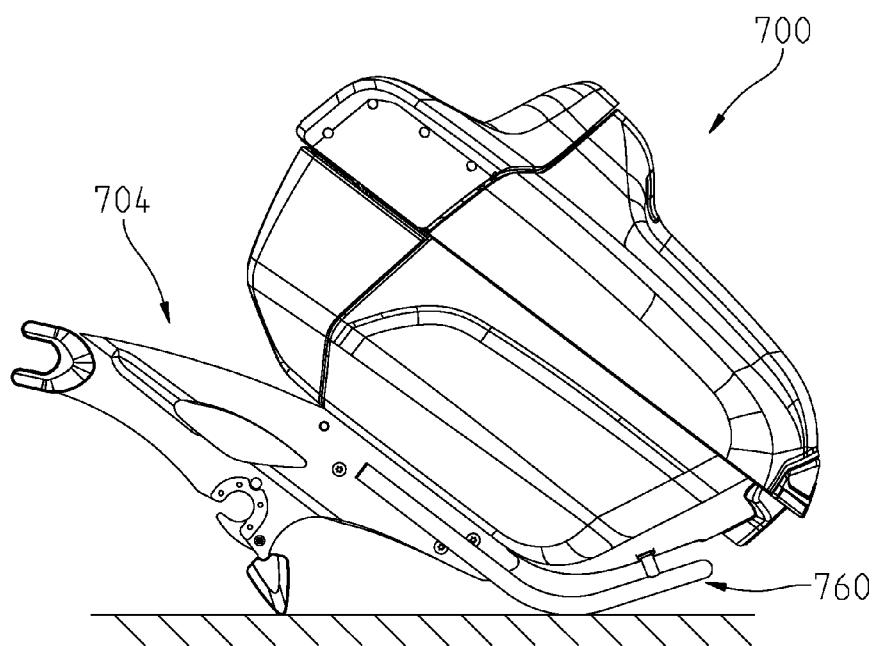
Figure 42:
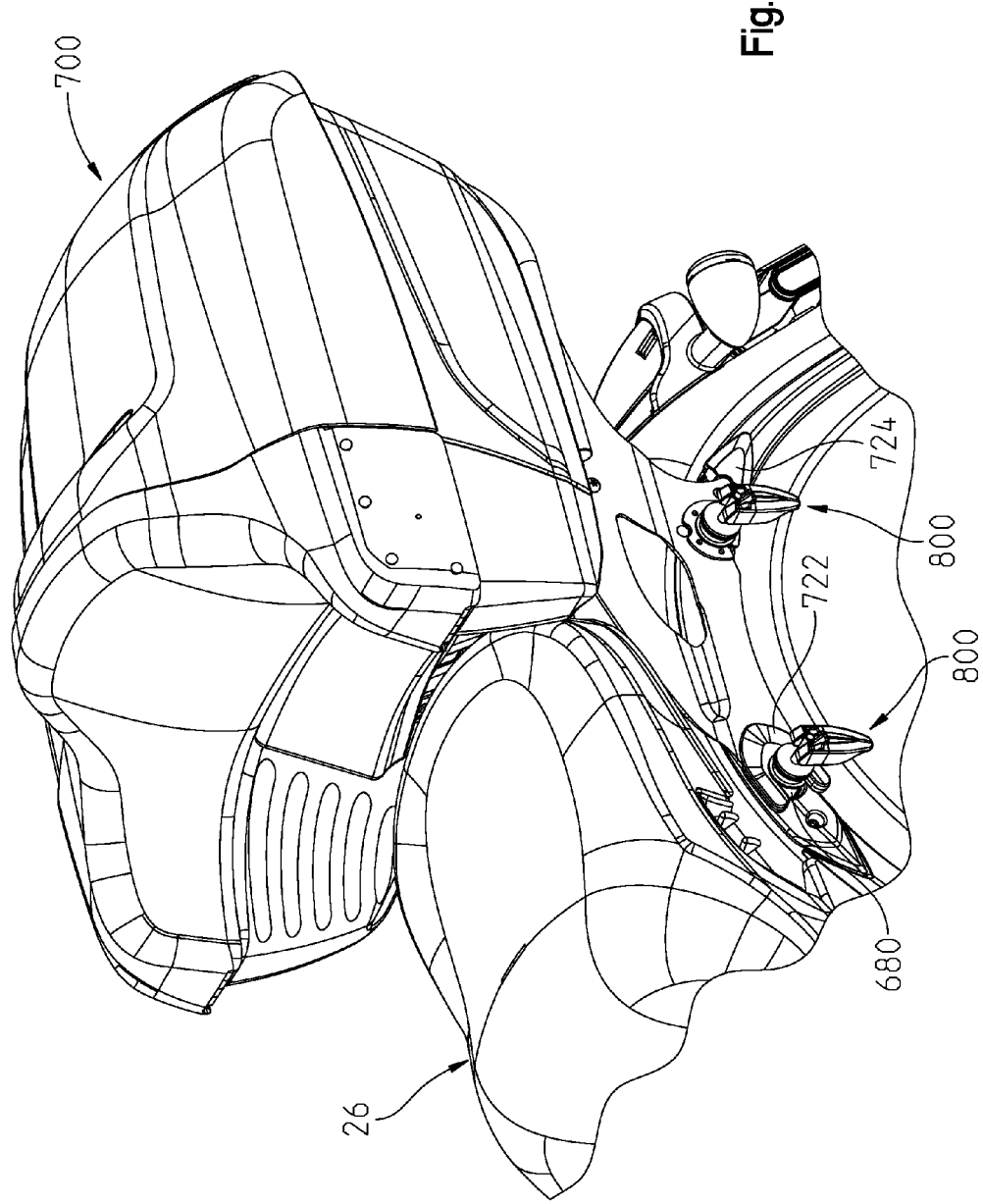
FIG. 42 shows the accessory trunk coupled to the motorcycle.

With reference now to FIGS. 40-42, the trunk as described above is strong and rigid with the frame structure 704 defining an exoskeletal frame to increase the rigidity. Tubular handle 760 may also be used as a handle. Furthermore, given the unbalanced nature of the trunk units themselves, if the trunk falls from a position from that shown in FIG. 40 to that shown in FIG. 41, the tubular structure 760 catches the trunk unit preventing scuffing or scratching of the upper trunk portion 702. Trunk 700 is therefore latchable to the motorcycle and in particular to couplers 670 (FIG. 36) where yokes 722 and latch opening 723 encircle engagement surface 680 (FIG. 36) of coupler 670. This is also shown in FIG. 42.

In addition, FIG. 42 shows a coupler member 800, which is not required for locking the trunk, but rather for locking an additional accessory saddlebag. This is shown in FIG. 36, where couplers 800 would comprise plunger 802, spacer 804, resilient and deformable member 806, outer washer 808, lever 810 and base portion 812. It should be appreciated that plunger 802 extends through items 804 and 808 and through saddlebag 820, particularly through aperture 822, where it couples with lever 810 by way of lock pin 824 and aperture 826. Thus the combination of saddlebag 820 and locking member 800 may be positioned with resilient member 804 and plunger 802 within aperture 682 of coupler 670, whereupon lever 810 is rotated to a position where plunger 802 is pulled, deforming resilient member 804 (to the right as viewed in FIG. 36) whereupon resilient member 804 is reduced in length, but increased in diameter where it grasps aperture 682. More particularly, the resilient member 804 grips surface 682a, behind surface 684a. Coupler 800 is an accessory coupling system similar to the one disclosed in U.S. Pat. No. 7,055,454, the disclosure of which is expressly incorporated herein by reference; also known as assignees' Lock & Ride® expansion coupler mounts.

Figure 43:
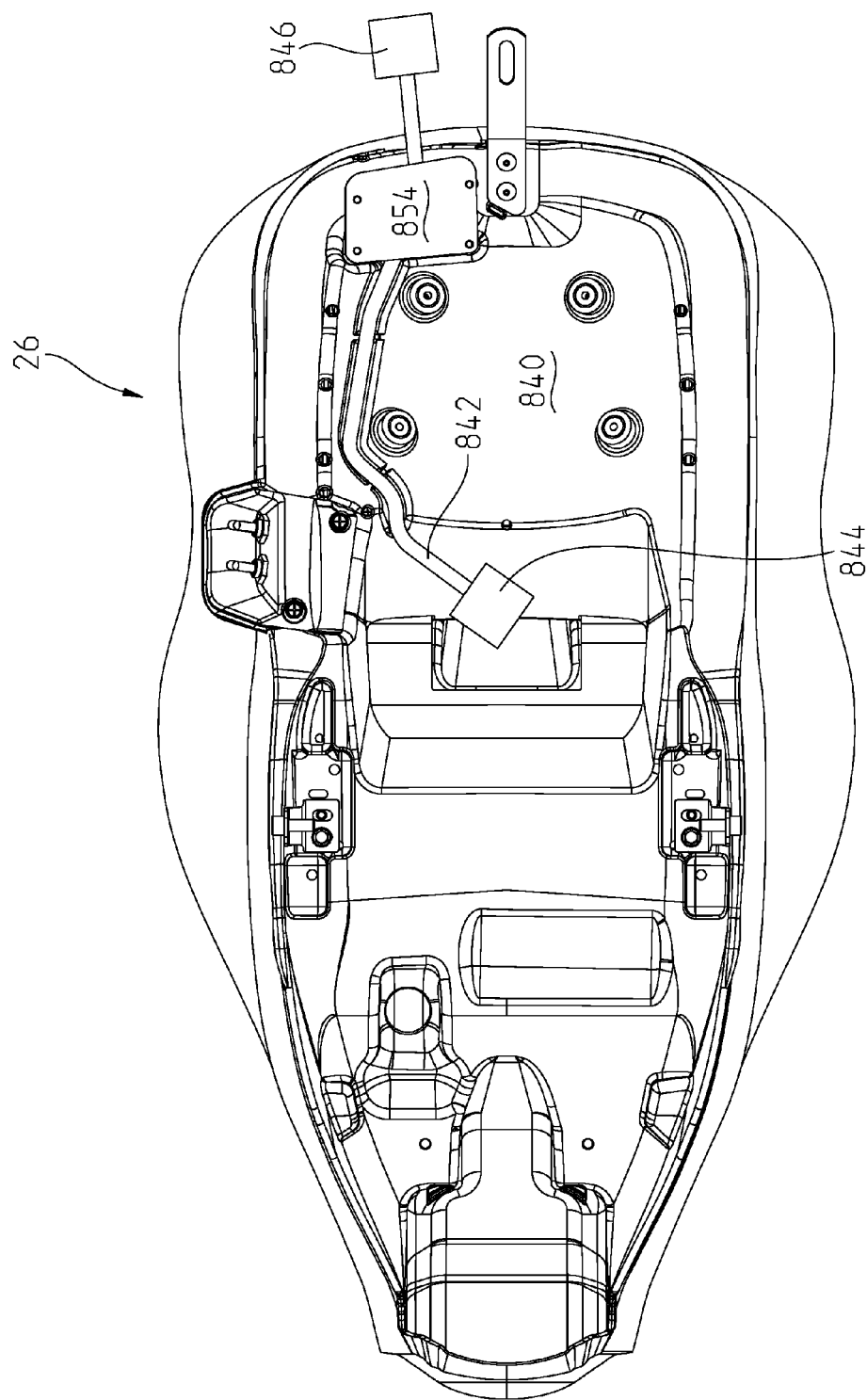
FIG. 43 is underside view of the motorcycle seat.

With reference now to FIG. 43, seat 26 is shown from an underside thereof including a frame portion such as 840. A wiring harness 842 is provided having a first connector at 844 and a second connector at 846. Connector 846 is to be connected to a harness in the trunk 700 and connector 844 is to be connected to a counterpart connector coming up through the frame (not shown). Connector 846 would be used for power to the trunk, namely to power an amplifier in the trunk for the motorcycle's audio system, as well as to provide power to the taillights and power lock on the trunk, and the like. As shown best in FIG. 44A, a pocket 850 is defined at the rear side of the motorcycle defined by an opening 852 in frame 840, as well as, a lower plate at 854.

Figure 44:
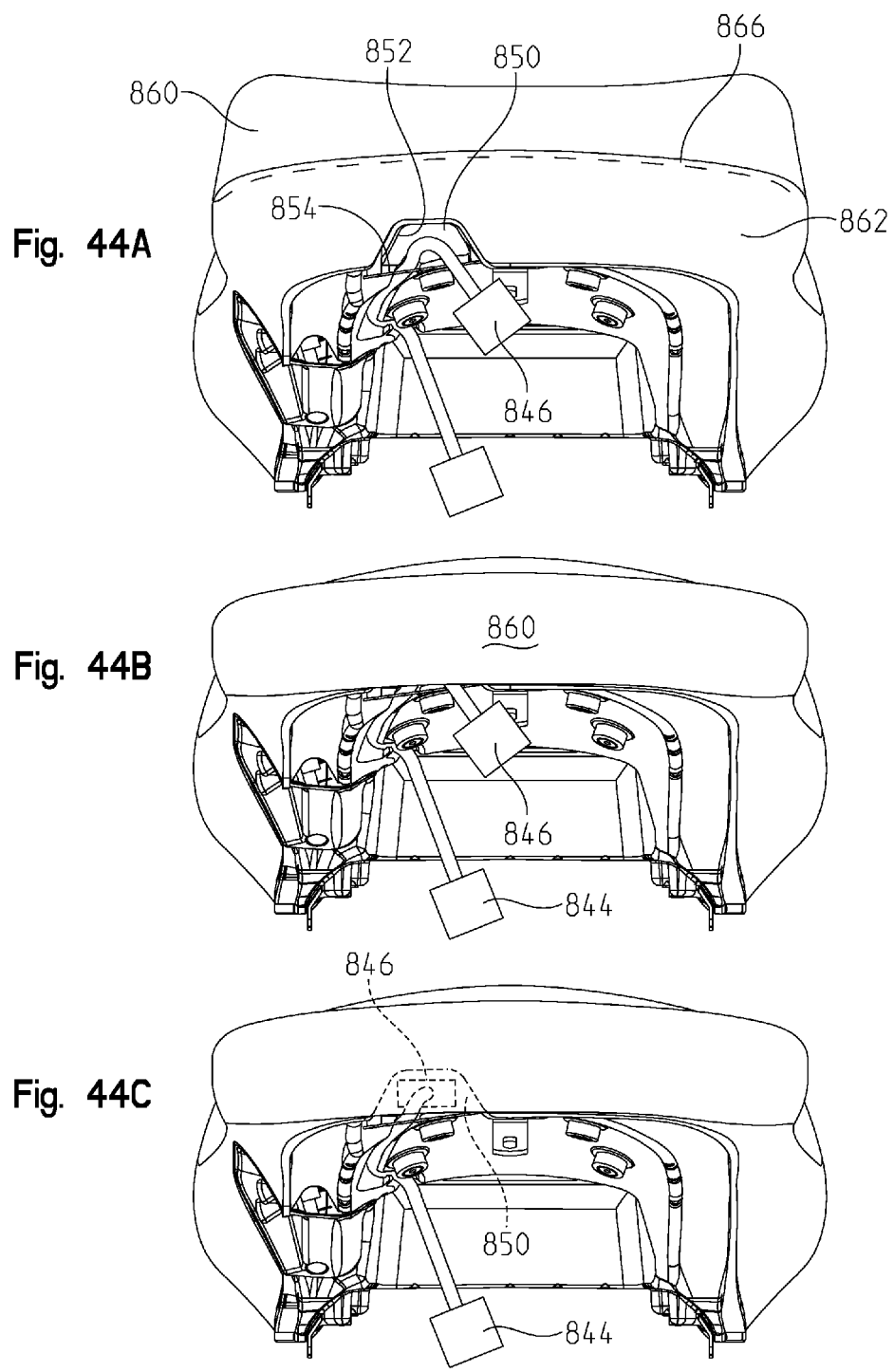
FIG. 44A is a rear view of the seat of FIG. 43 with a flap of the seat turned up.
FIG. 44B shows a connector harness extending out of the seat with the flap in the turned down position.
FIG. 44C shows the harness in the stowed position with the flap turned down.

With reference still to FIG. 44A, a rear flap portion is shown at 860 extending from the seat padding portion 862 and the flap may be turned up to extend above a top 866 of the padding portion 862. This could be a partial flap or could be a skirt extending around the entire seat cushion. Thus, when the trunk is in use and connector 846 is to be connected to the counterpart connector on the trunk, the harness extends outwardly of opening 850 as shown in FIG. 44A. The flap may then be turned down as shown in FIG. 44B, which closes off opening 850 allowing connector 846 to extend under the flap 860. If the trunk is not in use, the connector 846 is tucked back into the pocket 850 and the flap is turned downwardly maintaining the connector 846 within the pocket 850, as shown in FIG. 44C.

Figure 45:
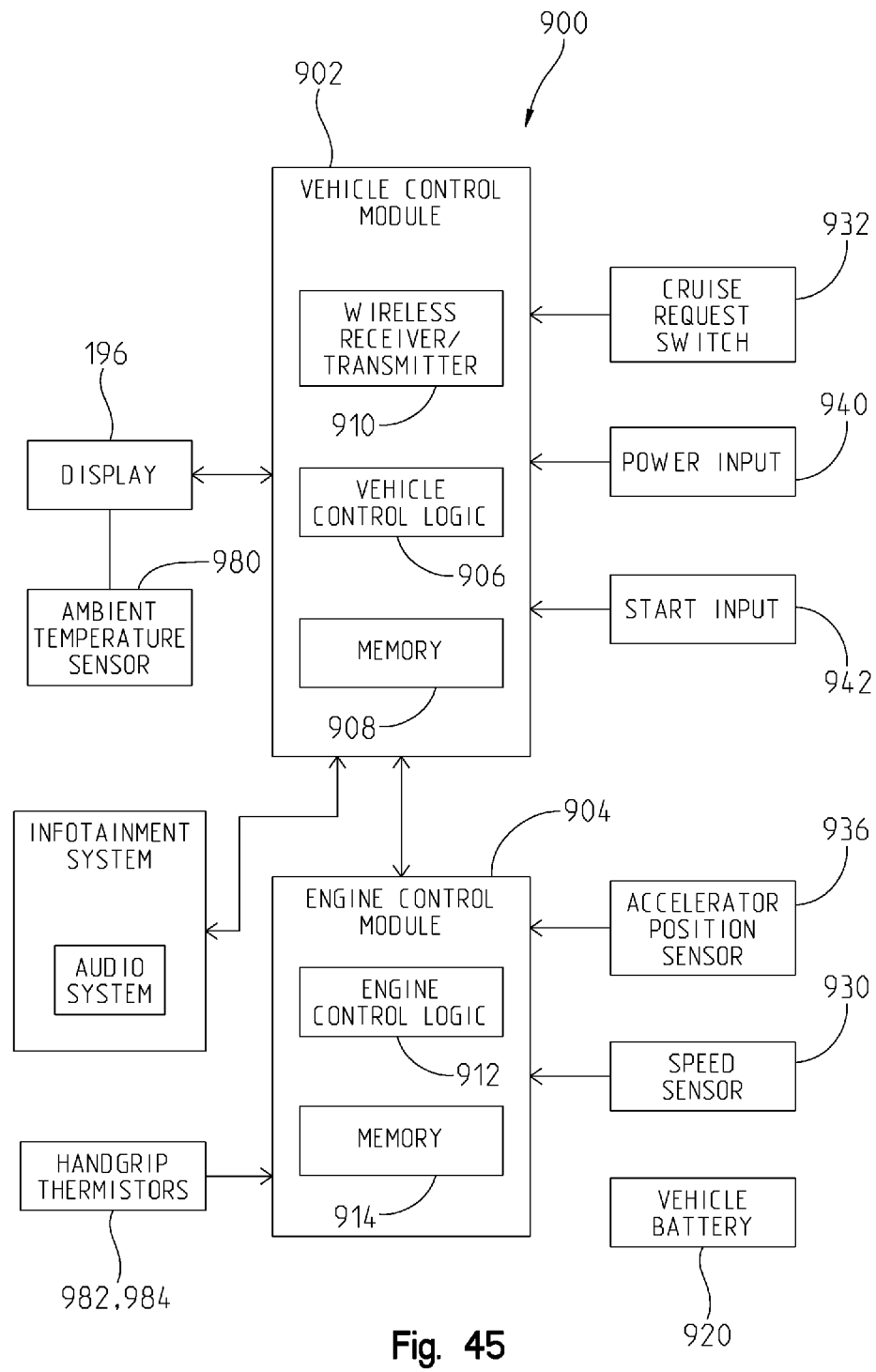
FIG. 45 shows a schematic of the vehicle electrical system.

Referring now to FIG. 45, an exemplary electrical system 900 of motorcycle 2 is illustrated. Electrical system 900 illustratively includes a vehicle control module (VCM) 902 in communication with an engine control module (ECM) 904. VCM 902 and ECM 904 each include one or more processors that execute software and/or firmware code stored at the respective internal or external memory 908, 914 to perform the functions described herein. In particular, VCM 902 includes vehicle control logic 906 that controls various electrical components and subsystems of motorcycle 2, and ECM 904 includes engine control logic 912 that controls the operation of engine 12. VCM 902 and/or ECM 904 may alternatively include one or more application-specific integrated circuits (ASICs), field-programmable gate arrays (FPGAs), digital signal processors (DSPs), hard-wired logic, or combinations thereof.

The functionality of VCM 902 and ECM 904 may alternatively be integrated into a single control module that provides both vehicle and engine control. Electrical system 900 further includes at least one vehicle battery 920 (e.g., 12 VDC) for providing power to the electrical components of motorcycle 2, including VCM 902, ECM 904, sensors, switches, lighting, ignition, accessory outlets, and other powered components. In one embodiment, VCM 902 communicates over a controller area network (CAN) bus network with ECM 904 and with various sensors and components of electrical system 900, although another suitable communication network or hard-wired communication may be provided.

Electrical system 900 includes several sensors in communication with VCM 902. One or more speed sensors 930 provide speed feedback to VCM 902, such as engine speed, vehicle speed, and/or other driveline speeds. An accelerator position sensor 936 (e.g., potentiometer) detects the position of the vehicle accelerator, e.g., the rotatable handgrip 214 (FIG. 46), and VCM 902 or ECM 904 determines the throttle demand based on the detected accelerator position for controlling the engine throttle 304. A cruise request switch 932 in communication with VCM 902 is actuated by an operator to set and implement the cruise speed. The cruise control operation will be operated in conjunction with accelerator position sensor 936 as described herein.

In the illustrated embodiment, the operator engages a power input 940 to power up electrical system 900 of motorcycle 2 and a start input 942 to start engine 12 of motorcycle 2, as described below. The sensors and other electrical devices illustratively routed to VCM 902 alternatively may be routed to ECM 904, such as the accelerator position sensor 936 and speeds sensors 930, for example, and VCM 902 may obtain the corresponding sensor data from ECM 904. In one embodiment, wiring to the sensors and electrical devices mounted on handlebars 28 is routed through an internal opening in handlebars 28 from the VCM 902 to thereby hide and protect the wiring.

VCM 902 illustratively further includes a wireless receiver/transmitter 910 for receiving and transmitting wireless communications to/from one or more vehicle sensors. In the illustrated embodiment, receiver/transmitter 910 is a radio frequency (RF) transceiver 910 operative to receive RF communications from the sensors.

ECM 904 electronically controls the throttle 304 of engine 12 based on at least the detected vehicle speed and throttle demand detected with accelerator position sensor 936. The electronic throttle control provided with ECM 904 is further described in U.S. patent application Ser. No. 13/152,981, filed on Jun. 3, 2011 and entitled "Electronic Throttle Control," the disclosure of which is incorporated herein by reference. VCM 902 and/or ECM 904 are operative to provide cruise control for motorcycle 2 such that motorcycle 2 operates at a substantially constant vehicle speed.

Cruise request switch 932 coupled to and in communication with VCM 902 is actuated or engaged by an operator to initiate the cruise control function of motorcycle 2. Cruise request switch 932, which includes a pushbutton, lever, or any other suitable input device, may be provided with the operator controls on the handlebar 28 of motorcycle 2. In the present embodiment, cruise control switch 932 is located on the control pod 950 shown in FIG. 46. Upon detection of cruise request switch 932 being engaged, VCM 902 instructs ECM 904 to maintain a constant vehicle speed using closed loop control based on the detected vehicle speed.

Figure 46:
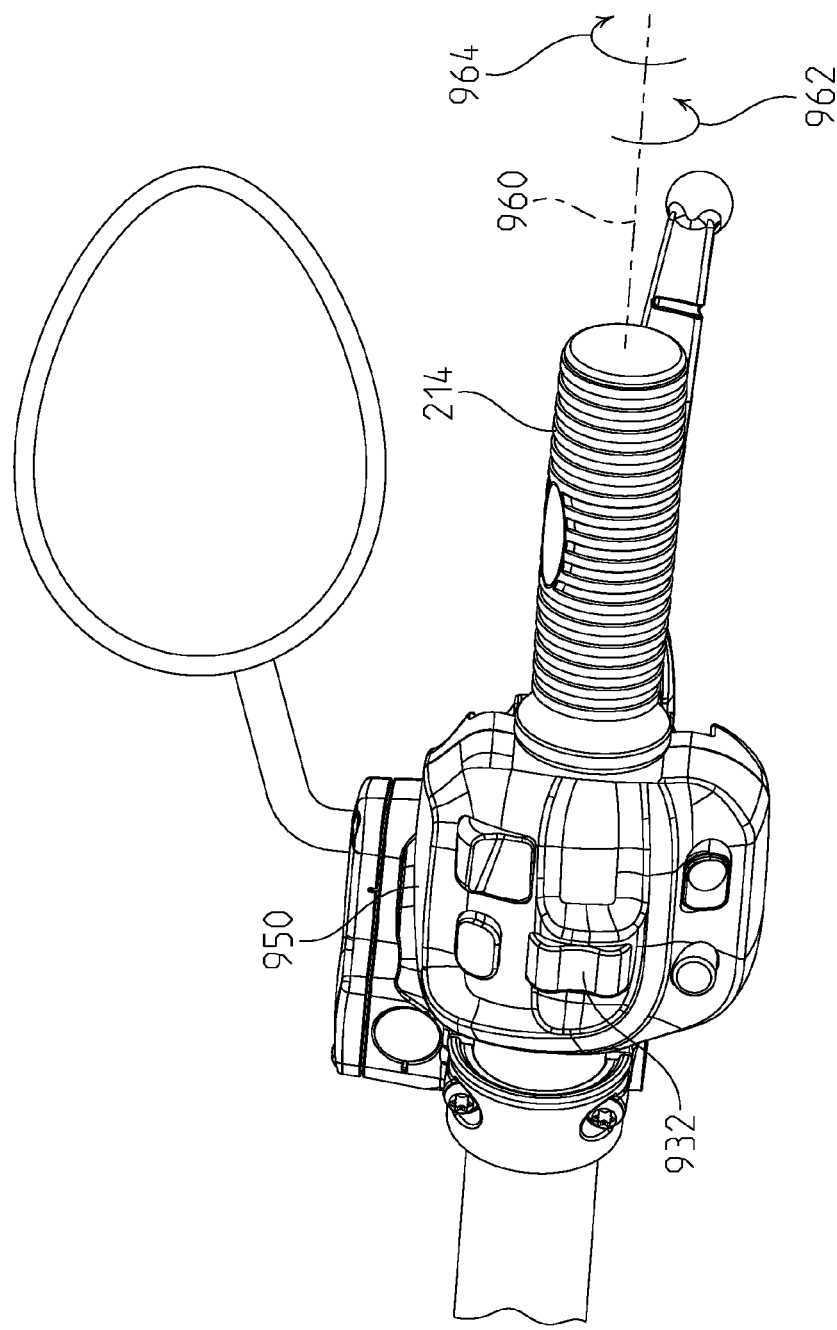
FIG. 46 shows an enlarged view of the right hand grip of the vehicle, showing the speed controls.

With reference to FIG. 46, the vehicle speed control or cruise control is activated by the operator to set a speed constant to that of the present vehicle speed. That is, as shown in FIG. 46, the vehicle is accelerated by turning the handgrip about axis 960 towards the operator, that is, in direction 962. Thus, to set the cruise control, the operator would move the accelerator in the direction 962 until the desired vehicle speed is achieved whereupon the cruise request switch 932 would be actuated. However in the present embodiment, the further functioning of the cruise control is operated by the handgrip 214 in the opposite or "roll-off" direction 964. It should be appreciated that once the cruise control switch 932 is activated, the operator may remove their hand from the handgrip 214 whereupon the handgrip returns to a neutral position until such time as the cruise control function is disengaged. In the present disclosure, the cruise control function may be either turned off completely or the set speed may be reduced by operation of the handgrip 214 in the roll-off direction 964.

Figure 47:
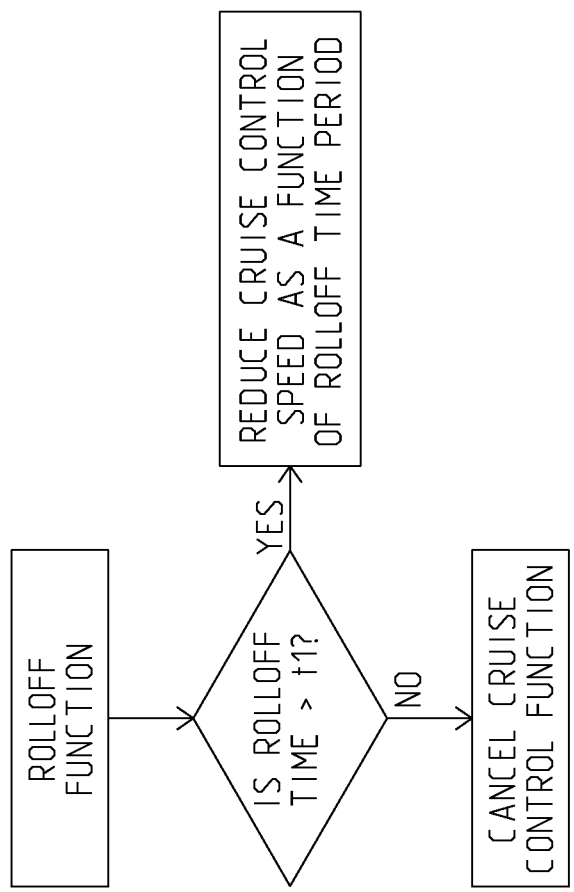
FIG. 47 shows a flow chart of the cruise control function.

For example, to disengage the cruise control feature entirely, the handgrip is moved in the roll-off diction 964 for a brief time period, such as one second or less ($t_1$<1 second), whereupon the cruise control feature is terminated. This is shown in FIG. 47 where the roll-off function is shown in a flowchart, such that if the time period $t_1$; that is the time period that the operator has the handgrip 214 in the roll-off direction 964, is less than $t_1$ then the cruise control function is terminated entirely. It should be appreciated that the time period $t_1$ of 1 second is arbitrarily chosen and could be any desired time value desired.

However, if the operator desires to reduce the cruise control speed as opposed to cancelling the function altogether, the operator may turn the handgrip 214 in the roll-off direction 964 for a period greater than $t_1$, whereby the cruise control function may be adjusted such that the cruise control speed is reduced as a function of the time period in which the operator maintains the handgrip 214 in the roll-off direction 964. This reduction in the cruise control speed could be displayed on the center display 196 (FIG. 12) in order for the operator to easily see and understand the new dialed in cruise control speed. Alternatively or in addition, the handgrip may be turned to increase the cruise control speed.

Figure 12:
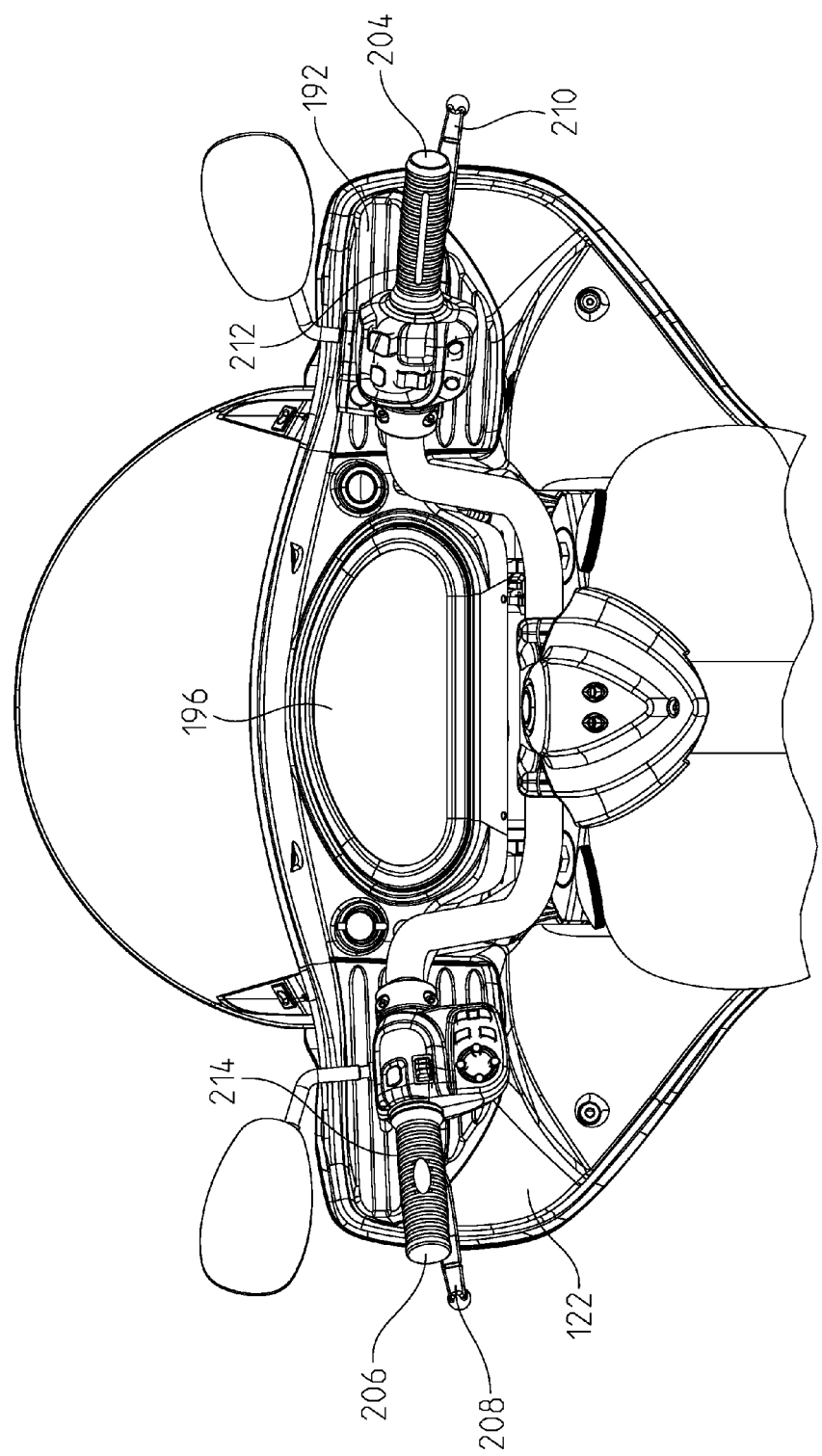
FIG. 12 is a further rear perspective view of the upper fairing and the windshield assembly of FIG. 11.
Figure 48:
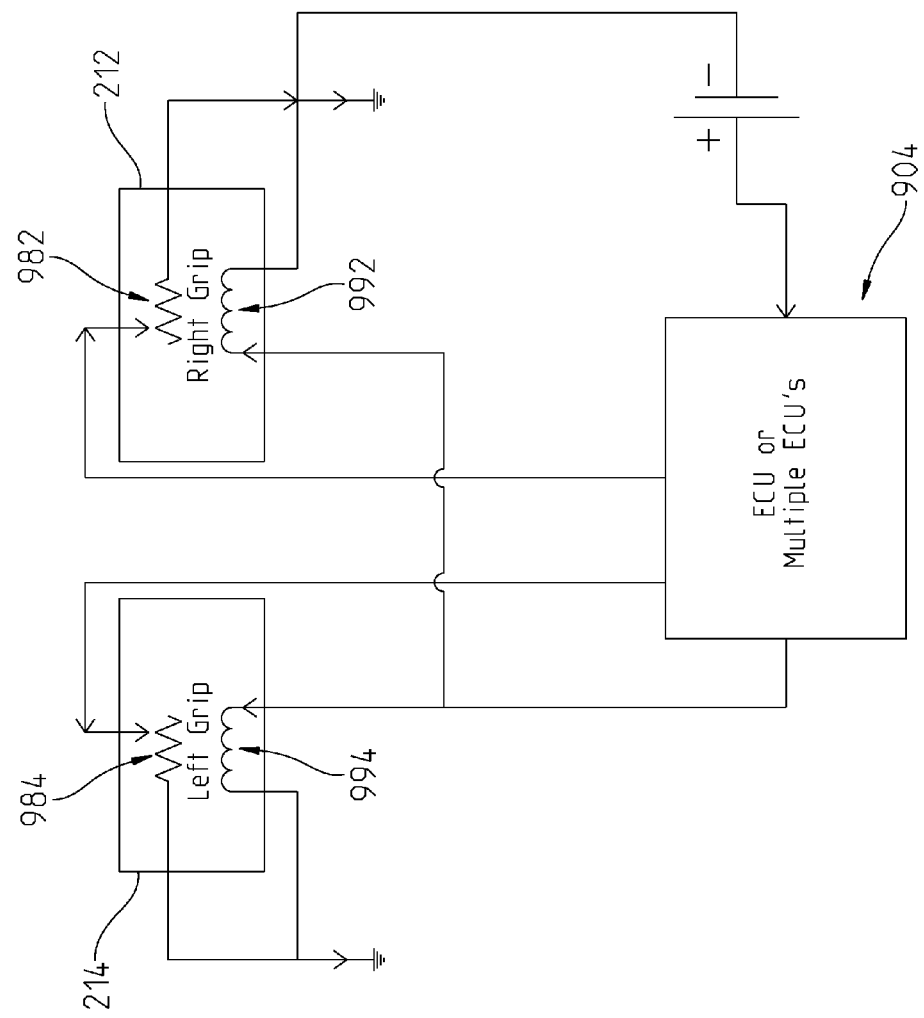
FIG. 48 shows an electrical schematic of the heated hand grips.

With reference now to FIGS. 45 and 48, the heated hand grips 212, 214 will be described in greater detail. Motorcycle 2 includes heated handle grips 212, 214 (FIGS. 12 and 48) coupled to right and left side handlebars 204, 206 (FIG. 12). As shown in FIG. 48, the hand grips 212, 214 each have a dedicated thermistor 982, 984 as well as a dedicated heater 992, 994.

The hand grips 212, 214 may be heated to the maximum operating temperature in less than 60 seconds by controlling the grips with PWM from the VCM 902. When the heated grips are turned on, the grips will run at 100% PWM for no more than 1 minute, and will then continue to build temperature as needed until desired setting is achieved.

The software can compensate for different ambient temperatures, different vehicle speeds, as well as for the rider removing his/her hand from one of the grips while riding. More particularly, the ambient temperature may be read from the ambient temperature sensors 980 (FIG. 45) and input that information to the ECU 904. The actual vehicle speed may be read from the speed sensor 930 (FIG. 45) and input that information to the ECU 904. Thermistors 982, 984 (FIGS. 45 and 48) in each heated grip 212, 214 report to the VCM the real-time grip tube temperature which controls the current to the heaters 992, 994. As there is a thermistor in each hand grip, if an operator removes their hand from one of the grips, the temperature at the thermistor will drop (depending on ambient temperature and vehicle speed) and the heaters 992, 994 will increase the temperature accordingly.

The VCM can adjust the current up or down (within a preset band of limits) in order to maintain that grip tube temperature during changing ambient or riding conditions. With the closed loop feedback of the thermistors on both hand grips, the system can compensate for ambient temp or riding condition changes to either grip, without the risk of discomfort to passenger from overheated grips.

Figure 49:
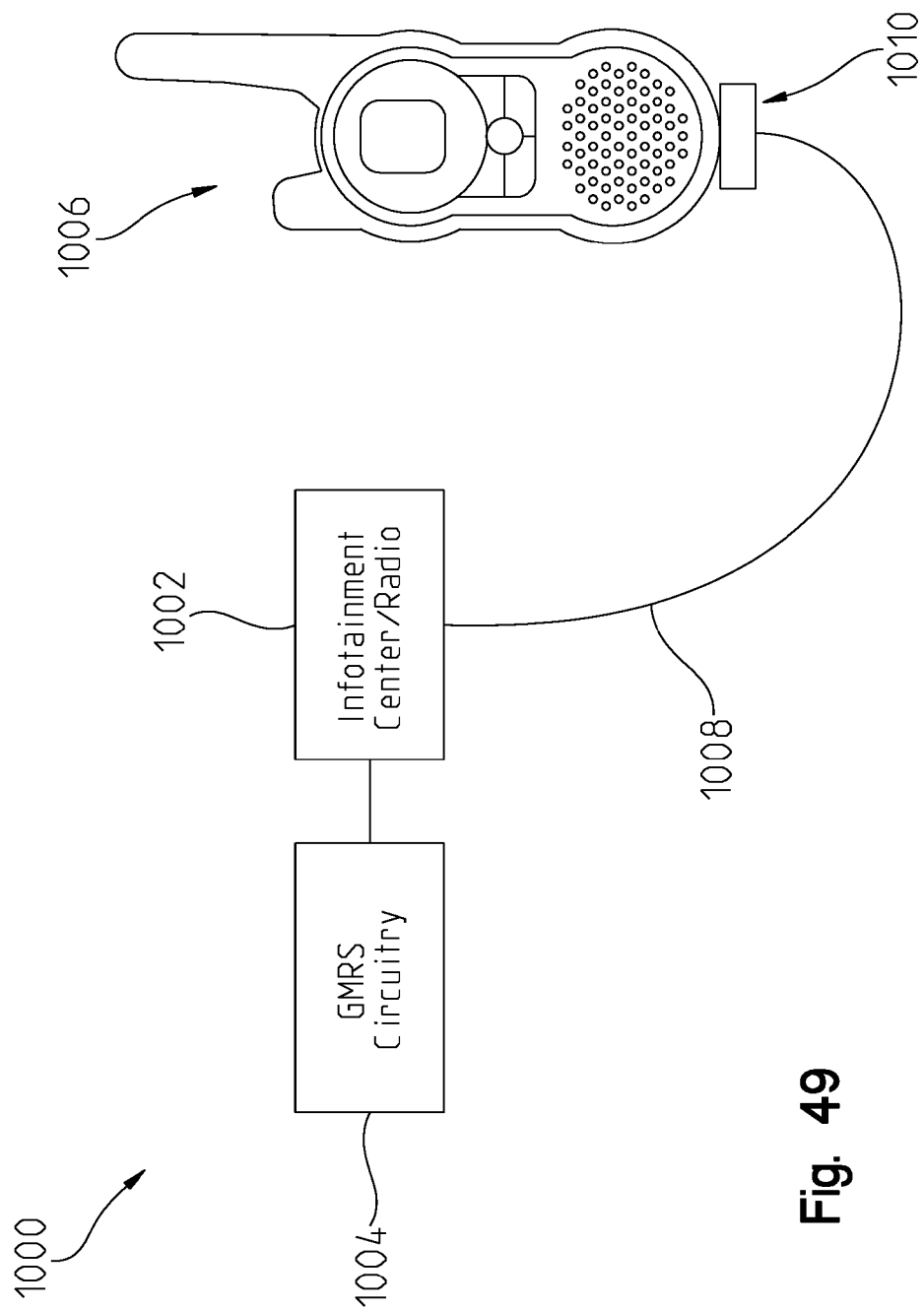
FIG. 49 shows a schematic of the GMRS system.
Figure 50:
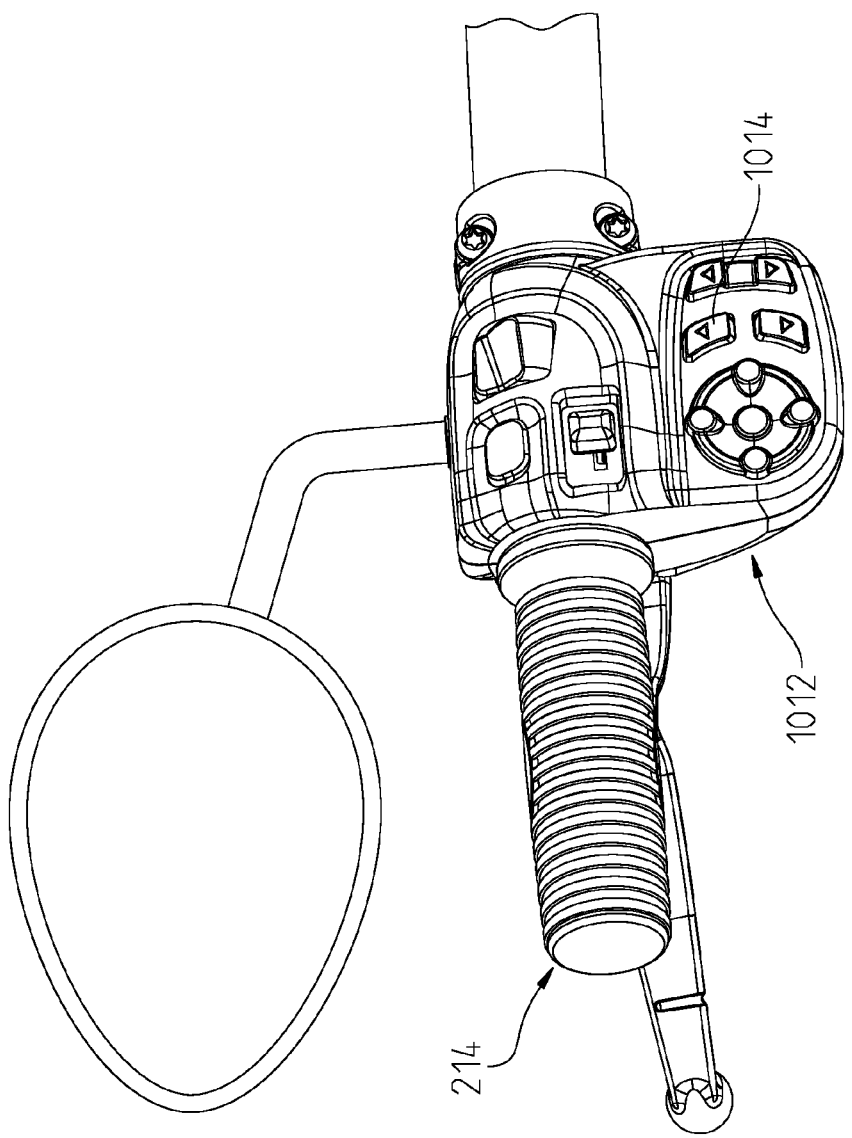
FIG. 50 shows an enlarged view of the left hand grip of the present vehicle.

With reference now to FIGS. 49 and 50, the communication system will now be described in greater detail. The communication system is based on the General Mobile Radio Service ("GMRS") which is in the 462-467 MHz spectrum range. The GMRS spectrum is short-distance, two-way communications using small, portable hand-held devices that function similar to walkie-talkies.

With reference to FIG. 49, the communication system is shown at 1000, and generally comprises the infotainment system 1002 (which is also shown in the schematic of FIG. 45); the GMRS circuitry 1004; a hand held unit (walkie talkie hand set) 1006; and a wiring harness 1008. In the embodiment shown, the GMRS circuitry is integrated into the motorcycle 2 and includes a push to talk (PTT) feature as well as a bluetooth chipset coupled to a headset. The harness 1008 includes a connector 1010 for electrically connecting to the hand set 1006. The harness could be hard wired in or be an accessory for the user to purchase and add later. Regardless, the connector would be stowed in a compartment within the motorcycle and the handset could be added by the user. The handset is added by the rider as a personal choice much like a cell phone.

The PTT feature is coupled to the audio pod 1012 (FIG. 50) and is provided by push button 1014. This feature provides a two way interrupt overriding the present output on the audio system. Thus, the communication system allows an economical solution for two way communication between riders on different motorcycles.

It should also be appreciated that the GMRS communication system 1000 could interface with the system shown in U.S. provisional application Ser. No. 61/769,378 filed Feb. 26, 2013.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle, comprising:
a frame;
a plurality of ground-engaging members supporting the frame;
a powertrain assembly coupled to at least one of the ground-engaging members;
a steering assembly coupled to at least one of the ground-engaging members; and
a cruise control assembly operably coupled to the powertrain assembly, the cruise control assembly including a speed input configured to adjust a vehicle speed and an engagement input operably coupled to the speed input and configured to engage a constant vehicle speed mode, and the constant vehicle speed mode is configured to be disengaged based on a comparison of a time of activation of the speed input with a first predetermined period of time.

2. The vehicle of claim 1, wherein the speed input is configured to move in a first direction to increase a constant speed setting of the mode and is configured to move in a second direction to decrease the constant speed setting of the mode.

3. The vehicle of claim 2, wherein the first direction is opposite the second direction.

4. The vehicle of claim 2, wherein the speed input is configured to move in the second direction for the first predetermined period of time to disengage the mode, and the speed input is configured to move in the second direction for a second predetermined period of time to decrease the constant speed setting of the mode.

5. The vehicle of claim 4, wherein the second predetermined period of time is greater than the first predetermined period of time.

6. The vehicle of claim 1, wherein the steering assembly comprises a handlebar having handgrips for an operator's hands, and the speed input is defined by the handgrips.

7. The vehicle of claim 6, wherein, when in the constant vehicle speed mode, rotation of at least one of the handgrips in a first direction increases the vehicle speed and rotation of the at least one handgrip in a second direction decreases the vehicle speed.

8. The vehicle of claim 7, wherein the at least one handgrip is biased to a starting position based on engagement of the constant vehicle speed mode to maintain a constant vehicle speed.

9. The vehicle of claim 1, wherein the steering assembly comprises:
a handlebar having handgrips for an operator's hands;
a speed sensor;
at least one programmable controller configured to receive feedback from the sensor; and
a heater in at least one of the handgrips and the handlebar, the heater being operably coupled to the at least one programmable controller and receiving feedback from the speed sensor to control operation of the heater.

10. The vehicle of claim 1, wherein the constant vehicle speed mode is configured to be disengaged based on a determination that the time of activation of the speed input is less than the first predetermined period of time.

11. A vehicle, comprising:
a frame;
a plurality of ground-engaging members supporting the frame;
a powertrain assembly coupled to at least one of the ground-engaging members;
a steering assembly coupled to at least one of the ground-engaging members, the steering assembly including a handlebar having handgrips for an operator's hands; and
a cruise control assembly at least partially supported on the steering assembly and operably coupled to the powertrain assembly, the cruise control assembly being configured to engage a constant speed mode to maintain a constant vehicle speed in response to movement of at least one of the handgrips, and movement of the at least one handgrip in a first direction for a first duration of time decreases a vehicle speed setting and movement of the at least one handgrip in the first direction for a second duration of time terminates operation of the constant vehicle speed mode.

12. The vehicle of claim 11, wherein the second duration of time is less than the first duration of time.

13. The vehicle of claim 12, wherein the second duration is up to one second.

14. The vehicle of claim 11, wherein the at least one handgrip is configured to move in a second direction to increase the vehicle speed setting.

15. The vehicle of claim 14, wherein the second direction is opposite the first direction.

16. The vehicle of claim 11, wherein the cruise control assembly includes an engagement input configured to engage the constant speed mode responsive to movement of the at least one handgrip.

17. The vehicle of claim 16, wherein the engagement input is defined by at least one of a pushbutton, a lever, or a switch.

18. The vehicle of claim 11, wherein the at least one handgrip is biased to a starting position when the cruise control assembly is actuated to maintain the constant vehicle speed.

19. The vehicle of claim 11, further comprising an electronic display operably coupled to the cruise control assembly and configured to display adjustments to the vehicle speed based on movement of the at least one handgrip.

20. A method of operating a cruise control assembly for a vehicle, comprising:
 providing a vehicle having a steering assembly including a handlebar having handgrips for an operator's hands and a cruise control assembly;
 operably coupling the cruise control assembly to at least one of the handgrips;
 moving the at least one handgrip in a first direction to increase a vehicle speed;
 engaging an input of the cruise control assembly to engage a cruise control mode to maintain the vehicle speed at a constant value; and
 moving the at least one handgrip in a second direction for at least one of a first duration of time to decrease the vehicle speed or a second duration of time to terminate operation of the cruise control mode, the second duration being less than the first duration.

21. The method of claim 20, wherein moving the at least one handgrip in the second direction for the first duration of time occurs after engaging the input of the cruise control assembly.

22. The method of claim 20, wherein moving the at least one handgrip in the second direction for the second duration of time occurs after engaging the input of the cruise control assembly.

* * * * *